US010961326B2

(12) United States Patent
Sherlock et al.

(10) Patent No.: US 10,961,326 B2
(45) Date of Patent: Mar. 30, 2021

(54) METHODS AND SYSTEMS FOR EXTRACTING A POLYSACCHARIDE PRODUCT FROM A MICROCROP AND COMPOSITIONS THEREOF

(71) Applicants: Parabel Ltd., Grand Cayman (KY); Peter Sherlock, Fellsmere, FL (US)

(72) Inventors: Peter Sherlock, Rockledge, FL (US); Ruben Garcia Gonzalez, Amsterdam (NL)

(73) Assignee: Parabel Nutrition, Inc., Vero Beach, FL (US)

( * ) Notice: Subject to any disclaimer, the term of this patent is extended or adjusted under 35 U.S.C. 154(b) by 227 days.

(21) Appl. No.: 15/742,442

(22) PCT Filed: Jul. 6, 2016

(86) PCT No.: PCT/US2016/041156
§ 371 (c)(1),
(2) Date: Jan. 5, 2018

(87) PCT Pub. No.: WO2017/007830
PCT Pub. Date: Jan. 12, 2017

(65) Prior Publication Data
US 2018/0194865 A1 Jul. 12, 2018

Related U.S. Application Data

(60) Provisional application No. 62/240,279, filed on Oct. 12, 2015, provisional application No. 62/189,040, filed on Jul. 6, 2015.

(51) Int. Cl.
| C08B 37/00 | (2006.01) |
| B01D 61/02 | (2006.01) |
| C08H 99/00 | (2010.01) |
| B01D 11/02 | (2006.01) |
| B01D 21/26 | (2006.01) |
| B01D 21/28 | (2006.01) |
| B01D 61/14 | (2006.01) |

(52) U.S. Cl.
CPC ........ *C08B 37/0048* (2013.01); *B01D 11/028* (2013.01); *B01D 11/0288* (2013.01); *B01D 21/262* (2013.01); *B01D 21/283* (2013.01); *B01D 61/025* (2013.01); *B01D 61/145* (2013.01); *C08H 99/00* (2013.01)

(58) Field of Classification Search
CPC .................................................. C08B 37/0048
See application file for complete search history.

(56) References Cited

U.S. PATENT DOCUMENTS

| 2,522,513 A | 9/1950 | Hemmeter |
| 2,692,200 A | 10/1954 | Olson |
| 2,827,454 A | 3/1958 | Gustav Jean Nord |
| 2,867,945 A | 1/1959 | Gotaas et al. |
| 3,468,057 A | 9/1969 | Buisson et al. |
| 3,499,687 A | 3/1970 | Ellis |
| 3,674,501 A | 7/1972 | Betz et al. |
| 3,704,041 A | 11/1972 | Loveland et al. |
| 3,768,200 A | 10/1973 | Klock |
| 3,839,198 A | 10/1974 | Shelef |
| 3,930,450 A | 1/1976 | Symons |
| 3,955,318 A | 5/1976 | Hulls |
| 4,005,546 A | 2/1977 | Oswald |
| 4,041,640 A | 8/1977 | Itanami et al. |
| 4,066,633 A | 1/1978 | Gastineau et al. |
| 4,077,158 A | 3/1978 | England |
| 4,137,868 A | 2/1979 | Pryor |
| 4,253,271 A | 3/1981 | Raymond |
| 4,429,867 A | 2/1984 | Barber |
| 4,516,528 A | 3/1985 | Jones |
| 4,557,937 A | 12/1985 | Boumier |
| 4,560,032 A | 12/1985 | Imanaka |
| 4,604,948 A | 8/1986 | Goldhahn |
| 4,840,253 A | 6/1989 | DiMaggio et al. |
| 4,910,912 A | 3/1990 | Lowrey, III |
| 5,047,332 A | 9/1991 | Chahal |
| 5,121,708 A | 6/1992 | Nuttle |
| 5,171,592 A | 12/1992 | Holtzapple et al. |
| 5,269,819 A | 12/1993 | Porath |
| 5,527,456 A | 6/1996 | Jensen |
| 5,659,977 A | 8/1997 | Jensen et al. |
| 5,667,445 A | 9/1997 | Lochtefeld |
| 5,704,733 A | 1/1998 | de Greef |

(Continued)

FOREIGN PATENT DOCUMENTS

| CN | 10111696 | 2/2008 |
| CN | 101116986 | 2/2008 |

(Continued)

OTHER PUBLICATIONS

Hart et al. Biochem J. Feb. 1970; 116(4): 569-579. (Year: 1970).*
Gunter et al. Applied Biochemistry and Microbiology, vol. 40, No. 1, pp. 80-83. (Year: 2004).*
Freidig et al., Variation in Oxalic Acid Content among Commercial Table Beet Cultivars and Related Crops. Journal of the American Society for Horticultural Science, vol. 136, No. 1, pp. 54-60 (2011).
Extended Search Report in European Patent Application No. 16835862. 0, dated Nov. 9, 2018.
Mazen, Ahmed M.A., "Calcium oxalate formation in Lemna minor: physiological and ultrastructural aspects of high capacity calcium sequestration" New Phytologist vol. 161, pp. 435-448, 2003.
Extended Search Report in European Patent Application No. 16845285.2 dated Jan. 15, 2019.

(Continued)

Primary Examiner — Amy L Clark
(74) Attorney, Agent, or Firm — Baker & McKenzie LLP

(57) ABSTRACT

The present disclosure relates, according to some embodiments, to methods and systems for purifying proteins, carbohydrate rich products, and polysaccharide products from a microcrop (e.g., photosynthetic aquatic species) and compositions thereof. For example, the present disclosure relates, in some embodiments to methods and systems for extracting proteins, dry biocrude, carbohydrate-rich meal, and polysaccharide products from *Lemna*.

13 Claims, 8 Drawing Sheets

(56) References Cited

U.S. PATENT DOCUMENTS

| | | |
|---|---|---|
| 5,941,165 A | 8/1999 | Butte |
| 6,077,548 A | 6/2000 | Lasseur et al. |
| 6,096,546 A | 8/2000 | Raskin |
| 6,251,643 B1 | 6/2001 | Hansen et al. |
| 6,348,347 B1 | 2/2002 | Hirabayashi et al. |
| 7,058,197 B1 | 6/2006 | McGuire et al. |
| 7,215,420 B2 | 5/2007 | Gellerman et al. |
| 7,674,077 B2 | 3/2010 | Opatril |
| 8,245,440 B2 | 8/2012 | Ryan et al. |
| 8,287,740 B2 | 10/2012 | Newman et al. |
| 8,722,878 B2 | 5/2014 | Raines et al. |
| 9,675,054 B2 | 6/2017 | Grajcar et al. |
| 9,894,856 B2 | 2/2018 | Javan et al. |
| 2004/0030516 A1 | 2/2004 | Dunhill et al. |
| 2004/0144025 A1 | 7/2004 | Rutzke |
| 2006/0024689 A1 | 2/2006 | Bleuart et al. |
| 2007/0048859 A1 | 3/2007 | Sears |
| 2007/0151522 A1 | 7/2007 | Brauman |
| 2008/0032349 A1 | 2/2008 | Visckov et al. |
| 2008/0096267 A1 | 4/2008 | Howard et al. |
| 2008/0155890 A1 | 7/2008 | Oyler |
| 2009/0088757 A1 | 4/2009 | Tulkis |
| 2009/0151240 A1 | 6/2009 | Kayama et al. |
| 2009/0285642 A1 | 11/2009 | De Greef |
| 2010/0028505 A1 | 2/2010 | Katzke et al. |
| 2010/0041095 A1 | 2/2010 | Zeikus |
| 2010/0151558 A1 | 6/2010 | Alianell et al. |
| 2010/0162620 A1 | 7/2010 | McCaffrey et al. |
| 2010/0281836 A1 | 11/2010 | Vanhoute et al. |
| 2010/0325948 A1 | 12/2010 | Parsheh et al. |
| 2011/0016773 A1 | 1/2011 | Nichols et al. |
| 2011/0092726 A1 | 4/2011 | Clarke |
| 2011/0172102 A1 | 7/2011 | Jacob et al. |
| 2012/0009660 A1 | 1/2012 | Pottathil et al. |
| 2012/0117869 A1 | 5/2012 | Javan et al. |
| 2012/0171753 A1 | 7/2012 | Ivry |
| 2012/0288917 A1 | 11/2012 | Krenbrink et al. |
| 2012/0308989 A1 | 12/2012 | Barclay et al. |
| 2013/0023044 A1 | 1/2013 | Gleason |
| 2013/0183705 A1 | 7/2013 | Barclay et al. |
| 2013/0192130 A1 | 8/2013 | Eckelberry |
| 2013/0244309 A1 | 9/2013 | Singh et al. |
| 2014/0023675 A1 | 1/2014 | Lina et al. |
| 2014/0212955 A1 | 7/2014 | Ploechinger |
| 2014/0221630 A1 | 8/2014 | Olivier et al. |
| 2014/0338261 A1 | 11/2014 | Sykes |
| 2014/0356496 A1 | 12/2014 | Mulnyczuk |
| 2015/0072400 A1 | 3/2015 | Clarke |
| 2015/0275161 A1 | 10/2015 | Gressel et al. |
| 2016/0030350 A1 | 2/2016 | Muller |
| 2016/0288001 A1 | 10/2016 | Johnson |
| 2016/0360715 A1 | 12/2016 | Sherlock et al. |
| 2017/0223935 A1 | 8/2017 | Behrens |
| 2018/0014486 A1 | 1/2018 | Creechley et al. |
| 2018/0116139 A1 | 5/2018 | Karta |
| 2018/0118595 A1 | 5/2018 | Curry |

FOREIGN PATENT DOCUMENTS

| | | |
|---|---|---|
| CN | 101595943 | 12/2009 |
| CN | 102448286 | 5/2012 |
| CN | 101595943 B | 3/2013 |
| CN | 103002752 A | 3/2013 |
| CN | 202960947 | 6/2013 |
| CN | 202960947 U | 6/2013 |
| CN | 204092345 | 1/2015 |
| CN | 104413257 | 3/2015 |
| CN | 104585067 A | 5/2015 |
| DE | 4133920 | 11/1993 |
| EP | 0285195 | 10/1988 |
| EP | 0765599 | 4/1997 |
| FR | 2522479 | 9/1983 |
| JP | S52151199 | 12/1977 |
| JP | S54147650 | 11/1979 |
| JP | S56-031425 | 3/1981 |
| JP | S59-183635 A | 10/1984 |
| JP | 2001502918 | 3/2001 |
| JP | 2002-306147 A | 10/2002 |
| JP | 2002-532112 A | 10/2002 |
| JP | 2004097021 | 4/2004 |
| JP | 2005007837 | 1/2005 |
| JP | 2005065626 A | 3/2005 |
| JP | 2008-043207 A | 2/2008 |
| JP | 2010-214278 A | 9/2010 |
| JP | 2011-019508 A | 2/2011 |
| JP | 2011254724 A | 12/2011 |
| JP | 2013521808 A | 6/2013 |
| KR | 20000018164 U | 10/2000 |
| KR | 101153379 | 6/2012 |
| MX | 2011010995 | 1/2012 |
| NL | 20111038645 | 9/2012 |
| WO | 9105849 | 5/1991 |
| WO | 9818344 | 5/1998 |
| WO | 0145523 | 6/2001 |
| WO | 2002034755 | 5/2002 |
| WO | 03028432 | 4/2003 |
| WO | 2007109066 | 9/2007 |
| WO | 2008020457 | 2/2008 |
| WO | 2008033573 | 3/2008 |
| WO | 2010123943 | 10/2010 |
| WO | 2010144877 | 12/2010 |
| WO | 2011044194 | 4/2011 |
| WO | 2011116252 | 9/2011 |
| WO | 2011-156662 A2 | 12/2011 |
| WO | 2011156662 | 12/2011 |
| WO | 2014046543 | 3/2014 |

OTHER PUBLICATIONS

Watson, Elaine, "Ultra-fast-growing aquatic plant promises year-round supply of sustainable vegetable protein", Jul. 24, 2015, p. 1-4, XP055537613, www.bakeryandsnacks.com, Retrieved from Internet: www.bakeryandsnacks.com/Article/2015/07/06/Aquatic-plant-promises-year-round-supply-of-sustainable-plant-protein. [Retrieved from Internet on Dec. 21, 2018].

Extended Search Report in European Patent Application No. 16808454.9 dated Feb. 6, 2019.

Kwag, J.H. et al. "Conditions for artificial culture of Lemna Paucicostata and potentiality as an alternative biomass source"; J.Lives.House & Env. 16 (2) pp. 143-152, 2010.

First Examination Report in Australian Patent Application No. 2016276974, dated Apr. 9, 2019.

Partial Supplementary European Search Report in European Patent Application No. 16808454.9 dated Nov. 11, 2018.

International Preliminary Report on Patentability by the International Preliminary Examination Authority (Korean Intellectual Property Office) in International Application No. PCT/US2016/051380, dated Mar. 13, 2018.

International Preliminary Report on Patentability by the International Preliminary Examination Authority (Koean Intellectual Property Office) in PCT/US2016/051366, dated Mar. 22, 2018.

International Search Report and Written Opinion of the International Searching Authority (Korean Intellectual Property Office) in International Application No. PCT/US2016/051366, dated Dec. 22, 2016.

International Search Report and Written Opinion of the International Searching Authority (Korean Intellectual Property Office) in International Application No. PCT/US2016/051380, dated Dec. 26, 2016.

Mutiara, Titi K., et al, 'Effect of blanching treatments against protein content and amino acid drumstick leaves (Moringa oleifera)', Journal of Food Research, vol. 2, No. 1, pp. 101-108 (2013).

Schaafsma, Gertjan, 'Advantages and limitations of the protein digestibility-corrected amino acid score (PDCAAS) as a method for evaluating protein quality in human diets', British Journal of Nutritiion, vol. 108, pp. S333-S336 (2012).

Extended European Search Report of European Patent Application No. 16821918.6, dated May 13, 2019.

(56) References Cited

OTHER PUBLICATIONS

Hart, David A., et al.: "Isolation and Partial Characterization of Apiogalacturonans from the Cell Wall of Lemna minor", Biochem. J, Jan. 1, 1970 (Jan. 1, 1970).
Examination Report, mailed in related Chinese Patent Application No. 201080023569.X, dated Sep. 20, 2012.
Office Action, mailed in Brazilian Patent Application No. PI1015000-5, notification published Jan. 23, 2018.
Office Action mailed in Brazilian Patent Application No. PI1015000-5, dated Dec. 20, 2017.
International Search Report and Written Opinion of the International Searching Authority (US) in related International Application No. PCT/US2010/031811, dated Jun. 18, 2010.
International Preliminary Report on Patentability of the International Preliminary Examination Authority (US) in related International Application No. PCT/US2010/031811, dated Oct. 11, 2011.
Office Action received in Brazilian Patent Application No. PI1015000-5, notification published May 10, 2018.
Office Action, mailed in Chinese Patent Application No. 201610789415.0 dated Nov. 5, 2018.
International Search Report and Written Opinion of the International Searching Authority (US) in PCT International Application No. PCT/US2011/028911, dated Nov. 30, 2011.
Office Action in Mexican Patent Application No. MX/a/2014/010053, dated Feb. 13, 2017.
Office Action mailed in Malaysian Patent Application No. PI 2011005000 dated Jun. 30, 2015.
Extended Search Report in European Patent Application No. 11757038.2, dated Mar. 9, 2017.
Office Action in European Patent Application No. 11757038.2, dated Jul. 16, 2018.
Office Action in Australian Patent Application No. 2015255285, dated Mar. 3, 2017.
Preliminary Examination Report in Peruvian Patent Application No. 1563-2012, dated Apr. 17, 2017.
International Preliminary Report on Patentability of the International Preliminary Examination Authority in PCT International Application No. PCT/US2011/028911, dated Sep. 18, 2012.
Office Action in Canadian Patent Application No. 2793512, dated Mar. 28, 2018.
Office Action in Canadian Patent Application No. 2793512, dated Aug. 7, 2017.
Office Action in Indonesian Patent Application No. W00201204170, dated Sep. 29, 2017.
Office Action in Japanese Patent Application No. 2015-020932 dated Jan. 27, 2017.
Office Action in Japanese Patent Application No. 2015-020932 dated Dec. 5, 2017.
Office Action in Indian Patent Application No. 8902/DELNP/2012 dated Aug. 3, 2018.
Office Action in European Patent Application No. 11757038.2, dated Jan. 3, 2019.
International Preliminary Report on Patentability by the International Preliminary Examination Authority for International Application No. PCT/US2016/037097, dated Dec. 22, 2017.
International Search Report and Written Opinion of the International Searching Authority for PCT application No. PCT/US2016/037099, dated Oct. 5, 2016.
International Preliminary Report on Patentability by the International Preliminary Examination Authority (Korean ntellectual Patent Office) for International Application No. PCT/US2016/037099, dated Dec. 12, 2017.
Extended Search Report in European Patent Application No. 16808483.8, dated Dec. 21, 2018.
International Preliminary Report on Patentability by the International Preliminary Examination Authority (Korean Intellectual Property Office) for International Application No. PCT/US2016/037046, dated Dec. 12, 2017.

International Preliminary Report on Patentability by the International Preliminary Examination Authority (Korean Intellectual Property Office) for International Application No. PCT/US2016/041156, dated Jan. 18, 2018.
International Search Report and Written Opinion of the International Searching Authority (Korean Intellectual Property Office) for corresponding PCT application No. PCT/US2016/046422, dated Nov. 10, 2016.
International Preliminary Report on Patentability by the International Preliminary Examination Authority (Korean Intellectual Property Office) for International Application No. PCT/US2016/046422, dated Feb. 22, 2018.
International Search Report and Written Opinion of the International Searching Authority (Korean Intellectual Property Office) for International Application No. PCT/US2016/037097, dated Sep. 12, 2016.
Supplementary European Search Report in European Patent Application No. 16808482.0, dated Feb. 21, 2019.
Sogbesan, OA; "Utilization of Treated Duckweed Meal (*Lemna pausicostata*) as Plant Protein Supplement in African Mud Catfish (*Clarias gariepinus*) Juvenile Diets" Fisheries and Aquaculture Journal, vol. 6, Issue 4, ISSN: 2150-3508 FAJ, 2015.
Extended Search Report of European Patent Office in European Patent Application No. 16845295.1, dated Jan. 15, 2019.
Office Action, mailed in Indian Patent Application No. 8948/DELNP/2011 dated Apr. 11, 2018.
Office Action, mailed in Brazilian Patent Application No. PI1015000-5, dated Sep. 26, 2018.
Pedroni et al., A Proposal to Establish International Network on Biofixation of C02 and Greenhouse Gas Abatement with Microalgae, Journal of Energy and Environmental Research, vol. 1, No. 1, Nov. 2001.
Hallam, Murray, Practical Aquaponics for Everyone. Retrieved from Internet: URL: www.aquaponics.net.au/sites1 O. html, Wayback Machine publication dated Dec. 2008, 3 pages.
The Garden Pond Blog. Retrieved from Internet: URL: jeremybiggs.wordpress.com/2008/10/28/duck-attack/ , publication Oct. 2008, 2 pages.
Workshop to produce an Information Kit on Farmer-proven integrated agriculture-aquaculture technologies, IIRR; Retrieved from Internet: collections.infocollections.org/ukedu/en/d/Jii23we/9.1. html, 1992, 10 pages.
Fasakin, E.A. "Nutrient quality of leaf protein concentrates produced from water fern {*Azolla africanna Desv*) and Duckweed {*Spirodela polyrrhiza L. Schleiden*)", Bioresource Technology., vol. 69, No. 2, Aug. 1, 1999 {Aug. 1, 1999), pp. 185-187.
Fowden, L. "The Composition of the Bulk Proteins of Chlorella" [online] Published Jun. 20, 1951. Retrieved fromInternet Jun. 1, 2017: <URL:https://www.ncbi.nlm.nih.gov/pmc/articles/PMC1197660/pdf/biochemj00910-0079.pdf>.
Bolenz, S. et al. "Treatments of Water Hyacinth Tissue to Obtain Useful Products", Biological Wastes, Amsterdam, NL, vol. 33, No. 4, Jan. 1, 1990 {Jan. 1, 1990), pp. 263-274.
Kindel, Paul K. et al. "Solubilization of pectic polysaccharides from the cell walls of Lemna minor and Apium graveolens", Phytochemistry, vol. 41, No. 3, Feb. 1, 1996 {Feb. 1, 1996), GB, pp. 719-723.
Byers, M. "The Amino Acid Composition of Some Leaf Protein Preparations" in IBP Handbook No. 20, Leaf Protein: Its agronomy, Preparation, Quality and Use. 1971, International Biological Programme pp. 95-115.
Kennedy, David "Leaf Concentrate: A Field Guide for Small Scale Programs". Leaf for Life, 1993.
International Search Report and Written Opinion of the International Searching Authority for PCT application No. PCT/ US2016/037046, dated Oct. 27, 2016.
International Search Report and Written Opinion of the International Searching Authority (Korean Intellectual PatentOffice) for International Application No. PCT/US2016/041156, dated Oct. 18, 2016.
Cheng et al., "Growing Duckweed to Recover Nutrients from Wastewaters and for Production of Fuel Ethanol and Animal Feed", Clean, vol. 37, No. 1, pp. 17-26 (2009).

(56) References Cited

OTHER PUBLICATIONS

Office Action, mailed in Japanese Patent Application No. 2018-516396, dated Jun. 2, 2020.
Office Action, mailed in Japanese Patent Application No. 2018-516401, dated Jun. 2, 2020.
International Search Report and Written Opinion of the International Searching Authority for PCT Application No. PCT/US2020/020189, dated Jun. 23, 2020.
Office Action dated Jul. 3, 2020 in Chinese Application No. 201680047237.2.
Office Action dated Jul. 9, 2020 in Japanese Application No. 2018-516402.
Office Action dated Aug. 4, 2020 in Japanese Application No. 2018-506982.
Office Action dated Jun. 24, 2020 in European Application No. 16845295.1.
Office Action dated Jun. 23, 2020 in Japanese Application No. 2018-532531.
Annual Review of Plant Biology, 2005, vol. 56, p. 41-71.
Sogbesan et al, "Utilization of Treated Duckweed Meal (*Lemna pausicostata*) as Plant Protein Supplement in African Mud Catfish (*Clarias gariepinus*) Juvenile Diets", Fisheries and Aquaculture Journal, vol. 6, No. 04, Jul. 12, 2015, p. 1-5, XP055535965.
International Preliminary Report on Patentability by the International Preliminary Examination Authority (Korean Intellectual Patent Office) for International Application No. PCT/US2016/041156, dated Jan. 18, 2018.
Office Action dated Aug. 21, 2020 in Chinese Application No. 201680065224.8.

\* cited by examiner

100

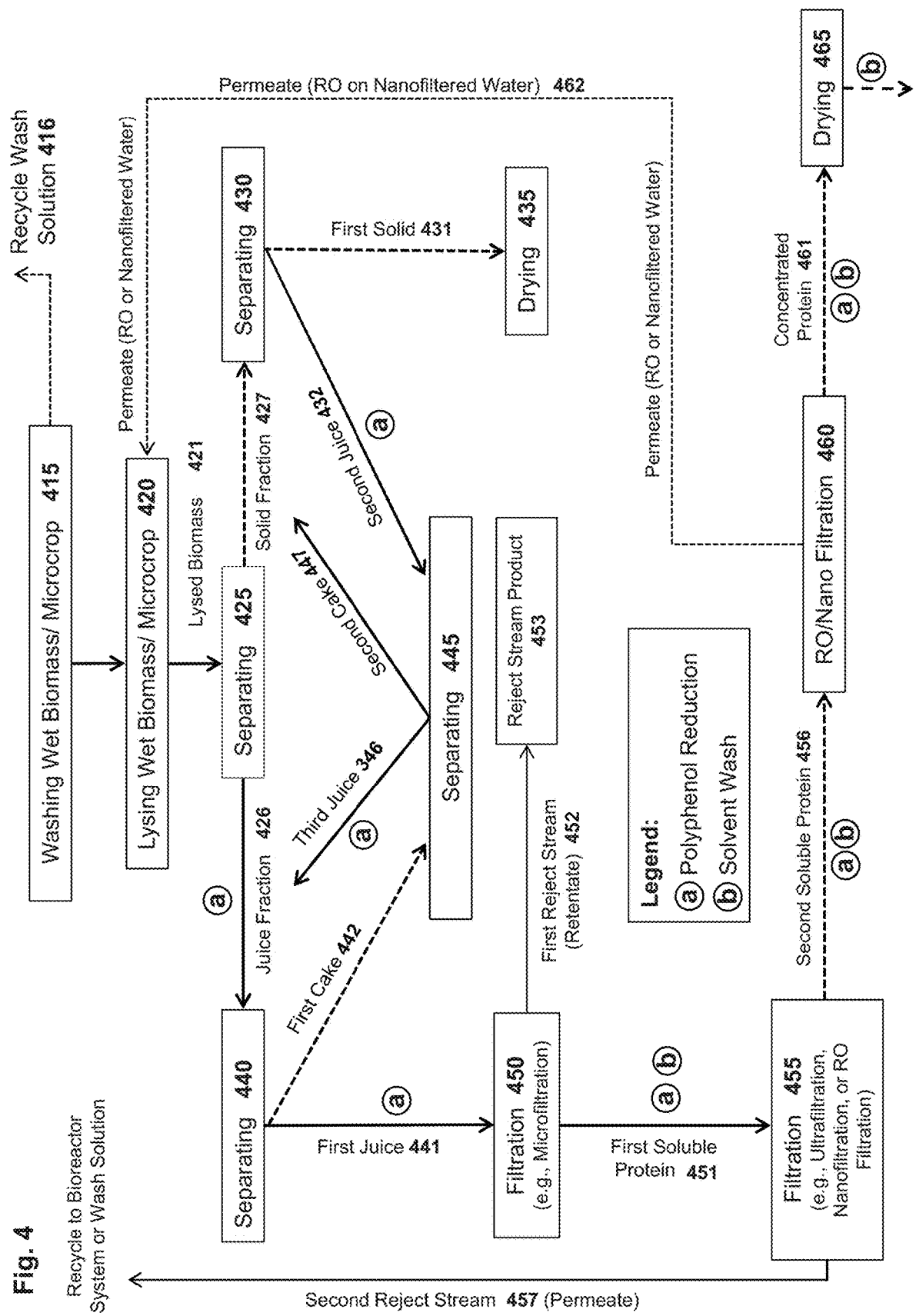

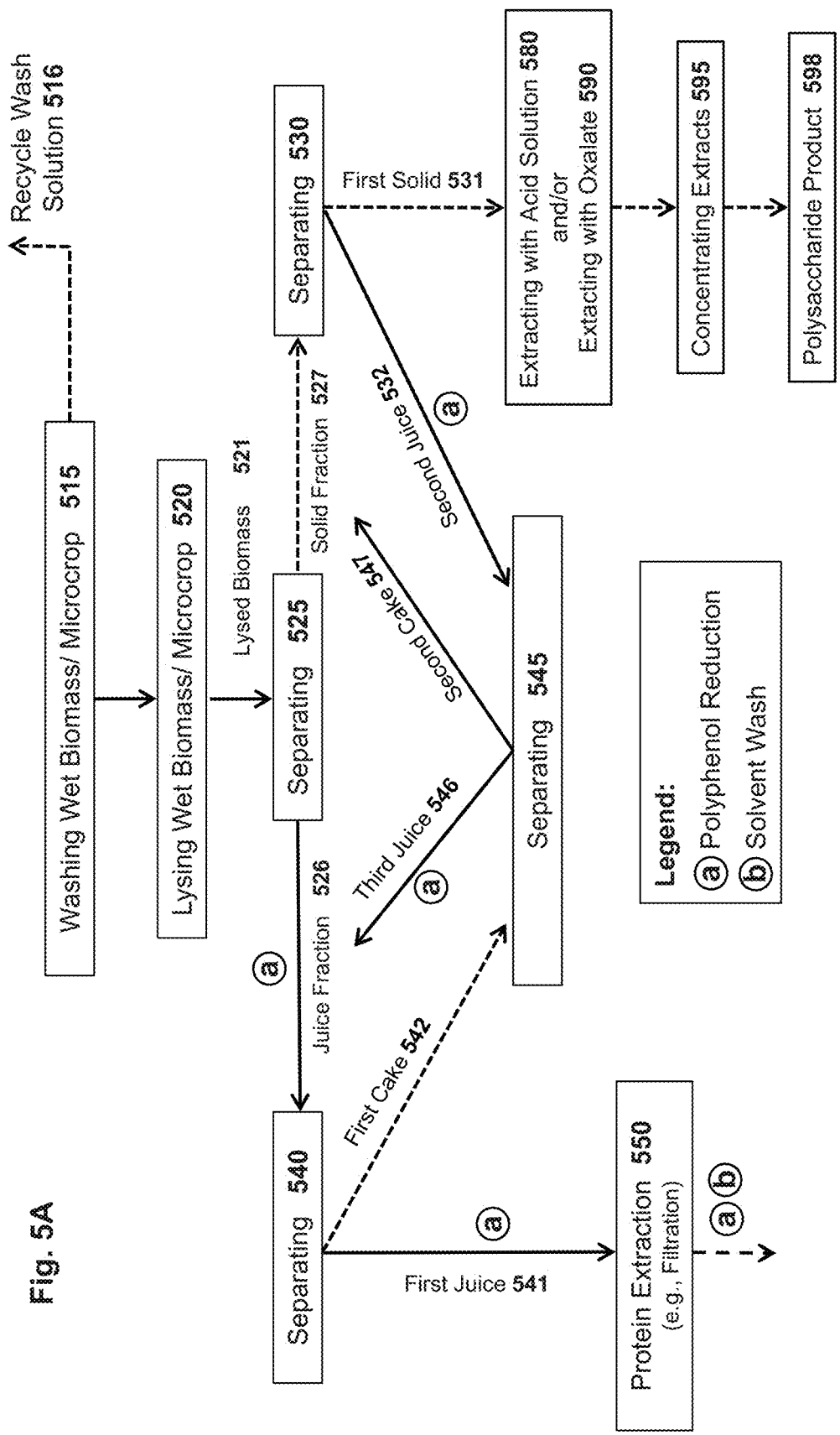

METHODS AND SYSTEMS FOR EXTRACTING A POLYSACCHARIDE PRODUCT FROM A MICROCROP AND COMPOSITIONS THEREOF

CROSS-REFERENCE TO RELATED APPLICATIONS

This application is a U.S. National Stage Entry of International Application No. PCT/2016/041156 lied on Jul. 6, 2016, which claims the benefit of U.S. Provisional Patent Application No. 62/189,040 filed on Jul. 6, 2015 and U.S. Provisional Patent Application No. 62/240,279 filed on Oct. 12, 2015 which are incorporated herein by reference in their entirety as set forth in full.

FIELD OF THE DISCLOSURE

The present disclosure relates, in some embodiments, to methods and systems for extracting a polysaccharide product (e.g., apiogalacturonan, oligogalacturonide, polygalacturonide) from a microcrop (e.g., photosynthetic aquatic species) and compositions thereof.

BACKGROUND OF THE DISCLOSURE

An ever-increasing global population continues to fuel a plethora of sustainability concerns including sufficient and affordable access to carbohydrate sources for human and animal consumption among other uses. Additionally, concerns relating to climate change and fossil fuel consumption continue to drive innovators to develop and improve both carbohydrate sources and extraction efficiency. Moreover, water conservation concerns—particularly in equatorial and arid regions—are a driving factor in identifying suitable processes and sources for the production of carbohydrates.

SUMMARY

Accordingly, a need has arisen for improved methods and systems for the production of carbohydrate-rich products and polysaccharide products. A need has arisen for improved methods and systems for the production of carbohydrate-rich products in a manner requiring decreased water and/or energy expenditures. Additionally, a need has arisen for efficiently producing polysaccharide products comprising polygalacturonides, apiogalacturonan and/or oligogalacturonide.

The present disclosure relates, in some embodiments, to methods and systems for extracting a polysaccharide product (e.g., apiogalacturonan, oligogalacturonide, polygalacturonide) from *Lemna*. In some embodiment, the present disclosure relates to compositions of a polysaccharide product (e.g., apiogalacturonan, oligogalacturonide, polygalacturonide) isolated from a microcrop (e.g., photosynthetic aquatic species).

The present disclosure relates, in some embodiments to a method of treating a biomass comprising a microcrop, the method comprising: (a) lysing the biomass to form a lysed biomass; (b) separating the lysed biomass to generate a juice fraction and a solid fraction; (c) separating the solid fraction to generate a first solid and a second juice; and (d) extracting the first solid with an extraction solution to form a polysaccharide extract. According to some embodiments, an extraction solution may comprise an acid solution, an oxalic acid solution, an oxalate solution, or combinations thereof. A polysaccharide extract may comprise an apiogalacturonan, an oligogalacturonide, a polygalacturonide, or a combination thereof. A polysaccharide extract, according to some embodiments, may comprise at least 30% (w/v) of an apiogalacturonan, an oligogalacturonide, a polygalacturonide, or the combination thereof.

In some embodiments, a method may further comprise concentrating a polysaccharide extract to form a polysaccharide product. A polysaccharide product may comprise an apiogalacturonan, an oligogalacturonide, a polygalacturonide, or a combination thereof. According to some embodiments, concentrating a polysaccharide extract may consist of a process selected from evaporation, precipitation, dialysis, filtration, ultrafiltration, nanofiltration, reverse osmosis filtration, centrifugation, dewatering, and combinations thereof. A polysaccharide product, according to some embodiments, may comprise at least 80% (w/v) of an apiogalacturonan, an oligogalacturonide, a polygalacturonide, or the combination thereof.

In some embodiments, a method of treating a biomass comprising a microcrop may comprise decoloring a biomass. A method, in some embodiments, may comprise concentrating a polysaccharide extract to form a polysaccharide product, the polysaccharide comprising an apiogalacturonan, an oligogalacturonide, a polygalacturonide, or a combination thereof. Concentrating a polysaccharide extract, in some embodiments, may consist of a process selected from evaporation, precipitation, dialysis, filtration, ultrafiltration, nanofiltration, reverse osmosis filtration, centrifugation, dewatering, and combinations thereof. A polysaccharide product, according to some embodiments, may comprise at least 80% (w/v) of an apiogalacturonan, an oligogalacturonide, a polygalacturonide, or the combination thereof.

According to some embodiments, a method may comprise washing a biomass with at least one of a first wash solution, a second wash solution, a third wash solution, or a combination thereof. A method, in some embodiments, may comprise separating a juice fraction to generate a first juice and a first cake, and filtering the first juice to generate a soluble microcrop protein and a reject stream. In some embodiments, a method may comprise (1) separating a first cake; (2) separating a second juice, or (3) separating the first cake and separating the second juice, in each case, to generate a third juice and a second cake; and combining the second cake with a first solid prior to extracting the first solid with an extraction solution to form a polysaccharide extract. According to some embodiments, a method may comprise subjecting a first juice to a polyphenol reduction process to generate a soluble microcrop protein having a reduced concentration of at least one polyphenol. According to some embodiments, a microcrop may be *Lemna*.

According to some embodiments, a polysaccharide product may be produced from a biomass comprising a microcrop by a process comprising: lysing the biomass to form a lysed biomass; separating the lysed biomass to generate a juice fraction and a solid fraction, separating the solid fraction to generate a first solid and a second juice, extracting the first solid with an extraction solution to form a polysaccharide extract, and concentrating the polysaccharide extract to form a polysaccharide product. An extraction solution, in some embodiments, may comprise an acid solution, an oxalic acid solution, an oxalate solution, or combinations thereof. A polysaccharide product may comprise a apiogalacturonan, a oligogalacturonide, a polygalacturonide, or a combination thereof, according to some embodiments. In some embodiments, concentrating a polysaccharide extract may consist of a process selected from evaporation, precipitation, dialysis, filtration, ultrafiltration, nanofiltration, reverse osmosis filtration, centrifugation, dewatering, and combinations thereof. A polysaccharide product, in some embodiments, may comprise at least 80% (w/v) of an apiogalacturonan, an oligogalacturonide, a polygalacturonide, or a combination thereof. In some embodiments, a process may comprise decoloring a biomass. In some embodiments, a microcrop may comprise *Lemna*.

According to some embodiments, a polysaccharide product from a biomass comprising a microcrop, may comprise at least about 85 wt. % of an apiogalacturonan, an oligogalacturonide, a polygalacturonide, or a combination thereof. In some embodiments, a polysaccharide product may comprise a protein content of about 5 wt. % or less. A polysaccharide product, according to some embodiments, may comprise a fat content of lower than about 1 wt. %. According to some embodiments, a polysaccharide product may comprise an ash content of lower than about 10 wt. %.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

Some embodiments of the disclosure may be understood by referring, in part, to the present disclosure and the accompanying drawings, wherein:

FIG. 4 is a flow diagram illustrating a process for continuously producing a protein concentrate and/or carbohydrate rich products from a biomass according to a specific example embodiment of the disclosure;

FIG. 5A is a flow diagram illustrating a process for producing a polysaccharide product (e.g., apiogalacturonan, oligogalacturonide, polygalacturonide) and/or a protein concentrate from a biomass according to a specific example embodiment of the disclosure.

DETAILED DESCRIPTION

Figure 1:
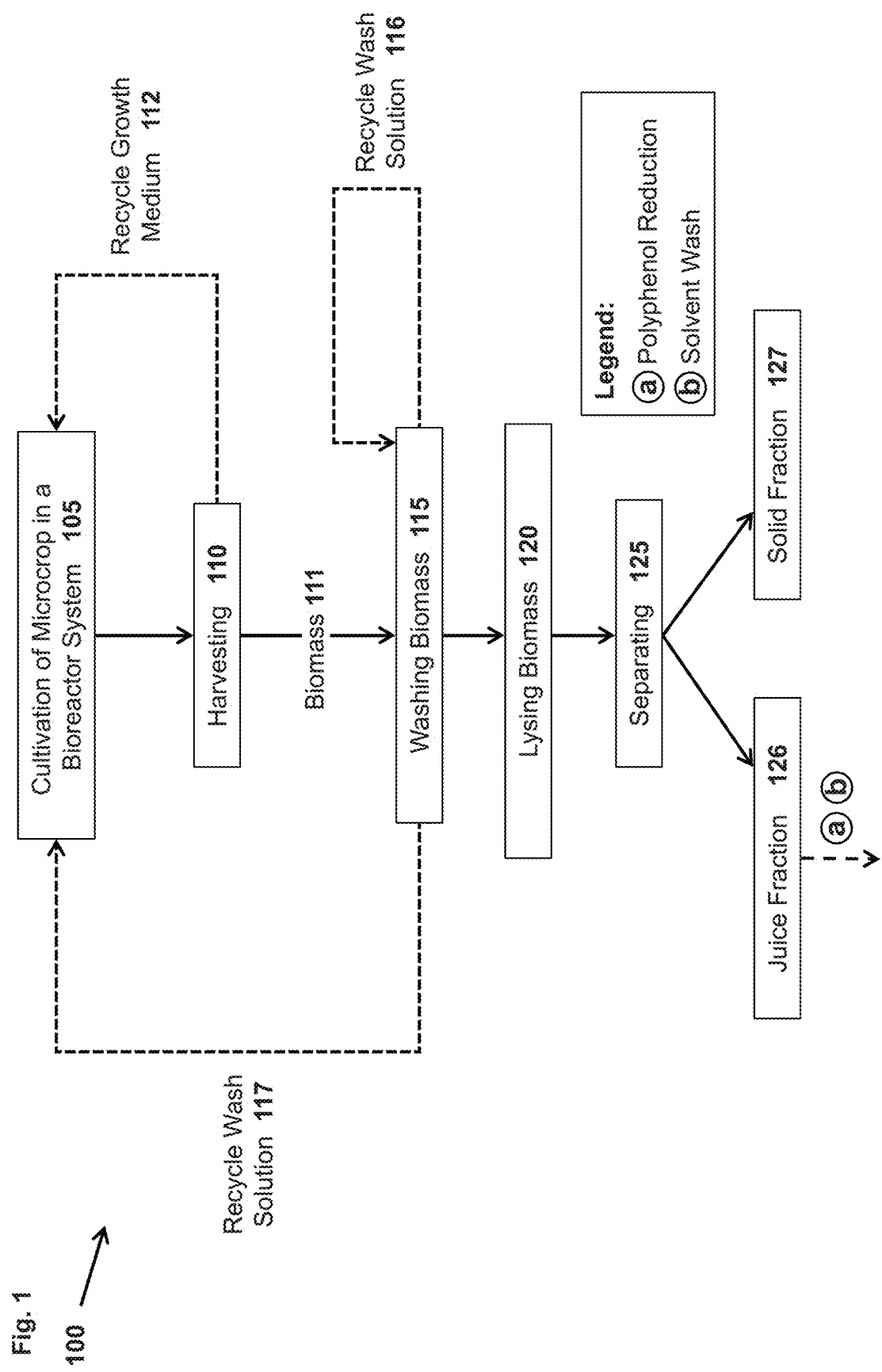
FIG. 1 is a flow diagram illustrating a system for cultivating, harvesting, and processing a microcrop for the production of protein concentrate and/or carbohydrate rich products according to a specific example embodiment of the disclosure.

The present disclosure relates to compositions, systems, and methods for producing a protein concentrate (e.g., soluble protein, dry protein concentrate) and/or carbohydrate rich products and/or a polysaccharide product (e.g., apiogalacturonan, oligogalacturonide, polygalacturonide) from a microcrop (e.g., photosynthetic aquatic species, aquatic plant species, *Lemna*, algal species). For example, a method may comprise growing, harvesting, and/or separating a microcrop (e.g., photosynthetic aquatic species, aquatic plant species, *Lemna*, algal species) for the production of a protein concentrate (e.g., soluble protein, a dry protein concentrate) and/or a carbohydrate rich product and/or a polysaccharide product (e.g., apiogalacturonan, oligogalacturonide, polygalacturonide) according to specific example embodiments of the disclosure. A method may be performed, in some embodiments, in a series of steps, one or more of which may be repeated. For example, a method may comprise a single cycle (e.g., no step is repeated) resulting in the production of protein concentrate (e.g., soluble protein, dry protein concentrate) and/or carbohydrate rich products and/or a polysaccharide product (e.g., apiogalacturonan, oligogalacturonide, polygalacturonide). In some embodiments, a method may comprise multiple cycles (e.g., first portion, second portion) or a continuous process for the production of protein concentrate (e.g., soluble protein, dry protein concentrate) and/or carbohydrate rich products and/or a polysaccharide product (e.g., apiogalacturonan, oligogalacturonide, polygalacturonide) such that products, intermediates and/or byproducts of an earlier cycle of the process may be recycled into one or more subsequent cycles of the process.

Microcrop

In some embodiments, a microcrop may comprise a single aquatic species including, for example, a single photosynthetic aquatic species (e.g., *Lemna* species, *Salvinia* species). A microcrop may include species of *Lemna* (e.g., duckweed), *Spirodela*, *Landoltia*, *Wolfiella*, *Salvinia* (e.g., floating fern), *Wolffia* (e.g., watermeal), *Azolla* (e.g., mosquito fern), *Pistia* (e.g., water lettuce), or any combination thereof. According to some embodiments, a microcrop may be a species of *Lemna*, for example, *Lemna minor*, *Lemna obscura*, *Lemna minuta*, *Lemna gibba*, *Lemna valdiviana*, or *Lemna aequinoctialis*. A microcrop may comprise, according to some embodiments, a combination of two or more types of aquatic specie including, for example, a combination of two or more types of photosynthetic aquatic species. In some embodiments, a microcrop may be selected from a local photosynthetic aquatic species based on identified compositional and growth characteristics that have developed within the local environmental conditions. Local species may out-compete other species in open ponds or bioreactors based on their adaptation to the local environmental conditions. A microcrop, in some embodiments, may be adjusted in response to seasonal variations in temperature and light availability.

A microcrop may have characteristics that are advantageous in comparison to other aquatic species (e.g., rapid growth rate; reduced nutritional requirements; ease of harvesting and/or processing; enhanced amino acid profile; enhanced palatability; reduced evapotranspiration rate; increased protein composition).

For example, *Lemna* is a genus of free-floating aquatic plants from the Lemnaceae family (e.g., duckweed) that grow rapidly. *Lemna* protein has an essential amino acid profile that more closely resembles animal protein than most other plant proteins. Table 1 shows a typical essential amino acid compositional profile of *Lemna* protein. Additionally, *Lemna* provides high protein yields, with freshly harvested *Lemna* containing up to about 43% protein by dry weight.

Furthermore, compared with most other plants, *Lemna* leaves have a low fiber content (e.g., about 5% to about 15% in dry matter) and are highly digestible, even for monogastric animals. This contrasts with the compositions of many crop species (e.g., soy beans, rice, maize) which have fiber contents of approximately 50% and low digestibility.

TABLE 1

Essential Amino Acid Profile of Lemna Protein Concentration

| Essential Amino Acid | Protein (g/100 g) |
|---|---|
| Lysine | 5.9 |
| Leucine | 9.7 |
| Isoleucine | 5.1 |
| Methionine | 2.4 |
| Phenylalanine | 6.3 |
| Threonine | 4.4 |
| Tryptophan | 2.0 |
| Valine | 6.3 |
| Histidine | 2.7 |
| Arginine* | 6.8 |

*Conditionally essential amino acid

Cultivation of a Microcrop

In some embodiments a microcrop may be asexually propagated (e.g., cultivated) by contacting the microcrop with an aqueous nutrient composition under conditions that permit expansion. A microcrop may be cultivated in a bioreactor system, according to some embodiments. A bioreactor system may contain a growth medium. In some embodiments a growth medium may comprise water and/or a nutrient composition. A growth medium (e.g., water) may be provided in and/or added to a bioreactor (e.g., a pond) and may be maintained at a desired set-point level (e.g., specific volume), according to some embodiments. A bioreactor system, in some embodiments, may be configured to collect rainfall and/or to intake water from a source of ground, surface, or recycled water (e.g., storm water, recycled water) or any other suitable water source. According to some embodiments, a bioreactor system may further comprise an additional storage container (e.g., container or pond) for excess growth medium. A bioreactor system may be configured to insert additional nutrients (e.g., nitrogen, phosphorus, potassium) or gases (e.g., oxygen; carbon dioxide) at specified time indicators or in response to sensor readings. In some embodiments, one or more smaller bioreactors (e.g., pond) may be designed and sized to adequately serve as "feeder" bioreactors to a larger bioreactor. Smaller bioreactors, in some embodiments, may be first inoculated and grown to high density at which point they may optimally seed a larger bioreactor in a manner that supports faster growth.

In some embodiments, a bioreactor system may comprise a monitoring system. A monitoring system may be configured to display and/or provide one or more user alerts regarding bioreactor condition(s) (e.g., nutrient concentrations, pH, dissolved oxygen levels, growth medium levels, microcrop distribution, flow rate, temperature) and/or adjust operating conditions (e.g., growth medium flow rate and/or timing and/or quantity of nutrient addition; "feeder" microcrop addition; oxygen or carbon dioxide addition), in some embodiments. Adjustments may be made continuously, semi-continuously, periodically, intermittently, as needed, at set or variable times, or any other interval. In some embodiments, adjustments may be selected to optimize growth rates and/or yield of the aquatic species. For example, a microcrop species may be grown in large-scale, open bioreactors with monitoring systems configured to adjust the introduction of materials (e.g., fresh or recycled water, fresh or recycled growth media) based on, for example, exposure to light, which may thereby regulate nutrient consumption rates.

A bioreactor system may comprise, in some embodiments, a single container in which a microcrop may be cultivated. In some embodiments, the bioreactor system may comprise multiple cultivation containers that may be connected, partially connected, or disconnected. A bioreactor (e.g., a pond), in some embodiments, may be an earthen basin with at least one embankment (e.g., made of compacted dirt removed from the interior bottom of the bioreactor). According to some embodiments the bioreactor may be an artificial container (e.g., metal, plastic, resin). A bioreactor system may comprise an open bioreactor, a closed bioreactor, a semi-open bioreactor, or any combination thereof. In some embodiments, a bioreactor system may be configured to divide the container(s) into channels or cells. A bioreactor system may be configured to permit a flow of growth medium, in some embodiments. A bioreactor system, in some embodiments, may include a propulsion system (e.g., paddle wheels, bubbling, submerged or surface water jets, submerged mixers) and/or a recirculation system. In some embodiments, a bioreactor system may be configured to adjust a flow rate of a growth medium (e.g., to redistribute nutrient concentrations or microcrop growth patterns).

In some embodiments a bioreactor system may be open (e.g., in a horizontal plane relative to the ground) such that a growth medium contained within a bioreactor container (e.g., a serpentine raceway) and/or a microcrop growing on a top surface of the growth medium may be exposed to a wind initiating from an exterior of the bioreactor container. A bioreactor system, according to some embodiments, may be partially open (e.g., in a horizontal plane relative to the ground) with at least 90% or at least 80%, or at least 70%, or at least 60%, or at least 50%, or at least 40%, or at least 30%, or at least 20%, or at least 10% of the top surface of the contained culture media being open. A top surface may be open, according to some embodiments, where the surface is substantially free (e.g., free) of any covering or other barrier, where the surface is directly exposed to ambient weather conditions, where there is substantially no membrane, glass, cover or other barrier (whether or not such barrier has pores or apertures) between the surface and the atmosphere, and/or where ambient atmosphere is the only occupant of the space immediately and directly above the surface for a distance of at least about 1 meter above the surface.

A bioreactor system, in some embodiments, may monitor and adjust a thickness and distribution of a microcrop mat. For example, when a microcrop reaches a specified thickness or distribution a bioreactor system may initiate harvest procedures. In some embodiments, a minimum thickness of a microcrop may be maintained such that a desired evapotranspiration rate of a growth medium within a bioreactor system may be maintained. A minimum thickness of a microcrop may be maintained, in some embodiments, such that less sunlight is capable of penetrating a surface of a growth medium (i.e., reducing a growth potential of submerged aquatic species such as algae).

Harvesting of a Microcrop

A microcrop may be harvested in whole or in part at any desired time(s). For example, a microcrop may be harvested at one or more specific times, at regular or irregular intervals and/or continuously. Selection of harvest time(s) and/or intervals may be based on environmental conditions (e.g., precipitation, relative humidity, temperature range, average, low or high threshold and/or light intensity, wavelength range, duration of exposure) and/or the microcrop exhibiting one or more desired characteristics (e.g., mat thickness, mat distribution, maturation). Harvesting a microcrop may be manual or automated. In some embodiments, an automated skimmer system may collect a microcrop from a bioreactor system and transfer a harvested microcrop (e.g., via a pumping system) onto an inclined vibrating screen to separate a biomass from growth medium and debris. A microcrop, in some embodiments, may be harvested by vacuum skimming the microcrop from a bioreactor system through a stationary or mobile screen filter. According to some embodiments, a biomass slurry, including a harvested microcrop (e.g., *Lemna*) and a growth medium (e.g., water), may be conveyed to an inclined vibrating screen where a biomass (e.g., microcrop) may be separated from the growth medium.

During harvesting, a separated growth medium may be recycled back into a bioreactor system or to an additional storage container (e.g., container or pond), according to some embodiments. In some embodiments, at least about 40%, or at least about 50%, or at least about 60%, or at least about 70%, or at least about 80%, or at least about 90%, or at least about 95% of a growth medium (e.g., water) separated from a biomass may be recycled for further use in cultivating, harvesting, and/or processing a microcrop.

Decoloring a Biomass

According to some embodiments, processing a microcrop or biomass (e.g., first portion, second portion) may include a decoloring procedure to remove at least some of a chlorophyll component of the microcrop or biomass. Decoloring a biomass may increase purity of a protein product and/or a polysaccharide product (e.g., apiogalacturonan, oligogalacturonide, polygalacturonide). In some embodiments, decoloring a biomass may reduce a fat content of a protein concentrate (e.g., soluble protein, dry protein concentrate) and/or carbohydrate rich products and/or a polysaccharide product (e.g., apiogalacturonan, oligogalacturonide, polygalacturonide).

Decoloring a biomass, in some embodiments, may comprise blanching a biomass at a temperature of about 70° C., or about 75° C., or about 80° C., or about 85° C., or about 90° C., or about 95° C., or about 100° C. for about 1 min., or about 3 min., or about 5 min., or about 7 min., or about 10 min., or about 15 min., or about 20 min., or about 25 min., or about 30 min., or about 35 min., or about 40 min., or about 45 min., or about 50 min., or about 55 min., or about 1 hour. In some embodiment, decoloring a biomass may comprise exposing (e.g., submerging, spraying, dripping) at least one surface of a biomass to a solvent solution (e.g., ethanol, methanol, acetone, hexane, dichloromethane, propanol, isopropanol, glycerol). A solvent solution, in some embodiments, may be combined with a biomass (e.g., first portion, second portion) to form a slurry. In some embodiments a solvent solution may include one or more alcohols (e.g., ethanol, methanol, propanol, isopropanol, glycerol), acetone, hexane, or ketones. A solvent solution may comprise at least about 10% (v/v), or at least about 20% (v/v), or at least about 30% (v/v), or at least about 40% (v/v), or at least about 50% (v/v), or at least about 60% (v/v), or at least about 70% (v/v), or at least about 80% (v/v), or at least about 90% (v/v) of one or more alcohols (e.g., ethanol, methanol), acetone, hexane, or ketones, or any combination thereof. According to some embodiments, a decoloring procedure may include exposing (e.g., submerging, spraying, dripping, slurry) at least one surface of a biomass to a solvent solution for at least: about 5 sec., or about 15 sec., or about 30 sec., or about 45 sec., or about 1 min., or about 2 min., or about 3 min., or about 5 min., or about 10 min., or about 20 min., or about 30 min., or about 40 min., or about 50 min., or about 1 hour, or about 2 hours, or about 3 hours, or about 4 hours, or about 5 hours, or about 6 hours, or about 12 hours, or about 24 hours. A decoloring procedure, in some embodiments, may include moving (e.g., agitating, stirring, propelling) at least a portion of a solvent solution at a specified time, or intermittently, or continually.

Washing a Biomass

In some embodiments, processing a microcrop or biomass (e.g., first portion, second portion) may include a wash procedure to remove excess growth medium, a solvent solution, debris, contaminants, microorganisms, and/or toxins. Washing a biomass may increase a purity and/or yield of a protein product and/or a polysaccharide product (e.g., apiogalacturonan, oligogalacturonide, polygalacturonide). A wash procedure may disinfect and/or disinfest a biomass, reducing or removing bacteria, fungi, viruses, insects, and any combination thereof which are on or around the surfaces of the biomass. In some embodiments a wash procedure may be performed by exposing (e.g., submerging, spraying) at least one surface of a biomass to a wash solution (e.g., water, growth medium, antimicrobial solution). A wash solution, in some embodiments, may be combined with a biomass (e.g., first portion, second portion) to form a slurry.

In some embodiments, a wash solution may comprise any desired portion of recycled fluid. For example, a wash solution may comprise at least about 10% (v/v), or at least about 20% (v/v), or at least about 30% (v/v), or at least about 40% (v/v), or at least about 50% (v/v), or at least about 60% (v/v), or at least about 70% (v/v), or at least about 80% (v/v), or at least about 90% (v/v) fluid recycled from another stage of the process (e.g., recycled wash solution FIG. 1, 116; a reject stream from filtration (e.g., FIG. 2A, 252; FIG. 4, 452, 457)). In some embodiments a wash solution may be an aqueous solution or solvent. A wash solution, according to some embodiments, may contain one or more antimicrobials, de-infestation compounds, fatty acids, alcohols, chlorine, oxidizing compounds, and any combination thereof (e.g., ozonated water).

According to some embodiments a wash solution may be applied at an elevated temperature and/or high pressure. A wash solution, in some embodiments, may remain in contact with a biomass for at least about 1 second, or for at least about 5 seconds, or for at least about 10 seconds, or for at least about 20 seconds, or for at least about 30 seconds, or for at least about 1 minute, or for at least about 5 minutes. In some embodiments, a second wash solution (e.g., water, ozonated water, a recycled wash solution (FIG. 1, 116)) may be applied to a biomass. A third wash solution (e.g., water, ozonated water, recycled wash solution) may be applied to a biomass, in some embodiments. A composition of a first wash solution, a second wash solution, and a third wash solution may be the same or different from one another. In some embodiments a first wash solution may be or may comprise a reject stream from a filtration process (e.g., FIG. 2A, 252; FIG. 4, 452, 457), a second wash solution may be water, and a third wash solution may be ozonated water. Some or all of a wash solution (e.g., a first, second, and/or third wash solution), in some embodiments, may be separated from a biomass (e.g., using an inclined screen or vibratory screen).

In some embodiments, some or all of a wash solution, a first wash solution, a second wash solution, and/or third wash solution may be collected and reused/recycled (e.g., FIG. 1, 116/117). At least about 40%, or at least about 50%, or at least about 60%, or at least about 70%, or at least about 80%, or at least about 90%, or at least about 95% of a wash solution, a first wash solution, a second wash solution, and/or third wash solution (e.g., water) separated from the biomass may be recycled for future use (e.g., recycled wash solution (FIG. 1, 116), used as growth medium in the bioreactor system (FIG. 1, 117)), according to some embodiments.

A wash solution, a first wash solution, a second wash solution, and/or third wash solution, in some embodiments, may have or may be adjusted to have any desired pH. For example, the pH of a wash solution, a second wash solution, and/or a third wash solution may be neutral or basic (e.g., about 7.0, or about 7.5, or about 8.0, or about 8.5, or about 9.0, or about 9.5, or about 10.0). According to some embodiments, the pH of a wash solution, a first wash solution, a second wash solution, and/or a third wash solution may be from about 7.0 to about 7.5, or from about 7.5 to about 8.0, or from about 8.0 to about 8.5, or from about 8.5 to about 9.0, or from about 9.0 to about 9.5, or from about 9.5 to about 10.0. The pH of a wash solution, a first wash solution, a second wash solution, and/or a third wash solution may be from about 7.0 to about 10.0, or from about 7.0 to about 9.5, or from about 7.0 to about 9.0, or from about 7.0 to about 8.5, or from about 7.0 to about 8.0, or from about 7.0 to about 7.5, in some embodiments.

A wash solution (e.g., a first, second, and/or third wash solution) may have a temperature below room temperature (e.g., about 12° C.) at the time of use. Cooling a wash solution, and thereby a microcrop, may improve product recovery efficiency and/or decrease proteolytic activity of product-degrading enzymes. In some embodiments, a wash solution (e.g., a first, a second, and/or a third wash solution) may have a temperature below about 30° C., or below about 20° C., or below about 15° C., or below about 10° C., or below about 5° C., or below about 2° C., or below about 1° C., or below about 0° C. at the time of use. A wash solution (e.g., a first, second, and/or third wash solution) may have a temperature at the time of use between about 0° C. and about 10° C., or between about 5° C. and about 15° C., or between about 10° C. and about 20° C., or 15° C. and about 25° C., or between about 20° C. and about 30° C., in some embodiments.

In some embodiments, a wash solution (e.g., a first, a second, and/or a third wash solution) may have a temperature above room temperature (e.g., about 50° C.) at the time of use. Heating a wash solution, and thereby a microcrop, may improve product recovery efficiency, decrease activity of product-degrading enzymes (e.g., denature proteolytic enzymes), and/or decrease microbial contamination (e.g., pasteurization). In some embodiments, a wash solution (e.g., a first, a second, and/or a third wash solution) at the time of use may have a temperature above about 20° C., or above about 25° C., or above about 30° C., or above about 35° C., or above about 40° C., or above about 45° C., or above about 50° C., or above about 55° C., or above about 60° C., or above about 65° C., or above about 70° C., or above about 75° C., or above about 80° C., or above about 85° C., or above about 90° C., or above about 95° C., or above about 100° C. A wash solution (e.g., a first, a second, and/or a third wash solution) at the time of use may have a temperature between about 40° C. and about 50° C., or between about 45° C. and about 55° C., or between about 50° C. and about 60° C., in some embodiments. According to some embodiments, a wash solution (e.g., a first, second, and/or third wash solution) at the time of use may have a temperature between about 75° C. and about 80° C., or between about 80° C. and about 85° C., or between about 85° C. and about 90° C., or between about 90° C. and about 95° C., or between about 95° C. and about 100° C. In some embodiments, a wash solution (e.g., a first, second, and/or third wash solution) may have a temperature between about 50° C. and about 80° C., or between about 55° C. and about 85° C., or between about 60° C. and about 90° C., or between about 65° C. and about 95° C., or between about 70° C. and about 100° C. at the time of use.

Lysing a Biomass

According to some embodiments a biomass (e.g., washed or un-washed) may be lysed to form a lysed biomass (e.g., first portion, second portion). As used herein, lysing may include mechanical, chemical, and/or ultrasonic (e.g., sonication) procedures that disturb the organization of the organism on the level of individual cells or multicellular structures. Lysing may include, in some embodiments, rendering carbohydrates, proteins, and micronutrients present in a microcrop more available for downstream processing to purified protein, carbohydrate-containing materials, and/or micronutrient-containing fluids. According to some embodiments, lysing may be achieved using a combination of mechanical, chemical, and/or ultrasonic (e.g., sonication) methods.

In some embodiments, lysing may be performed at temperatures below room temperature. Lysing a microcrop at a lower temperature may improve yields, for example, by limiting or decreasing undesired enzymatic activity (e.g., proteolytic activity). Lysing may be performed, in some embodiments, at a temperature below about 30° C., or below about 20° C., or below about 15° C., or below about 10° C., or below about 5° C., or below about 2° C., or below about 1° C., or below about 0° C.

A lysing fluid (e.g., water, recycled water, reverse osmosis water) may be added to a biomass, washed or unwashed, before or during lysing according to some embodiments. For example, at least about 10%, or at least about 20%, or at least about 30%, or at least about 40%, or at least about 50%, or at least about 60%, or at least about 70%, or at least about 80%, or at least about 90% of lysing fluid may be water generated as the result of reverse osmosis/nanofiltration of a filtration product (e.g., FIG. 3, 362; FIG. 4, 462). In some embodiments a lysing fluid may be at a temperature below about 30° C., or below about 20° C., or below about 15° C., or below about 10° C., or below about 5° C., or below about 2° C., or below about 1° C., or below about 0° C. A lysing fluid, in some embodiments, may include buffers, protease inhibitors, anti-microbial agents, chelators (e.g., EDTA), reducing agents, or any combination thereof.

According to some embodiments, lysing may be performed at temperatures above room temperature (e.g., about 40° C.), for example, to enhance cellulosic breakdown and/or denature undesired enzymes (e.g., proteolytic enzymes). Lysing may be performed at a temperature above about 30° C., or above about 35° C., or above about 37° C., or above about 40° C., in some embodiments.

In some embodiments, a lysing fluid may have or may be adjusted to have any desired pH. For example, a lysing fluid may have a neutral or basic pH (e.g., about 7.0, or about 7.5, or about 8.0, or about 8.5, or about 9.0, or about 9.5, or about 10.0). According to some embodiments, a lysing fluid may have a pH of from about 7.0 to about 7.5, or from about 7.5 to about 8.0, or from about 8.0 to about 8.5, or from about 8.5 to about 9.0, or from about 9.0 to about 9.5, or from about 9.5 to about 10.0. The pH of a lysing fluid may be from about 7.0 to about 10.0, or from about 7.0 to about 9.5, or from about 7.0 to about 9.0, or from about 7.0 to about 8.5, or from about 7.0 to about 8.0, or from about 7.0 to about 7.5, in some embodiments.

Lysing may be performed with a biomass having any desired pH. For example, a biomass may have or may be adjusted to have a neutral or basic pH (e.g., about 7.0, or about 7.5, or about 8.0, or about 8.5, or about 9.0, or about 9.5, or about 10.0). According to some embodiments, lysing may be performed with a biomass having a pH from about 7.0 to about 7.5, or from about 7.5 to about 8.0, or from about 8.0 to about 8.5, or from about 8.5 to about 9.0, or from about 9.0 to about 9.5, or from about 9.5 to about 10.0. In some embodiments, lysing may be performed with a biomass having a pH from about 7.0 to about 10.0, or from about 7.0 to about 9.5, or from about 7.0 to about 9.0, or from about 7.0 to about 8.5, or from about 7.0 to about 8.0, or from about 7.0 to about 7.5, in some embodiments. Adjusting or maintaining a pH value of a biomass prior to or during a lysing procedure may increase protein yield (e.g., increased protein solubility).

Lysing may include, for example, chopping, shredding, smashing, pressing, tearing, ultrasonic treatment (e.g., sonication), lysis by osmotic pressure, chemical treatments that degrade biological structures, or any combination thereof. In some embodiments, lysing is achieved in a mechanical way (also referred to as milling), for example, by milling, grinding, or shredding a biomass to generate a lysed biomass. A lysing process may be achieved using, for example, a shear mill, a ball mill, a colloid mill, a knife mill, a hammer mill, a grinding mill, a puree machine, a filter press, a mechanical press, or any combination thereof.

In some embodiments, entry into or exit from a lysing (e.g., milling) process may be metered at any desired volume, mass, or other rate or interval (e.g., a constant rate, a variable rate, continuously, semi-continuously, periodically, intermittently). A feed rate and/or mode may be determined based on considerations including, for example: a target production rate; apparatus(es) employed in a process; properties of a feedstock, or any combination thereof. A feed rate, in some embodiments, may be at least about 10 kg/hour, or at least about 50 kg/hour, or at least about 100 kg/hour, or at least about 200 kg/hour, or at least about 300 kg/hour, or at least about 400 kg/hour, or at least about 500 kg/hour, or at least about 600 kg/hour, or at least about 700 kg/hour, or at least about 800 kg/hour, or at least about 900 kg/hour, or at least about 1000 kg/hour, or at least about 1200 kg/hour, or at least about 1400 kg/hour, or at least about 1600 kg/hour, or at least about 1800 kg/hour, or at least about 2000 kg/hour, or at least about 2200 kg/hour. In some embodiments, the feeding rate is from about 10 kg/hour to about 200 kg/hour, or from about 200 kg/hour to about 400 kg/hour, or from about 400 kg/hour to about 600 kg/hour, or from about 600 kg/hour to about 800 kg/hour, or from about 800 kg/hour to about 1000 kg/hour, or from about 1000 kg/hour to about 1200 kg/hour, or from about 1200 kg/hour to about 1400 kg/hour, or from about 1400 kg/hour to about 1600 kg/hour, or from about 1600 kg/hour to about 1800 kg/hour, or from about 1800 kg/hour to about 2000 kg/hour, or from about 2000 kg/hour to about 2200 kg/hour.

Chemical methods may be employed, in some embodiments, (e.g., alone or in combination with mechanical methods) to lyse a biomass or washed biomass. According to some embodiments, an amphiphilic compound (e.g., detergent) may be employed to lyse a biomass or a washed biomass. In some embodiments, an amphiphilic chemical compound may comprise lecithin. Enzymes (e.g., cellulase) may be used, in some embodiments to breakdown or assist in breakdown of cellular structures. According to some embodiments, sonication may be performed to breakdown or assist in breakdown of cellular structures, for example, by a sonicator. In some embodiments, manual grinding may be employed to lyse a biomass or a washed biomass. According to some embodiments, a freeze-thaw method may be employed to lyse a biomass or a washed biomass, wherein iterative cycles of freezing and thawing may disrupt cells. In some embodiments lysing may be performed, for example, by changing the pH value of a biomass (e.g., harvested microcrop). The pH value, in some embodiments, may be raised to higher than about 7.0, or higher than about 7.5, or higher than about 8.0, or higher than about 8.5, or higher than about 9.0, or higher than about 9.5, or higher than about 10.0. According to some embodiments, the pH value of a biomass may be maintained from about 7.0 to about 7.5, or from about 7.5 to about 8.0, or from about 8.0 to about 8.5, or from about 8.5 to about 9.0, or from about 9.0 to about 9.5, or from about 9.5 to about 10.0. The pH value of a biomass may be maintained from about 7.0 to about 14.0, or from about 7.0 to about 13.0, or from about 7.0 to about 12.0, or from about 7.0 to about 11.0, or from about 7.0 to about 10.0, or from about 7.0 to about 10.5, or from about 7.0 to about 10.0, or from about 7.0 to about 9.5, or from about 7.0 to about 9.0, or from about 7.0 to about 8.5, or from about 7.0 to about 8.0, or from about 7.0 to about 7.5, in some embodiments. In some embodiments the pH value may be lowered to below about 7.0, or below about 6.5, or below about 6.0, or below about 5.5, or below about 5.0, or below about 4.5, or below about 4.0, or below about 3.5, or below about 3.0. The pH value of a biomass, in some embodiments, may be maintained from about 3.0 to about 3.5, or from about 3.5 to about 4.0, or from about 4.0 to about 4.5, or from about 4.5 to about 5.0, or from about 5.0 to about 5.5, or from about 5.5 to about 6.0, or from about 6.0 to about 6.5, or from about 6.5 to about 7.0. The pH value of a biomass may be maintained from about 3.0 to about 7.0, or from about 3.5 to about 7.0, or from about 4.0 to about 7.0, or from about 4.5 to about 7.0, or from about 5.0 to about 7.0, or about 50 from about 5.5 to about 7.0, or from about 6.0 to about 7.0, or from about 6.5 to about 7.0, according to some embodiments.

In some embodiments, a lysed biomass (e.g., a mechanically lysed biomass, a chemically lysed biomass) may pass to the next step or procedure for isolating protein and/or other product(s) with or without neutralization. For example, a lysed biomass may be fed directly to the next procedure or it may be first pH-adjusted (e.g., neutralized). Precipitating agents (e.g., salts) may be added, in some embodiments, to a lysed microcrop to precipitate dissolved compounds.

A lysed biomass (e.g., first portion, second portion) may be at a temperature below room temperature (e.g., about 12° C.), in some embodiments. Cooling a lysed biomass may improve protein recovery efficiency and/or decrease proteolytic activity. A lysed biomass, in some embodiments, may have a temperature below about 30° C., or below about 20° C., or below about 15° C., or below about 10° C., or below about 5° C., or below about 2° C., or below about 1° C., or below about 0° C. at the time of use. According to some embodiments, a lysed biomass may have a temperature between about 0° C. and about 10° C., or between about 5° C. and about 15° C., or between about 10° C. and about 20° C., or between about 15° C. and about 25° C., or between about 20° C. and about 30° C. at the time of use.

In some embodiments, a lysed biomass (e.g., first portion, second portion) may have a temperature above room temperature (e.g., about 50° C.) at the time of use. Heating a lysed biomass may improve protein recovery efficiency, decrease proteolytic activity (e.g., denature proteolytic enzymes), and/or decrease microbial contamination (e.g., pasteurization). In some embodiments, a lysed biomass may have a temperature above about 20° C., or above about 25° C., or above about 30° C., or above about 35° C., or above about 40° C., or above about 45° C., or above about 50° C., or above about 55° C., or above about 60° C., or above about 65° C., or above about 70° C., or above about 75° C., or above about 80° C., or above about 85° C., or above about 90° C. at the time of use. A lysed biomass may have a temperature between about 40° C. and about 50° C., or between about 45° C. and about 55° C., or between about 50° C. and about 60° C., or between about 75° C. and about 80° C., or between about 80° C. and about 85° C. at the time of use, in some embodiments.

Separating a Biomass

A biomass (e.g., *Lemna*), washed biomass, lysed biomass, or any combination thereof may be separated to generate a juice fraction and a solid fraction. A juice fraction (e.g., first portion, second portion) may include a protein-rich liquid and/or at least about some solid particles (e.g., carbohydrates, fiber). A solid fraction (e.g., first portion, second portion) may include a polysaccharide product (e.g., apiogalacturonan, oligogalacturonide, polygalacturonide). In some embodiments a biomass (e.g., washed, lysed) may be diluted with a dilution fluid (e.g., water, recycled water, reverse osmosis water) prior to separation.

A dilution fluid may be at a temperature below room temperature (e.g., about 12° C.), in some embodiments. Cooling a dilution fluid may improve protein recovery efficiency and/or decrease proteolytic activity. A dilution fluid, in some embodiments, may have a temperature below about 30° C., or below about 20° C., or below about 15° C., or below about 10° C., or below about 5° C., or below about 2° C., or below about 1° C., or below about 0° C. at the time of use. According to some embodiments, a dilution fluid may have a temperature between about 0° C. and about 10° C., or between about 5° C. and about 15° C., or between about 10° C. and about 20° C., or between about 15° C. and about 25° C., or between about 20° C. and about 30° C. at the time of use.

In some embodiments, a dilution fluid may have a temperature above room temperature (e.g., about 50° C.) at the time of use. Heating a dilution fluid may improve protein recovery efficiency, decrease proteolytic activity (e.g., denature proteolytic enzymes), and/or decrease microbial contamination (e.g., pasteurization). In some embodiments, a dilution fluid may have a temperature above about 20° C., or above about 25° C., or above about 30° C., or above about 35° C., or above about 40° C., or above about 45° C., or above about 50° C., or above about 55° C., or above about 60° C., or above about 65° C., or above about 70° C., or above about 75° C., or above about 80° C., or above about 85° C., or above about 90° C. at the time of use. A dilution fluid may have a temperature between about 40° C. and about 50° C., or between about 45° C. and about 55° C., or between about 50° C. and about 60° C. at the time of use, in some embodiments. According to some embodiments, a dilution fluid may have a temperature between about 75° C. and about 80° C., or between about 80° C. and about 85° C. at the time of use.

A dilution fluid, in some embodiments, may include buffers, protease inhibitors, anti-microbial agents, chelators (e.g., EDTA), reducing agents, or any combination thereof.

In some embodiments a lysed biomass or diluted lysed biomass may be sonicated prior to separation. Sonication may increase protein yield.

Separating a biomass (e.g., washed, lysed) to form a juice fraction and a solid fraction may involve pressing (e.g., belt press, filter press), centrifugation, filtration, pressurized filtration, or any combination thereof. Interchangeable unit operations for separating a biomass (e.g., harvested microcrop), washed biomass, and/or lysed biomass include, for example, a decanter centrifuge, a belt press, a fan press, a rotary press, a screw press, a filter press, a finisher press, or any combination thereof.

In some embodiments, a biomass (e.g., harvested microcrop), a washed biomass, a lysed biomass, or any combination thereof may be metered to a separating mechanism at any desired volume, mass, or other rate or interval (e.g., a constant rate, a variable rate, continuously, semi-continuously, periodically, intermittently). A feed rate and/or mode may be determined based on considerations including, for example: the target production rate; apparatus(es) employed in the process; properties of the feedstock; or any combination thereof. A feeding rate, in some embodiments, may be at least about 10 kg/hour, or at least about 50 kg/hour, or at least about 100 kg/hour, or at least about 200 kg/hour, or at least about 300 kg/hour, or at least about 400 kg/hour, or at least about 500 kg/hour, or at least about 600 kg/hour, or at least about 700 kg/hour, or at least about 800 kg/hour, or at least about 900 kg/hour, or at least about 1000 kg/hour, or higher than about 1000 kg/hour. According to some embodiments, the feeding rate may be from about 10 kg/hour to about 200 kg/hour, or from about 200 kg/hour to about 400 kg/hour, or from about 400 kg/hour to about 600 kg/hour, or from about 600 kg/hour to about 800 kg/hour, or from about 800 kg/hour to about 1000 kg/hour, or from about 1000 kg/hour to about 1200 kg/hour, or from about 1200 kg/hour to about 1400 kg/hour, or from about 1400 kg/hour to about 1600 kg/hour, or from about 1600 kg/hour to about 1800 kg/hour, or from about 1800 kg/hour to about 2000 kg/hour, or from about 2000 kg/hour to about 2200 kg/hour.

Separating a biomass may be performed at any desired temperature. Separating may be performed at temperatures below room temperature, for example, to decrease proteolytic activity. In some embodiments, separating may be performed at a temperature below about 40° C., or below about 30° C., or below about 20° C., or below about 15° C., or below about 10° C., or below about 5° C., or below about 2° C., or below about 1° C., or below about 0° C. Separating may be performed, for example, at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C.

Separating a Solid Fraction

In some embodiments, a solid fraction may be further separated to extract additional juice (e.g., a second juice (FIG. 3A, 332)). Separation of a solid fraction (e.g., first portion, second portion) may form a second juice (e.g., FIG. 3A, 332) and a first solid (e.g., FIG. 3A, 331). A second juice (e.g., first portion, second portion) may include a protein-rich liquid and/or at least some solid particles (e.g., carbohydrates, fiber).

Separating a solid fraction to form a second juice and a first solid may involve pressing (e.g., screw press), centrifugation, filtration, pressurized filtration, or any combination thereof. Interchangeable unit operations for separating a solid fraction include, for example, a decanter centrifuge, a belt press, a fan press, a rotary press, a screw press, a filter press, a finisher press, or any combination thereof.

In some embodiments, a solid fraction may be metered to a separating mechanism at any desired volume, mass, or other rate or interval (e.g., a constant rate, a variable rate, continuously, semi-continuously, periodically, intermittently). A feed rate and/or mode may be determined based on considerations including, for example: the target production rate; apparatus(es) employed in the process; properties of the feedstock; or any combination thereof. A feeding rate, in some embodiments, may be at least about 10 kg/hour, or at least about 50 kg/hour, or at least about 100 kg/hour, or at least about 200 kg/hour, or at least about 300 kg/hour, or at least about 400 kg/hour, or at least about 500 kg/hour, or at least about 600 kg/hour, or at least about 700 kg/hour, or at least about 800 kg/hour, or at least about 900 kg/hour, or at least about 1000 kg/hour, or higher than about 1000 kg/hour. According to some embodiments, the feeding rate may be from about 10 kg/hour to about 200 kg/hour, or from about 200 kg/hour to about 400 kg/hour, or from about 400 kg/hour to about 600 kg/hour, or from about 600 kg/hour to about 800 kg/hour, or from about 800 kg/hour to about 1000 kg/hour, or higher than about 1000 kg/hour, or from about 1000 kg/hour to about 1200 kg/hour, or from about 1200 kg/hour to about 1400 kg/hour, or from about 1400 kg/hour to about 1600 kg/hour, or from about 1600 kg/hour to about 1800 kg/hour, or from about 1800 kg/hour to about 2000 kg/hour, or from about 2000 kg/hour to about 2200 kg/hour.

Separating a solid fraction may be performed at any desired temperature. According to some embodiments, separating may be performed at temperatures below room temperature, for example, to decrease proteolytic activity and/or microbial growth. In some embodiments, separating may be performed at a temperature below about 40° C., below about 30° C., or below about 20° C., or below about 15° C., or below about 10° C., or below about 5° C., or below about 2° C., or below about 1° C., or below about 0° C. Separating may be performed, for example, at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C.

In some embodiments, a separation apparatus (e.g., screw press) selected to separate a solid fraction may be the same apparatus used to separate a biomass (e.g., lysed) to form a juice fraction and a solid fraction. A separation apparatus (e.g., screw press) selected to separate a solid fraction may be a different apparatus than that used to separate (e.g., decanter centrifuge) a biomass (e.g., lysed) to form a juice fraction and a solid fraction, in some embodiments. In some embodiments, a separation apparatus (e.g., screw press) may be used multiple times to extract additional second juice from a solid fraction.

According to some embodiments, a process for growing, harvesting, and separating a microcrop (e.g., photosynthetic aquatic species, aquatic plant species, Lemna, algal species) may be single cycle: (a) at least one of a first cake (e.g., FIG. 3, 342) and a second cake (e.g., FIG. 3, 347) which are collected at other stages in the cycle (e.g., separation of a juice fraction yields a first cake) may be combined with a first solid to form a solid mixture, and (b) the solid mixture may be further processed (e.g., FIG. 2A, FIG. 2B, FIG. 3A, FIG. 3B).

In some embodiments a process for growing, harvesting, and separating a microcrop (e.g., photosynthetic aquatic species, aquatic plant species, Lemna, algal species) may be multiple cycles or a continuous process such that one or more of a first cake (e.g., FIG. 4, 442; FIG. 5A, 542) and a second cake (e.g., FIG. 4, 447; FIG. 5A, 547) that are collected in an earlier cycle may be combined with a solid fraction from a subsequent cycle prior to separation (e.g., FIG. 4, 430; FIG. 5A, 530) of the solid fraction.

Increasing the extraction of a second juice from a solid fraction may decrease the overall moisture content of a first solid and may thereby lower the energy expenditure required to further process the first solid (e.g., energy required to dry). Additionally, increasing the extraction of juice from a solid fraction and/or solid mixture may improve the yield of a protein-rich product and/or a polysaccharide product (e.g., apiogalacturonan, oligogalacturonide, polygalacturonide).

In some embodiments, a moisture content of a solid fraction and/or solid mixture may be less than about 90%, or less than about 80%, or less than about 70%, or less than about 60%, or less than about 50%, or less than about 40%, or less than about 30%, or less than about 20%, or less than about 10% by weight.

Separating a Juice Fraction

A juice fraction (e.g., first portion, second portion) may be separated to generate a first juice and a first cake, according to some embodiments. A first juice (e.g., first portion, second portion) may include a dissolved protein. In some embodiments, buffers, protease inhibitors, anti-microbial agents, chelators (e.g., EDTA), reducing agents, or any combination thereof may be added to a juice fraction and/or a first juice. Separating a juice fraction, in some embodiments, may include centrifugation, filtration, pressurized filtration, or any combination thereof. Two or more unit operations (e.g., interchangeable unit operations) may be used to separate a juice fraction including, for example, a high-speed disc stack centrifuge, a circular vibratory separator, a linear/inclined motion shaker, a decanter centrifuge, a filter press, pressurized filtration mechanisms, microfiltration, vacuum filtration, or any combination thereof.

Microfiltration may be used, in some embodiments, to separate a juice fraction into a first juice and a first cake. In some embodiments, suitable filter sizes may include ≤about 10 μm, or ≤about 5 μm, or ≤about 3 μm, or ≤about 2 μm, or ≤about 1 μm, or ≤about 0.5 μm, or ≤about 0.4 μm, or ≤about 0.3 μm, or ≤about 0.2 μm, or ≤about 0.1 μm. A filter may have a filter size of not less than about 0.1 μm, in some embodiments. Microfiltration may reduce the concentration of suspended solids (e.g., fats, fiber), microbial contamination (e.g., *Escherichia coli*), and/or fungal contamination (e.g., yeast) in the first juice, according to some embodiments.

In some embodiments, a vacuum may be implemented during at least some of a separating process.

Separating may be performed, according to some embodiments, at temperatures below room temperature, for example, to decrease proteolytic activity. In some embodiments separating may be performed at a temperature below about 40° C., or below about 30° C., or below about 20° C., or below about 15° C., or below about 10° C., or below about 5° C., or below about 2° C., or below about 1° C., or below about 0° C. Separating may be performed at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C., in some embodiments.

A first juice may be pumped into a storage tank, for example, a chilled storage tank, until further processing. In some embodiments a chilled storage tank may be maintained at a temperature below room temperature (e.g., 12° C.). Storage of a first juice at a low temperate may reduce proteolytic activity and thereby improve protein recovery efficiency. A chilled storage tank, in some embodiments, may be maintained at a temperature below about 30° C., or below about 20° C., or below about 15° C., or below about 10° C., or below about 5° C., or below about 2° C., or below about 1° C., or below about 0° C. According to some embodiments, a chilled storage tank may be maintained at a temperature of about 5° C., or about 6° C., or about 7° C., or about 8° C., or about 9° C., or about 10° C., or about 11° C., or about 12° C., or about 13° C., or about 14° C., or about 15° C. In some embodiments, a first juice may be fed directly to further processing without being stored in a storage tank.

Any one or more of the liquid phases (e.g., a juice fraction, a first juice, a second juice, a third juice) or any one or more of the solid phases (e.g., a solid fraction, a first cake, a second cake) generated in one procedure may be stored in a storage tank before being fed to one or more downstream procedures or apparatuses. In some embodiments a homogeneous liquid phase or solid phase may be generated for a downstream procedure(s) or apparatus(es). This may accommodate different operation schedules or modes including, for example, continuous mode, batch mode, or multiple feeding streams to one or more downstream procedure(s) and/or apparatus(es). A liquid phase or a solid phase may be maintained in a storage tank at a desirable temperature (e.g., below room temperature, such as 12° C.) to reduce degradation and maintain high quality until further processing.

Separating a First Cake and/or a Second Juice

In some embodiments, further processing of a first cake (e.g., first portion, second portion) and/or a second juice (e.g., first portion, second portion) may be performed. Such additional processing may increase product yield and/or quality. In some embodiments, a first cake and a second juice may be combined and further separated to form a third juice and a second cake. A first cake and a second juice may be independently subjected to further separation, according to some embodiments.

Separating a first cake, a second juice, or any combination thereof may involve vibratory separation, centrifugation, filtration, pressurized filtration, or any combination thereof. Several different interchangeable unit operations may be used to separate including, for example, a high-speed disc stack centrifuge, a circular vibratory separator, a linear/inclined motion shaker, a decanter centrifuge, a filter press, pressurized filtration mechanisms, microfiltration, vacuum filtration, or any combination thereof.

In some embodiments, filtration (e.g., a vibratory separator) may be used to separate a first cake, a second juice, or any combination thereof to form a third juice and a second cake. Suitable filter sizes may include, in some embodiments, ≤about 800 µm, or ≤about 600 µm, or ≤about 500 µm, or ≤about 400 µm, or ≤about 300 µm, or ≤about 200 µm, or ≤about 180 µm, or ≤about 150 µm, or ≤about 120 µm, or ≤about 100 µm, or ≤about 90 µm, or ≤about 80 µm, or ≤about 70 µm, or ≤about 60 µm, or ≤about 50 µm, or ≤about 40 µm, or ≤about 30 µm, or ≤25 µm, or ≤about 20 µm, or ≤about 15 µm, or ≤about 10 µm, or ≤about am, or ≤about 1 µm. A filter may have a filter size of not more than about 800 µm, in some embodiments. Pore size of a filter may be selected larger or smaller as desired. For example, a larger pore size may be desirable where removal of contaminant material is of interest. A smaller pore size may be desirable where limiting the number of cycles of the process and/or protein yield is of interest. In some embodiments, a pore size of a filter may be selected based on lysing conditions, for example, an average particle size of a lysed biomass. A pore size of a filter may be selected based on one or more characteristics of a microcrop (e.g. cell wall composition, protein composition), according to some embodiments.

Microfiltration may be used, in some embodiments, to separate a first cake, a second juice, or any combination thereof to form a third juice and a second cake. In some embodiments, suitable filter sizes may include ≤about 10 µm, or ≤about 5 µm, or ≤about 3 µm, or ≤about 2 µm, or ≤about 1 µm, or ≤about 0.5 µm, or ≤about 0.4 µm, or ≤about 0.3 µm, or ≤about 0.2 µm, or ≤about 0.1 µm. A microfilter may have a filter size of not less than about 0.1 µm, in some embodiments.

In some embodiments, a vacuum may be implemented during at least some of a separating process.

Separating may be performed, according to some embodiments, at temperatures below room temperature, for example, to decrease proteolytic activity. In some embodiments separating may be performed at a temperature below about 40° C., or below about 30° C., or below about 20° C., or below about 15° C., or below about 10° C., or below about 5° C., or below about 2° C., or below about 1° C., or below about 0° C. Separating may be performed at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C., in some embodiments.

According to some embodiments, a process for growing, harvesting, and separating a microcrop (e.g., photosynthetic aquatic species, aquatic plant species, *Lemna*, algal species) may comprise a single cycle. In a single cycle process, in some embodiments, at least one of a first cake (e.g., FIG. 3, 342) and a second cake (e.g., FIG. 3, 347) may be combined with a first solid to form a solid mixture, and the solid mixture may be further processed (e.g., FIG. 2A, FIG. 2B, FIG. 3A, FIG. 3B). In some embodiments of a single cycle process, a third juice may be combined with a first juice prior to further processing.

In some embodiments a process for growing, harvesting, and separating a microcrop (e.g., photosynthetic aquatic species, aquatic plant species, *Lemna*, algal species) may comprise multiple cycles (e.g., a continuous process). In a multiple cycle or continuous process, according to some embodiments, one or more of a first cake (e.g., FIG. 4, 442; FIG. 5A, 542) and a second cake (e.g., FIG. 4, 447; FIG. 5A, 547) that are collected in an earlier cycle may be combined with a solid fraction from a subsequent cycle prior to separation (e.g., FIG. 4, 430; FIG. 5A, 530) of the solid fraction. In some embodiments of a multiple cycle or continuous process a third juice collected in an earlier cycle may be combined with a juice fraction from a subsequent cycle prior to further processing.

Filtering a First Juice, a Third Juice, or any Combination Thereof

A first juice (e.g., first portion, second portion), a third juice (e.g., first portion, second portion), or any combination thereof may be filtered one or more times to generate a soluble protein product (e.g., a soluble protein (e.g., FIG. 2, 251), a first soluble protein (e.g., FIG. 3, 351), a second soluble protein (e.g., FIG. 3, 356)). Filtration may involve microfiltration, ultrafiltration, nanofiltration, or reverse osmosis filtration either individually or in combination.

Figure 2A:
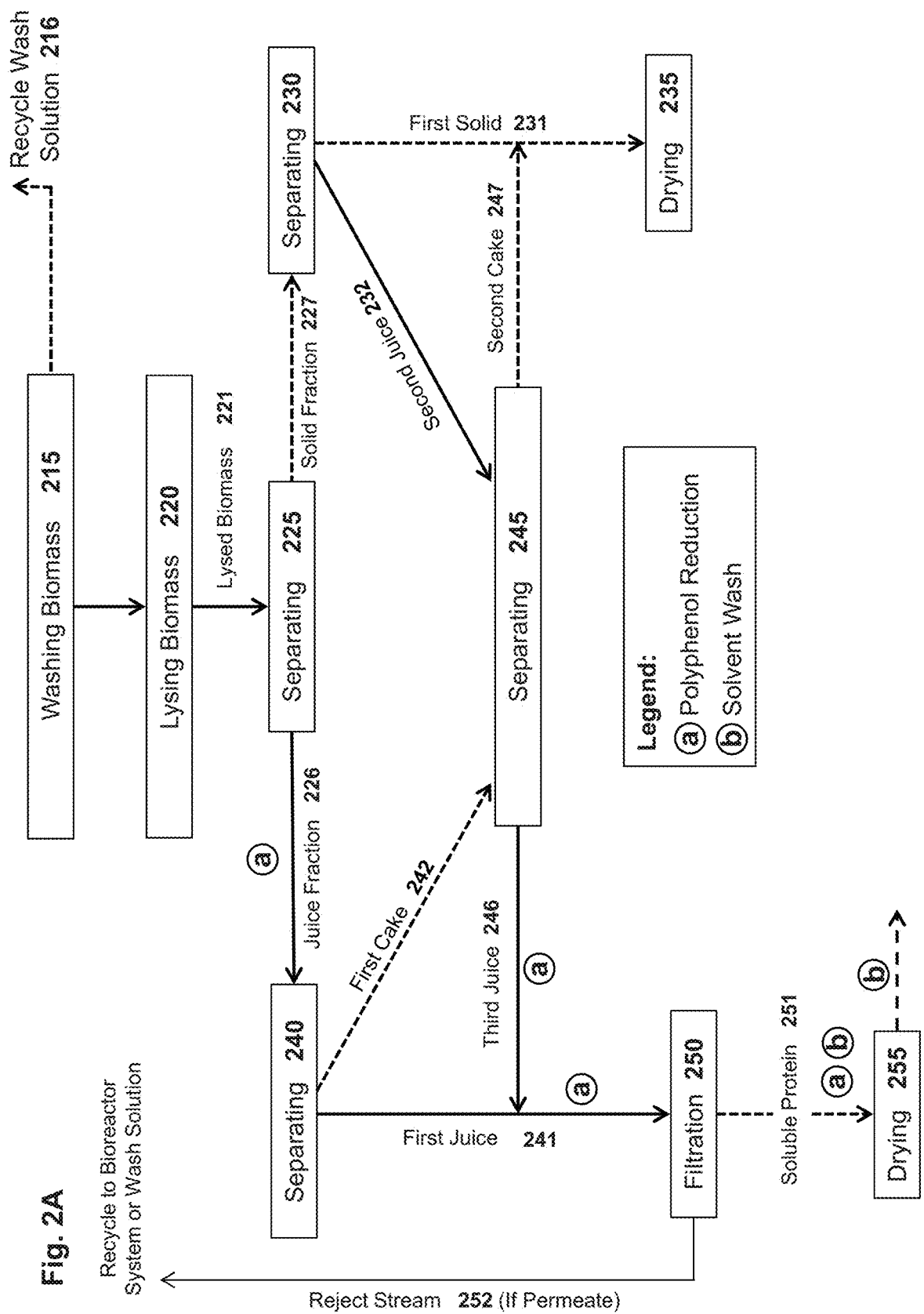
FIG. 2A is a flow diagram illustrating a process for producing a protein concentrate and/or carbohydrate rich products from a biomass according to a specific example embodiment of the disclosure.
Figure 2B:
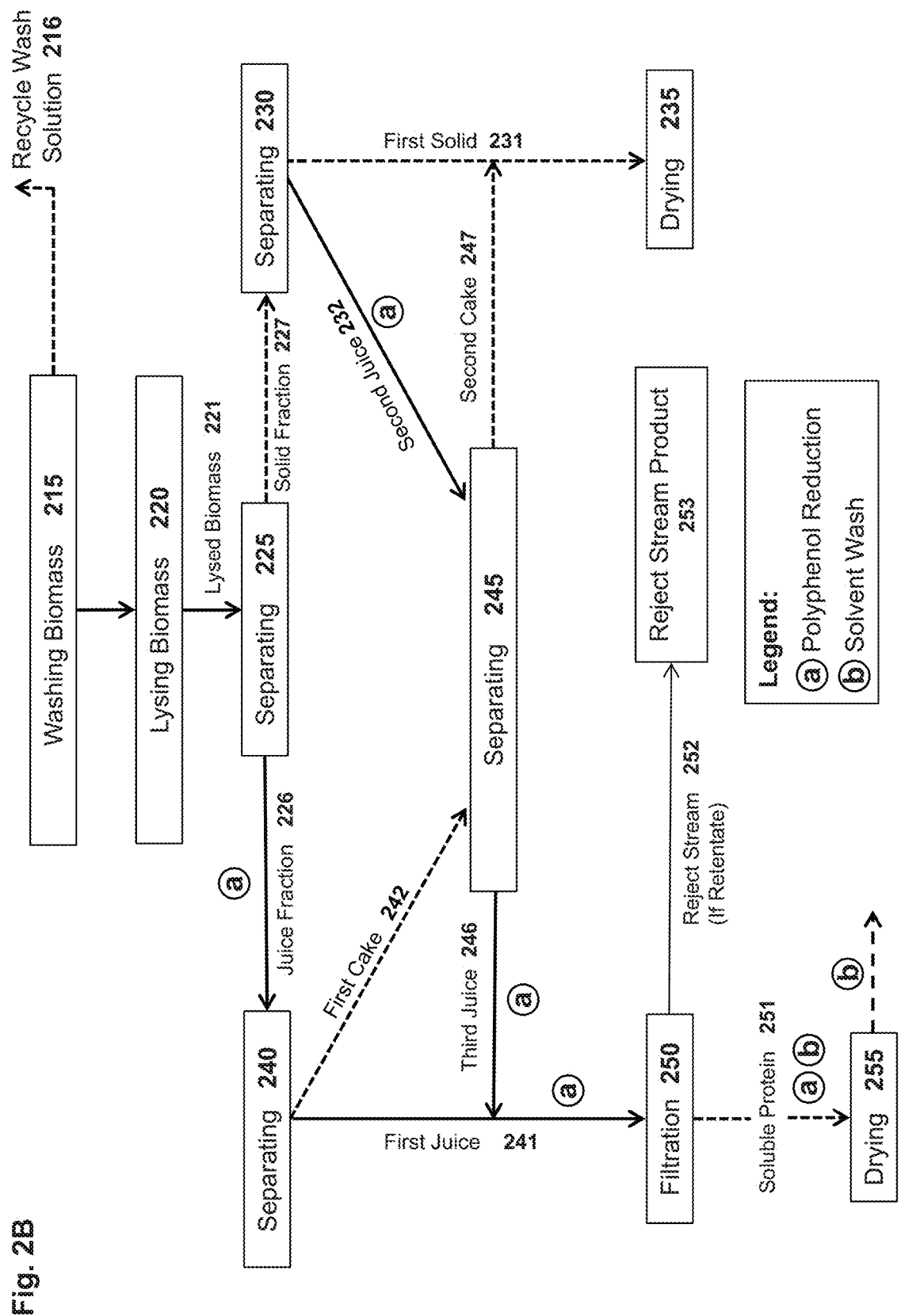
FIG. 2B is a flow diagram illustrating a process for producing a protein concentrate and/or carbohydrate rich products from a biomass according to a specific example embodiment of the disclosure.
Figure 3A:
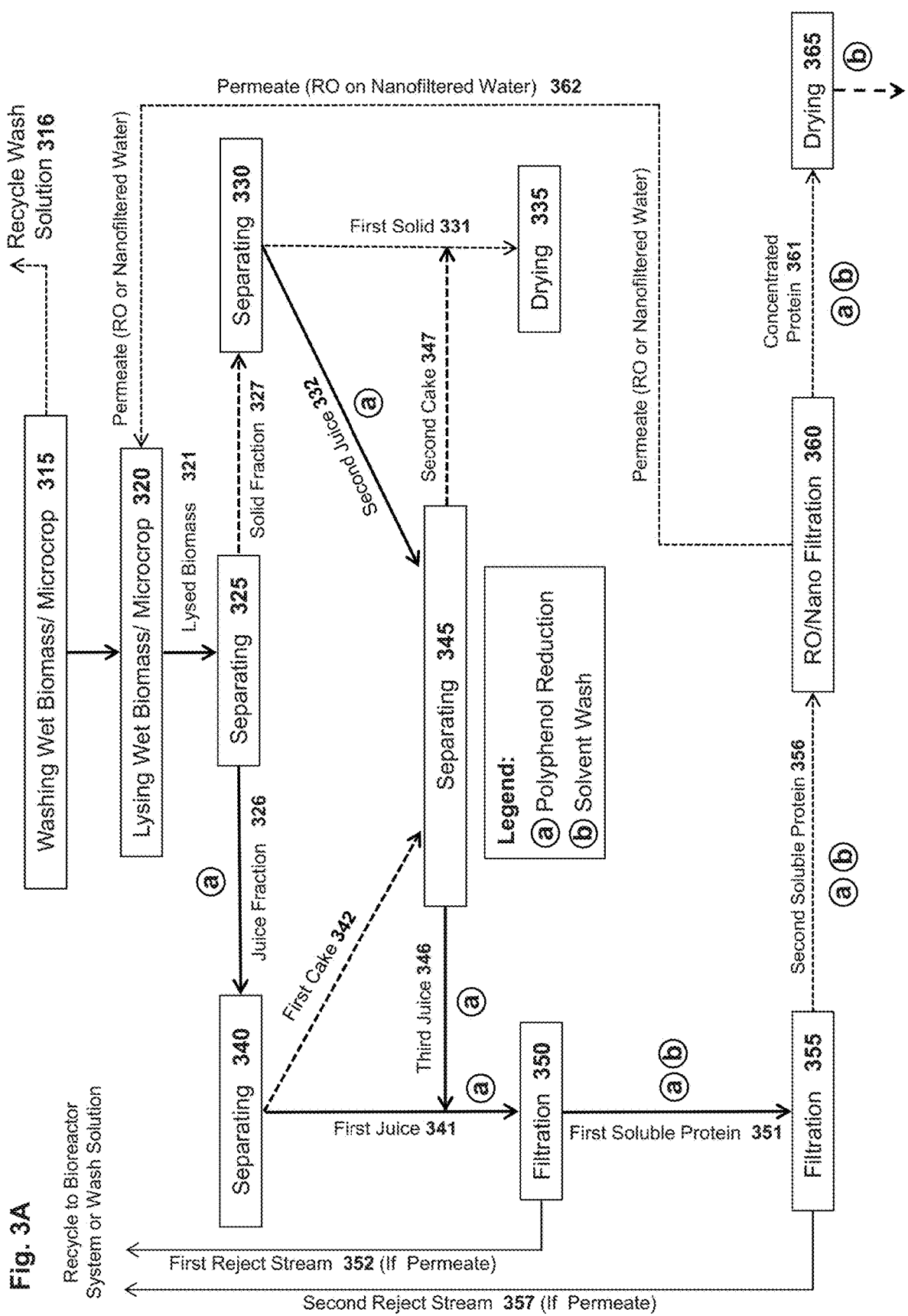
FIG. 3A is a flow diagram illustrating a process for producing a protein concentrate and/or carbohydrate rich products from a biomass according to a specific example embodiment of the disclosure.
Figure 3B:
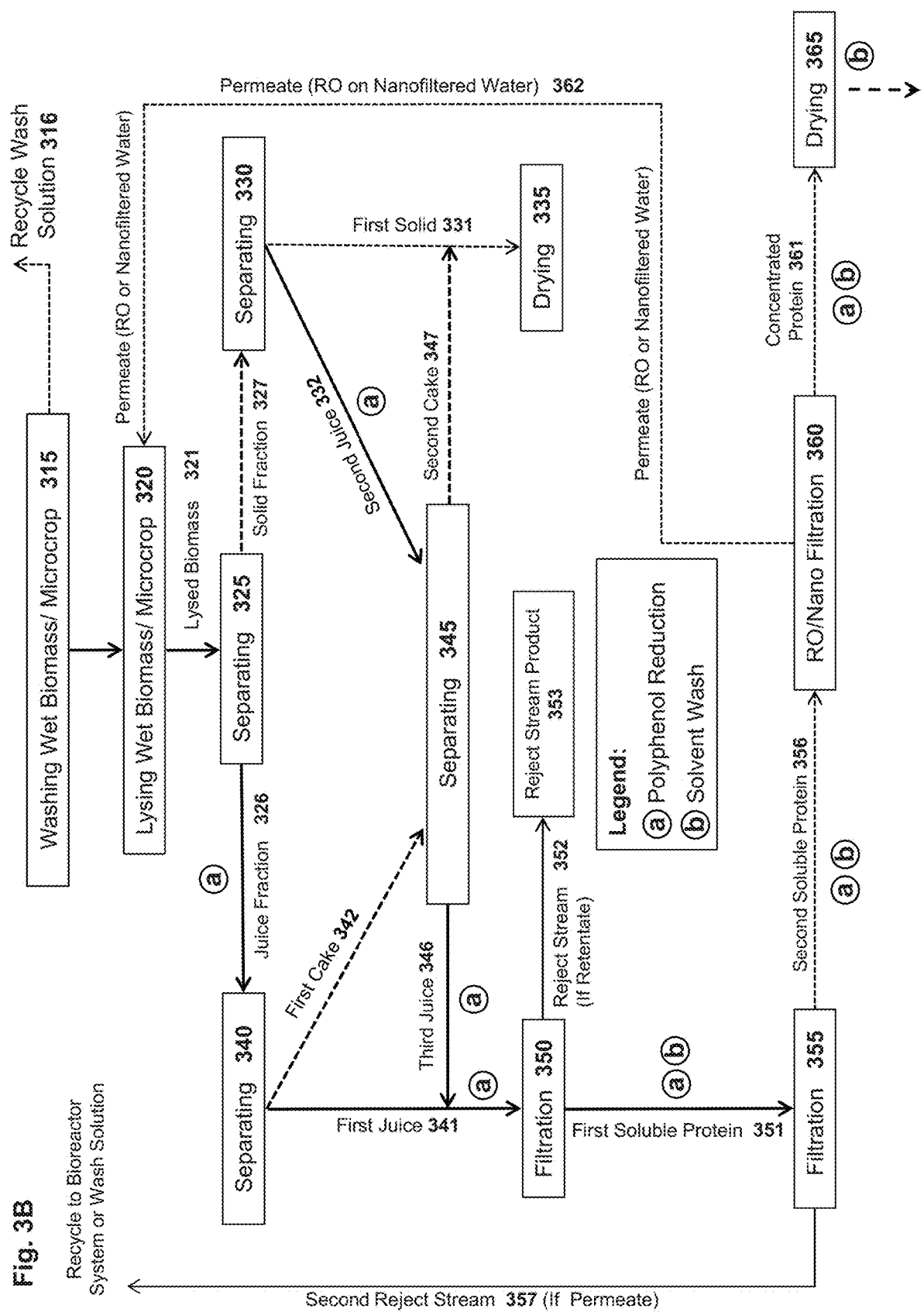
FIG. 3B is a flow diagram illustrating a process for producing a protein concentrate and/or carbohydrate rich products from a biomass according to a specific example embodiment of the disclosure.

According to some embodiments, diafiltration may be used in conjunction with ultrafiltration and/or nanofiltration, by an addition of water to a first soluble protein (e.g., FIG. 2A, 251; FIG. 2B, 251; FIG. 3A, 351; FIG. 3B, 351; FIG. 4, 451) or a second soluble protein (FIG. 3A, 356; FIG. 3B, 356; FIG. 4, 456). In some embodiments, using diafiltration in conjunction with ultrafiltration and/or nanofiltration by an addition of water to a first soluble protein, a second soluble protein, or a combination thereof may further reduce a concentration of permeable solutes from a first soluble protein, a second soluble protein, or a combination thereof. In some embodiments, reducing a concentration of permeable solutes from a first soluble protein, a second soluble protein, or a combination thereof may increase a protein purity of a first soluble protein, a second soluble protein, or a combination thereof. In some embodiments, a permeate of ultrafiltration (e.g., FIG. 3A, FIG. 3B, FIG. 4) may be recycled to a bioreactor system for cultivation of a microcrop (e.g., FIG. 1, 105).

Microfiltration may reduce the concentration of suspended solids (e.g., fats, fiber), microbial contamination (e.g., *Escherichia coli*), and/or fungal contamination (e.g., yeast) in a first juice, a third juice, or any combination thereof, according to some embodiments. Suitable filter sizes for microfiltration may include, in some embodiments, ≤about 10 µm, or ≤about 5 µm, or ≤about 3 µm, or ≤about 2 µm, or ≤about 1 µm, or ≤about 0.5 µm, or ≤about 0.4 µm, or ≤about 0.3 µm, or ≤about 0.2 µm, or ≤about 0.1 µm. In some embodiments, a first juice, a third juice, or any combination thereof may be filtered using microfiltration to generate a soluble protein in the permeate.

Ultrafiltration may involve membrane filtration using pressure, concentration gradients, or a combination thereof. Suitable nominal molecular weight cut-offs (NMWCO) for ultrafiltration may be, in some embodiments, at most about 100 kDa, or at most about 90 kDa, or at most about 80 kDa, or at most about 70 kDa, or at most about 60 kDa, or at most about 55 kDa, or at most about 50 kDa, or at most about 45 kDa, or at most about 40 kDa, or at most about 30 kDa, or at most about 20 kDa, or at most about 15 kDa, or at most about 14 kDa, or at most about 13 kDa, or at most about 12 kDa, or at most about 11 kDa, or at most about 10 kDa, or at most about 9 kDa, or at most about 8 kDa, or at most about 7 kDa, or at most about 6 kDa, or at most about 5 kDa, or at most about 4 kDa, or at most about 3 kDa, or at most about 2 kDa, or at most about 1 kDa. In some embodiments, suitable NMWCO cut-offs for ultrafiltration may be in a range of at most about 1 kDa to at most about 10 kDa, at most about 2 kDa to at most about 10 kDa, at most about 3 kDa to at most about 10 kDa, at most about 3 kDa to at most about 15 kDa, or at most about 3 kDa to at most about 20 kDa, or at most about 3 kDa to at most about 60 kDa, or at most about 3 kDa to at most about 55 kDa, or at most about 10 kDa to at most about 55 kDa. In some embodiments a NMWCO for ultrafiltration may be at least 1 kDa, or at least 3 kDa, or at least 5 kDa, or at least 10 kDa, or at least 15 kDa, or at least 20 kDa, or at least 25 kDa, or at least 30 kDa, or at least 35 kDa, or at least 40 kDa, or at least 45 kDa, or at least 50 kDa, or at least 55 kDa. A suitable NMWCO for ultrafiltration may vary depending on a manufacturing specification of an ultrafilter. In some embodiments a suitable NMWCO for ultrafiltration may vary depending on a rate of hydrolysis.

In some embodiments, suitable filter sizes for nanofiltration may include ≤about 0.01 µm, or ≤about 0.009 µm, or ≤about 0.008 µm, or ≤about 0.007 µm, or ≤about 0.006 µm, or ≤about 0.005 µm, or ≤about 0.004 µm, or ≤about 0.003 µm, or ≤about 0.002 µm, or ≤about 0.001 µm. A nanofiltration filter may have a filter size of not more than about 0.01 µm, in some embodiments.

According to some embodiments, suitable filter sizes for reverse osmosis filtration may include ≤about 0.001 µm, or ≤about 0.0009 µm, or ≤about 0.0008 µm, or ≤about 0.0007 µm, or ≤about 0.0006 µm, or ≤about 0.0005 µm, or ≤about 0.0004 µm, or ≤about 0.0003 µm, or ≤about 0.0002 µm, or ≤about 0.0001 µm. A reverse osmosis filter may have a filter size of not more than about 0.001 µm, in some embodiments.

Buffers, protease inhibitors, anti-microbial agents, chelators (e.g., EDTA), reducing agents, or any combination thereof may be added, in some embodiments, to a soluble protein product. A soluble protein product may be chilled and/or stored at a temperature below about 30° C., or below about 25° C., or below about 20° C., or below about 15° C., or below about 10° C., or below about 5° C., or below about 2° C., or below about 1° C., or below about 0° C., or below about −2° C., or below about −5° C., or below about −10° C., in some embodiments. Chilling and/or storing a soluble protein product at reduced temperatures may reduce degradation and/or improve protein recovery efficiency.

Polyphenol Reduction

In some embodiments, a polyphenol-rich product may be subjected to a polyphenol reduction process to generate a product having a reduced concentration of at least one polyphenol (e.g., a tannin). A polyphenol-rich product may include, according to some embodiments, a juice fraction (e.g., FIG. 1, 126), a soluble protein (e.g., FIG. 2A, 251; FIG. 2B, 251), a first soluble protein (e.g., FIG. 3A, 351; FIG. 3B, 351, FIG. 4, 451), a second soluble protein (e.g., FIG. 3A, 356; FIG. 3B, 356; FIG. 4, 456), a concentrated protein (e.g., FIG. 3A, 361; FIG. 3B, 361; FIG. 4, 461), a first juice (e.g., FIG. 2A, 241; FIG. 2B, 241; FIG. 3A, 341; FIG. 3B, 341, FIG. 4, 441, FIG. 5A, 541, FIG. 5B, 541), a second juice (e.g., FIG. 2A, 232; FIG. 2B, 232; FIG. 3A, 332; FIG. 3B, 332, FIG. 4, 432, FIG. 5A, 532, FIG. 5B, 532), a third juice (e.g., FIG. 2A, 246; FIG. 2B, 246; FIG. 3A, 346; FIG. 3B, 346, FIG. 4, 446, FIG. 5A, 546, FIG. 5B, 546), a juice fraction (e.g., FIG. 1, 126; FIG. 2A, 226; FIG. 2B, 226; FIG. 3A, 326; FIG. 3B, 326; FIG. 4, 426, FIG. 5A, 526, FIG. 5B, 526), or any combination thereof. A polyphenol reduction process may be configured to reduce a concentration of at least one polyphenol (e.g., at least one tannin), according to some embodiments. A polyphenol reduction process may be configured, in some embodiments, to minimize a reduction in yield or quality of a downstream soluble protein product.

According to some embodiments a polyphenol reduction process may comprise passing a polyphenol-rich product through an ion exchange resin. In some embodiments, a polyphenol reduction process may comprise passing a polyphenol-rich product through a series (e.g., at least two, at least three) of ion exchange resins. Each ion exchange resin in a series may be the same or different than the other ion exchange resins in the series. In some embodiments an ion exchange resin may be a strongly acidic resin, a strongly basic resin (e.g., DIAION PA308), a weakly acidic resin (e.g., Relite JA800), a weakly basic resin, a weak anion exchange resin (e.g., Relite RAM2), a strong anion exchange resin, a weak cation exchange resin, a strong cation exchange resin, or any combination thereof. According to some embodiments a polyphenol reduction process may comprise passing a polyphenol-rich product through an ion exchange column selected from a weakly acidic resin (e.g., Relite JA800), an anion exchange resin (e.g., Relite RAM2), a strongly basic resin (e.g., DIAION PA308), or a combination thereof. A polyphenol reduction process, in some embodiments, may comprise: first passing a polyphenol-rich product: through an ion exchange column selected from a weak anion exchange and a strong anion exchange resin, and second passing the polyphenol-rich product through an ion exchange column selected from a weak anion exchange resin and a strong anion exchange resin. Ion exchange resins may be used in a batch mode or arranged in a continuous process, whereby resins may be cycled through polyphenol extraction and regeneration processes. In some embodiments a polyphenol reduction process may further comprise adjusting a pH of a polyphenol-rich product or a product yielded from an ion exchange column. A polyphenol reduction process may be performed alone or in combination with other purification processes and/or steps.

In some embodiments a polyphenol reduction process may reduce a polyphenol (e.g., a tannin) content of a polyphenol-rich product by at least 5%, or at least 10%, or at least 15%, or at least 20%, or at least 25%, or at least 30%, or at least 35%, or at least 40%, or at least 45%, or at least 50%, or at least 55%, or at least 60%, or at least 65%, or at least 70%. A polyphenol reduction process, according to some embodiments, may reduce a polyphenol content of a polyphenol-rich product from about 5% to about 10%, from about 15% to about 20%, from about 20% to about 30%, from about 30% to about 40%, from about 35% to about 45%, from about 40% to about 50%, from about 45% to about 55%, from about 50% to about 60%, from about 55% to about 65%, or from about 60% to about 70%.

In some embodiments, a soluble protein product (e.g., a soluble protein, a first soluble protein, a second soluble protein), may comprise polyphenol (e.g., total polyphenol) at a concentration of about 0.05 g/100 g of soluble protein product, or about 0.1 g/100 g of soluble protein product, or about 0.5 g/100 g of soluble protein product, or about 1 g/100 g of soluble protein product, or about 5 g/100 g of soluble protein product, or about 10 g/100 g of soluble protein product, or about 20 g/100 g of protein concentrate. According to some embodiments, a 100 g sample of a soluble protein product resulting from a polyphenol reduction process may include at least about 65 g of protein and not more than 1.092 g of polyphenols (expressed as gallic acid equivalents).

Reducing a Moisture Content of Soluble Protein Products

In some embodiments a process may be used to reduce a moisture content of a soluble protein (e.g., FIG. 2, 251), a first soluble protein (e.g., FIG. 3, 351), a second soluble protein (e.g., FIG. 3, 356), or any combination thereof (collectively "a soluble protein product"). Reducing a moisture content of a soluble protein product may reduce capital and operational expenditures, for example, by reducing the energy needed to dry an end protein product (e.g., concentrated soluble protein).

In some embodiments an evaporation process may be used to reduce a moisture content of a soluble protein product. Evaporation may be performed by, for example, a thermal (evaporative) means such as: a rising film evaporator, a falling film evaporator, a natural circulation evaporator (vertical or horizontal), an agitated-film evaporator, a multiple-effect evaporator, by vacuum evaporation, or any combination thereof. Heat may be supplied directly into the evaporator, or indirectly through a heat jacket. Heat may either come from a raw source (e.g., combustion of natural gas, steam from a boiler) or from a waste heat stream (e.g., dryer exhaust) or from heat transferred by cooling the input stream.

A moisture content of a soluble protein product (e.g., a soluble protein, a second soluble protein) may be reduced, in some embodiments, by nanofiltration or reverse osmosis filtration. In some embodiments, suitable filter sizes for nanofiltration may include ≤about 0.01 µm, or ≤about 0.009 µm, or ≤about 0.008 µm, or ≤about 0.007 µm, or ≤about 0.006 µm, or ≤about 0.005 µm, or ≤about 0.004 µm, or ≤about 0.003 µm, or ≤about 0.002 µm, or ≤about 0.001 µm. A moisture content of a soluble protein product (e.g., a soluble protein, a second soluble protein) may be reduced, in some embodiments, using nanofiltration with the soluble protein product (e.g., a soluble protein, a second soluble protein) in a retentate. According to some embodiments, suitable filter sizes for reverse osmosis filtration may include ≤about 0.001 µm, or ≤about 0.0009 µm, or ≤about 0.0008 µm, or ≤about 0.0007 µm, or ≤about 0.0006 µm, or ≤about 0.0005 µm, or ≤about 0.0004 µm, or ≤about 0.0003 µm, or ≤about 0.0002 µm, or ≤about 0.0001 µm. A moisture content of a soluble protein product (e.g., a soluble protein, a second soluble protein), in some embodiments, may be reduced using reverse osmosis filtration with the soluble protein product in a retentate. A permeate of nanofiltration or reverse osmosis filtration may be recycled (e.g., dilution fluid for lysis; wash solution), according to some embodiments.

In some embodiments an antioxidant (e.g., rosemary extract) may be mixed with a soluble protein product (e.g., a soluble protein, a second soluble protein) prior to drying to improve shelf life of a product when packaged.

Drying a Soluble Protein Product

A soluble protein product (e.g., a soluble protein, a first soluble protein, a second soluble protein) may be dried to generate a dry protein concentrate (e.g., first portion, second portion), according to some embodiments. A drying procedure, in some embodiments, may reduce the moisture content of a soluble protein product to a desired level (e.g., higher or lower moisture content, a desired moisture content). A moisture content of a dry protein concentrate may be, for example, below 90%, or below about 80%, or below about 70%, or below about 60%, or below about 50%, or below about 40%, or below about 30%, or below about 20%, or below about 10%, or below about 5%, or below about 1% by weight of the dry protein concentrate, in some embodiments. According to some embodiments, a protein concentration of a dry protein concentrate may be from about 30% to about 95%, or from about 40% to about 90%, or from about 50% to about 85%, or from about 60% to about 80%, or from about 70% to about 75% by weight of the dry protein concentrate. A drying procedure may be performed using a mechanism including, for example, a spray dryer, double drum dryer, flash dryer, an evaporator, or any combination thereof.

In some embodiments, an inlet temperature of a dryer mechanism (the temperature at the entrance to a dryer) may be above 25° C., or above 50° C., or above 75° C., or above 100° C., or above 125° C., or above 150° C., or above 175° C., or above 200° C., or above 225° C., or above 250° C., or above 275° C., or above 300° C., or above 325° C., or above 350° C., or above 375° C., or above 400° C., or above 425° C., or above 450° C., or above 475° C., or above 500° C. An inlet temperature, in some embodiments, may be from about 25° C. to about 50° C., or from about 50° C. to about 75° C., or from about 75° C. to about 100° C., or from about 100° C. to about 125° C., or from about 125° C. to about 150° C., or from about 150° C. to about 175° C., or from about 175° C. to about 200° C., or from about 200° C. to about 225° C., or from about 225° C. to about 250° C., or from about 250° C. to about 275° C., or from about 275° C.

to about 300° C., or from about 300° C. to about 325° C., or from about 325° C. to about 350° C., or from about 350° C. to about 375° C., or from about 375° C. to about 400° C., or from about 400° C. to about 425° C., or from about 425° C. to about 450° C., or from about 450° C. to about 475° C., or from about 475° C. to about 500° C., or above 500° C. An inlet temperature may be from about 50° C. to about 100° C., or from about 100° C. to about 150° C., or from about 150° C. to about 200° C., or from about 200° C. to about 250° C., or from about 250° C. to about 300° C., or from about 300° C. to about 350° C., or from about 350° C. to about 400° C., or from about 400° C. to about 450° C., or from about 450° C. to about 500° C., or above 500° C., in some embodiments. According to some embodiments, an inlet temperature of a dryer mechanism may be about 225° C.

According to some embodiments, an outlet temperature of a dryer mechanism (the temperature at the exit from a dryer) may be below about 300° C., or below about 275° C., or below about 250° C., or below about 225° C., or below about 200° C., or below about 175° C., or below about 150° C., or below about 125° C., or below about 100° C., or below about 75° C., or below about 50° C., or below about 25° C. An outlet temperature may be from about 300° C. to about 275° C., or from about 275° C. to about 250° C., or from about 250° C. to about 225° C., or from about 225° C. to about 200° C., or from about 200° C. to about 175° C., or from about 175° C. to about 150° C., or from about 150° C. to about 125° C., or from about 125° C. to about 100° C., or from about 100° C. to about 75° C., or from about 75° C. to about 50° C., or from about 50° C. to about 25° C., or below about 25° C., in some embodiments. An outlet temperature, in some embodiments, may be from about 300° C. to about 250° C., or from about 250° C. to about 200° C., or from about 200° C. to about 150° C., or from about 150° C. to about 100° C., from about 100° C. to about 50° C., or from about 50° C. to about 25° C., or below about 25° C. According to some embodiments, an outlet temperature of a dryer mechanism may be about 75° C.

In some embodiments, a volume of a soluble protein product (e.g., a soluble protein, a first soluble protein, a second soluble protein) may be mixed with a volume of a dry protein concentrate prior to drying. This process, known as back-mixing, may be employed when, for example, the moisture content of a soluble protein exceeds the level that a dryer mechanism is capable of accepting. By back-mixing a dry protein concentrate with a soluble protein product, a total moisture content may be kept within the specifications of a dryer mechanism, thereby reducing operational costs (e.g., wear and tear on equipment).

An antioxidant (e.g., rosemary extract) may be mixed with a dry protein concentrate before packaging, according to some embodiments.

Solvent Washing a Soluble Protein Product or a Dry Protein Concentrate

A soluble protein product (e.g., a soluble protein, a first soluble protein, a second soluble protein) and/or a dry protein concentrate (e.g., first portion, second portion) may be washed with at least one solvent (e.g., ethanol, methanol) to generate a washed protein product, according to some embodiments.

A washed protein product, in some embodiments, may have a reduced fat content (e.g., about 2% of a dry protein concentrate or less by weight) and/or a reduced chlorophyll content (e.g., visually perceivable reduction in green coloration) compared to unwashed counterparts. In some embodiments, a washed protein product may appear colorless, white, substantially white, or have reduced green coloration.

A washed protein product, in some embodiments, may exhibit improved taste, color, shelf life (e.g., reduced oxidation of fats), protein density, malleability, or combinations thereof. In some embodiments, a washed protein product may be extruded to form a texturized protein product.

According to some embodiments, a solvent may comprise methanol, ethanol, acetone, hexane, dichloromethane, ethyl acetate, propanol, isopropanol, glycerol, or combinations thereof.

In some embodiments, a washed protein product may have a fat content comprising lower than about 50%, or lower than about 40%, or lower than about 30%, or lower than about 25%, or lower than about 20%, or lower than about 15%, or lower than about 10%, or lower than about 5%, or lower than about 4%, or lower than about 3%, or lower than about 2%, or lower than about 1% by weight of the washed protein product. According to some embodiments, a washed protein product may have a fat content comprising from about 1% to about 10%, or from about 10% to about 20%, or from about 20% to about 30%, or from about 30% to about 40%, or from about 40% to about 50% by weight of the protein concentrate in some embodiments.

In some embodiments, a washed protein product may have a fat content comprising ≤about 15% of a dry protein concentrate or less by weight (DMB), or ≤about 10% DMB, or ≤about 8% DMB, or ≤about 6% DMB, or ≤about 4% DMB, or ≤about 2% DMB, or ≤about 1% DMB, or ≤about 0.5% DMB, or ≤about 0.2% DMB, or ≤about 0.1% DMB. In some embodiments, a washed protein product may have a fat content comprising from about 0.1% DMB to about 0.2% DMB.

Protein Concentrate

Some embodiments relate to a process for production of a soluble protein product (e.g., a soluble protein, a first soluble protein, a second soluble protein) and/or a dry protein concentrate (collectively "a protein concentrate") from a biomass of a harvested microcrop (e.g., photosynthetic aquatic species, aquatic plant species, Lemna, algal species). A process may be configured or performed to achieve any desired protein yield (e.g., maximal yield, a selected yield). In some embodiments, a protein concentration of a protein concentrate is higher than about 30%, or higher than about 40%, or higher than about 50%, or higher than 55%, or higher than about 60%, or higher than 65%, or higher than about 70%, or higher than about 75%, or higher than about 80% by weight of the protein concentrate. A remainder of a protein concentrate may include carbohydrates, fiber, fats, minerals, or any combination thereof. A protein concentrate may be suitable for animal feed and/or human consumption. For example, a protein concentrate may serve as an effective replacement for protein isolates (e.g., soy, pea, whey) which are presently used in a large number of human food products either individually or as ingredients and additives. According to some embodiments, a protein composition of a protein concentrate may be in native or near native form. For example, a protein composition of a protein concentrate may include <2% denatured protein, or <4% denatured protein, <6% denatured protein, or <8% denatured protein, or <10% denatured protein, or <12% denatured protein, or <14% denatured protein, or <16% denatured protein, or <18% denatured protein, or <20% denatured protein, or <22% denatured protein, or <24% denatured protein, or <26% denatured protein, or <28% denatured protein, or <30% denatured protein.

In some embodiments, a protein concentrate may comprise one or more essential amino acids. For example, a protein concentrate may include one or more amino acids selected from leucine, isoleucine, lysine, methionine, phenylalanine, threonine, tryptophan, valine, histidine, arginine, aspartic acid, serine, glutamic acid, proline, glycine, alanine, tyrosine and cysteine. The concentration of an essential amino acid may be at least about 1 g/100 g of protein concentrate, or at least about 1.5 g/100 g of protein concentrate, or at least about 2 g/100 g of protein concentrate, or at least about 2.5 g/100 g of protein concentrate, or at least about 3 g/100 g of protein concentrate, or at least about 4 g/100 g of dry at least about 2.5 g/100 g of protein concentrate, or at least about 3 g/100 g of protein concentrate, or at least about 4 g/100 g of protein concentrate, or at least about 5 g/100 g of protein concentrate, or at least about 6 g/100 g of protein concentrate, or at least about 7 g/100 g of protein concentrate, or at least about 8 g/100 g of protein concentrate, or at least about 9 g/100 g of protein concentrate, or at least about 10 g/100 g of protein concentrate in some embodiments.

The concentration of an amino acid (e.g., an essential amino acid), in some embodiments, may be expressed as a weight fraction of the protein recovered from a protein concentrate, and is at least about 1 g/100 g of protein, or at least about 1.5 g/100 g of protein, or at least about 2 g/100 g of protein, or at least about 2.5 g/100 g of protein, or at least about 3 g/100 g of protein, or at least about 4 g/100 g of protein, or at least about 5 g/100 g of protein, or at least about 6 g/100 g of protein, or at least about 7 g/100 g of protein, or at least about 8 g/100 g of protein, or at least about 9 g/100 g of protein, or at least about 10 g/100 g of protein.

In some embodiments, a protein concentrate may comprise one or more branched-chain amino acids (BCAAs). For example, a protein concentrate may include one or more amino acids selected from leucine, isoleucine, valine, and combinations thereof. According to some embodiments, a BCAA content may be evaluated using ion exchange chromatography of an amino acid profile based on AOAC Official Method 994.12. According to some embodiments, a concentration of a BCAA per 100 g of a protein concentrate may be at least about 1 g, or at least about 1.5 g, or at least about 2 g, or at least about 2.5 g, or at least about 3 g, or at least about 4 g, or at least about 5 g, or at least about 6 g, or at least about 7 g, or at least about 8 g, or at least about 9 g, or at least about 10 g, or at least about 11 g, or at least about 12 g, or at least about 13 g, or at least about 14 g, or at least about 15 g. In some embodiments, a BCAA protein content of a protein concentrate may be higher than a percentage of total amino acid content of the protein concentrate (TAA). For example, in some embodiments a BCAA protein content of a protein concentrate may be >about 10% TAA, or >about 11% TAA, or >about 12% TAA, or >about 13% TAA, or >about 14% TAA, or >about 15% TAA, or >about 20% TAA, or >about 25% TAA, or >about 30% TAA, or >about 35% TAA, or >about 40% TAA, or >about 45% TAA, or >about 50% TAA, or >about 55% TAA, or >about 60% TAA. In some embodiments, a BCAA protein content of a protein concentrate (e.g., derived from *Lemna*) may be at least 20% TAA, about 11% higher than a BCAA content of alternative protein products derived from pea or soy beans (about 18% TAA).

In some embodiments, a protein concentrate may have a fat content lower than about 50%, or lower than about 40%, or lower than about 30%, or lower than about 25%, or lower than about 20%, or lower than about 15%, or lower than about 10%, or lower than about 5%, or lower than about 4%, or lower than about 3%, or lower than about 2%, or lower than about 1% by weight of the protein concentrate. A protein concentrate may have a fat content from about 1% to about 10%, or from about 10% to about 20%, or from about 20% to about 30%, or from about 30% to about 40%, or from about 40% to about 50% by weight of the protein concentrate in some embodiments. A protein concentrate, in some embodiments, may have a fat content from about 1% to about 50%, or from about 2% to about 40%, or from about 5% to about 30%, or from about 8% to about 20%, or from about 10% to about 15% by weight of the protein concentrate. A protein concentrate may be further processed to meet a desired fat content (e.g., higher or lower concentration, a desired fat composition).

According to some embodiments, a protein concentrate may include an ash content consisting of a residue containing inorganic mineral elements. An ash content in some embodiments may be determined by combusting a protein concentrate at a high temperature (e.g., $\geq 500°$ C.) to remove organic matter. A protein concentrate may have an ash content lower than about 50%, or lower than about 40%, or lower than about 30%, or lower than about 25%, or lower than about 20%, or lower than about 15%, or lower than about 10%, or lower than about 5%, or lower than about 4%, or lower than about 3%, or lower than about 2%, or lower than about 1% by weight of the protein concentrate in some embodiments. In some embodiments, a protein concentrate may have an ash content from about 1% to about 10%, or from about 10% to about 20%, or from about 20% to about 30%, or from about 30% to about 40%, or from about 40% to about 50% by weight of the protein concentrate. A protein concentrate, in some embodiments, may have an ash content from about 1% to about 50%, or from about 2% to about 40%, or from about 3% to about 30%, or from about 3% to about 20%, or from about 3% to about 15%, or from about 3% to about 10%, or from about 5% to about 10%, or from about 5% to about 15% by weight of the protein concentrate. A protein concentrate may be further processed to meet a desired ash content (e.g., higher or lower concentration, a desired ash composition).

According to some embodiments, a protein concentrate may have a carbohydrate content lower than about 50%, or lower than about 40%, or lower than about 30%, or lower than about 25%, or lower than about 20%, or lower than about 15%, or lower than about 10%, or lower than about 5%, or lower than about 4%, or lower than about 3%, or lower than about 2%, or lower than about 1% by weight of the protein concentrate. A protein concentrate, in some embodiments, may have a carbohydrate content from about 1% to about 10%, or from about 10% to about 20%, or from about 20% to about 30%, or from about 30% to about 40%, or from about 40% to about 50% by weight of the protein concentrate. In some embodiments, a protein concentrate may have a carbohydrate content from about 1% to about 50%, or from about 2% to about 40%, or from about 5% to about 30%, or from about 8% to about 20%, or from about 10% to about 15% by weight of the protein concentrate. A protein concentrate may be further processed to meet a desired carbohydrate content (e.g., higher or lower concentration, a desired carbohydrate composition).

In some embodiments, a protein concentrate may have a fiber content lower than about 20%, or lower than about 15%, or lower than about 10%, or lower than about 8%, or lower than about 5%, or lower than about 4%, or lower than about 3%, or lower than about 2%, or lower than about 1% by weight of the protein concentrate. A protein concentrate may be further processed to meet a desired fiber content (e.g., higher or lower concentration, a desired fiber composition).

For example, a dry protein concentrate produced by the processes described herein may include the contents summarized in Table 2.

TABLE 2

Example Contents of Dry Protein Concentrate Product

| Wt. Percent | Product 1 | Product 2 | Product 3 |
|---|---|---|---|
| Solids | ≥~90 | ≥~88-~90 | ≥~95 |
| Moisture | ≥~10 | ≥~12-~10 | ≥~5 |
| Protein | ≥~50 | from ~60 to ~80 | ≥~65-~75 |
| Fat | ≥~20 | from ~5 to ~20 | ~5-~15 |
| Ash | ≥~15 | from ~1 to ~10 | ≥~2-~10 |
| Carbohydrate | ≥~10 | from ~5 to ~20 | ≥~10-~15 |
| Fiber | ≥~10 | ≥~5 | ≥~5 |
| Other | ~10 | ~5-~20 | ~10-~15 |

A product and/or process, in some embodiments, may be configured or performed so other characteristics of a protein concentrate, (e.g., particle size, bacterial specification) meet desired criteria and/or may be suitable for an intended purpose.

According to some embodiments a protein concentrate may have a mesh size (e.g., most or all gross particles of the protein concentrate will pass through a mesh having an average pore size) of about 30 µm, or about 40 µm, or about 50 µm, or about 60 µm, or about 70 µm, or about 80 µm, or about 90 µm, or about 100 µm, or about 110 µm, or about 120 µm, or about 130 µm, or about 140 µm, or about 150 µm, or about 160 µm, or about 170 µm, or about 180 µm, or about 190 µm, or about 200 µm, or about 225 µm, or about 250 µm, or about 275 µm, or about 300 µm, or about 325 µm, or about 350 µm, or about 375 µm, or about 400 µm, or about 425 µm, or about 450 µm, or about 475 µm, or about 500 µm. A protein concentrate may have mesh size range of, in some embodiments, about 30 µm to about 500 µm, or about 30 µm to about 300 µm, or about 50 µm to about 300 µm, or about 70 µm to about 300 µm, or about 100 µm to about 300 µm, or about 30 µm to about 200 µm, or about 50 µm to about 200 µm, or about 70 µm to about 200 µm, or about 100 µm to about 200 µm, or about 30 µm to about 190 µm, or about 50 µm to about 190 µm, or about 70 µm or about 190 µm, or about 100 µm to about 190 µm, or about 30 µm to about 180 µm, or about 50 µm to about 180 µm, or about 70 µm to about 180 µm, or about 100 µm to about 180 µm, or about 30 µm to about 170 µm, or about 50 µm to about 170 µm, or about 70 µm to about 170 µm, or about 100 µm to about 170 µm.

A protein concentrate, according to some embodiments may have a density of about 400 kg/m$^3$, or about 405 kg/m$^3$, or about 410 kg/m$^3$, or about 415 kg/m$^3$, or about 420 kg/m$^3$, or about 425 kg/m$^3$, or about 430 kg/m$^3$, or about 435 kg/m$^3$, or about 440 kg/m$^3$, or about 445 kg/m$^3$, or about 450 kg/m$^3$.

In some embodiments a protein concentrate may have a solubility value (% water soluble nitrogen) of at least 35%, or at least 40%, or at least 45%, or at least 50%, or at least 55%, or at least 60%, or at least 65%, or at least 70%, or at least 75%. A solubility value may be determined using the Nitrogen Solubility Index (NSI) method as described in F. Vojdani, *Methods of Testing Protein Functionality* 11-60 (G. M. Hall, ed., 1996).

According to some embodiments, a protein concentrate may have a dispersibility value (% water dispersible protein/% total protein) of at least 35%, or at least 40%, or at least 45%, or at least 50%, or at least 55%, or at least 60%, or at least 65%, or at least 70%, or at least 75%. A dispersibility value may be determined using the Protein Dispersibility Index (PDI) as described in F. Vojdani, *Methods of Testing Protein Functionality* 11-60 (G. M. Hall, ed., 1996).

In some embodiments, a standard plate count of bacteria may be lower than about 100,000 cfu/g, or lower than about 80,000 cfu/g, or lower than about 60,000 cfu/g, or lower than about 50,000 cfu/g, or lower than about 40,000 cfu/g, or lower than about 30,000 cfu/g, or lower than about 25,000 cfu/g, or lower than about 20,000 cfu/g, or lower than about 15,000 cfu/g, or lower than about 10,000 cfu/g, or lower than about 5,000 cfu/g, or lower than about 1000 cfu/g, or lower than about 500 cfu/g. If a protein concentrate comprises any *Escherichia coli*, the bacteria may be present at such low levels as to be undetectable and/or noninfectious. If a protein concentrate comprises any *Salmonella* spp., the bacteria may be present at such low levels as to be undetectable and/or noninfectious. If a protein concentrate comprises any yeast/mold, the microorganism count may be lower than about 500/g, or lower than about 400/g, or lower than about 300/g, or lower than about 250/g, or lower than about 200/g, or lower than about 150/g, or lower than about 100/g, or lower than about 50/g.

In some embodiments, a protein concentrate may be packed and/or sealed in either an industry standard bag or drum of varying sizes. A sealing method of industry-standard grade may be used to ensure proper shelf-life and shipping conditions. A bag or drum may include printed instructions or specifications regarding, for example, its intended use, shelf-life, suggested storage conditions, shipping conditions, compositions, or the like, or a combination thereof. An antioxidant (e.g., rosemary extract) may be mixed with a protein concentrate before packaging, according to some embodiments.

Processing a First Solid and/or Solid Mixture

A first solid (e.g., first portion, second portion) and/or solid mixture (e.g., first portion, second portion) may be processed to generate one or more carbohydrate-rich products and/or a polysaccharide product (e.g., apiogalacturonan, oligogalacturonide, polygalacturonide). As described previously, a solid mixture may include one or more of a first solid (e.g., FIG. 2, 231), a first cake (e.g., 242), a second cake (e.g., FIG. 2, 247), or any combination thereof that remain after one or more separation processes (e.g., FIG. 2, 230/240/245, FIG. 5A 530/540/545). Carbohydrate rich products may include a dry biocrude product suitable as a fuel feedstock or a carbohydrate-rich meal suitable as a human or animal feed supplement (e.g., *Lemna* meal). A polysaccharide product may include at least one apiogalacturonan, and/or at least one oligogalacturonide, and/or at least one polygalacturonide, or any combination thereof.

Generating a Dry Biocrude and/or a Carbohydrate-Rich Meal

A first solid and/or solid mixture may be processed (e.g., drying, pelletization), in some embodiments, to generate at least one of a dry biocrude and a carbohydrate-rich meal. According to some embodiments, processing a first solid and/or solid mixture involves drying and/or pelletization.

A process for generating a carbohydrate-rich product (e.g., dry biocrude and/or carbohydrate-rich) meal may be varied depending upon the specific characteristics desired, including, for example, moisture content, particle size, protein content, fat content, fiber content, ash content, shelf-life, pellet size, texture, or any combination thereof.

In some embodiments, a first solid and/or a solid mixture may be dried to reduce a moisture content of a resulting carbohydrate-rich product (e.g., dry biocrude and/or carbohydrate-rich meal). A drying procedure, in some embodiments, may be performed in conjunction with (e.g., prior to, following) other processing of a first solid and/or a solid mixture, such that the end product is a carbohydrate-rich product with a reduced moisture content. A drying procedure may be performed, in some embodiments, using a dryer mechanism including, for example, a spray dryer, double drum dryer, flash dryer, evaporator, or any combination thereof.

In some embodiments, an inlet temperature of a dryer mechanism (e.g., the temperature at the entrance to a dryer) may be above or above 25° C., or above 50° C., or above 75° C., or above 100° C., or above 125° C., or above 150° C., or above 175° C., or above 200° C., or above 225° C., or above 250° C., or above 275° C., or above 300° C., or above 325° C., or above 350° C., or above 375° C., or above 400° C., or above 425° C., or above 450° C., or above 475° C., or above 500° C. An inlet temperature may be from about 25° C. to about 50° C., or from about 50° C. to about 75° C., or from about 75° C. to about 100° C., or from about 100° C. to about 125° C., or from about 125° C. to about 150° C., or from about 150° C. to about 175° C., or from about 175° C. to about 200° C., or from about 200° C. to about 225° C., or from about 225° C. to about 250° C., or from about 250° C. to about 275° C., or from about 275° C. to about 300° C., or from about 300° C. to about 325° C., or from about 325° C. to about 350° C., or from about 350° C. to about 375° C., or from about 375° C. to about 400° C., or from about 400° C. to about 425° C., or from about 425° C. to about 450° C., or from about 450° C. to about 475° C., or from about 475° C. to about 500° C., or above 500° C., in some embodiments. An inlet temperature, according to some embodiments, may be from about 50° C. to about 100° C., or from about 100° C. to about 150° C., or from about 150° C. to about 200° C., or from about 200° C. to about 250° C., or from about 250° C. to about 300° C., or from about 300° C. to about 350° C., or from about 350° C. to about 400° C., or from about 400° C. to about 450° C., or from about 450° C. to about 500° C., or above 500° C.

According to some embodiments, an outlet temperature of a dryer mechanism (e.g., the temperature at the exit from a dryer) may be below about 300° C., or below about 275° C., or below about 250° C., or below about 225° C., or below about 200° C., or below about 175° C., or below about 150° C., or below about 125° C., or below about 100° C., or below about 75° C., or below about 50° C., or below about 25° C. An outlet temperature, in some embodiments, may be from about 300° C. to about 275° C., or from about 275° C. to about 250° C., or from about 250° C. to about 225° C., or from about 225° C. to about 200° C., or from about 200° C. to about 175° C., or from about 175° C. to about 150° C., or from about 150° C. to about 125° C., or from about 125° C. to about 100° C., or from about 100° C. to about 75° C., or from about 75° C. to about 50° C., or from about 50° C. to about 25° C., or below about 25° C. In some embodiments, an outlet temperature may be from about 300° C. to about 250° C., or from about 250° C. to about 200° C., or from about 200° C. to about 150° C., or from about 150° C. to about 100° C., from about 100° C. to about 50° C., or from about 50° C. to about 25° C., or below about 25° C.

A volume of a first solid and/or a solid mixture may be mixed with a volume of a carbohydrate-rich product (e.g., dry biocrude and/or carbohydrate-rich meal) prior to drying, in some embodiments. This process, known as back-mixing, may be employed when, for example, the moisture content of a first solid and/or a solid mixture exceeds the level that a dryer mechanism is capable of accepting. By back-mixing a carbohydrate-rich product with a first solid and/or a solid mixture the total moisture content may be kept within the specifications of a dryer mechanism, thereby reducing operational costs (e.g., wear and tear on equipment).

A moisture content of a carbohydrate-rich product (e.g., dry biocrude and/or carbohydrate-rich meal) may be below about 90%, or below about 80%, or below about 70%, or below about 60%, or below about 50%, or below about 40%, or below about 30%, or below about 20%, or below about 10%, or below about 5%, or below about 1% by weight of the product, in some embodiments.

According to some embodiments a first solid and/or a solid mixture may be pelletized (e.g., steam pelletization). Pelletization may be performed before or after a drying procedure, in some embodiments.

Lutein Rich Products

According to some embodiments, the present disclosure relates to processes for a production of lutein rich products from a harvested microcrop (e.g., a photosynthetic aquatic species, an aquatic plant species, *Lemna*, algal species) according to specific example embodiments of the disclosure. Lutein rich products may include a dry biocrude product (e.g., suitable as a fuel feedstock), or a soluble protein concentrate (e.g., suitable as a human or an animal feed supplement), or a dry protein concentrate (e.g., suitable as a human or an animal feed supplement). A dry biocrude may be used as fuel feedstock (e.g., power plant, refinery, coker) for combustion, co-combustion with other hydrocarbon-based fuels (e.g., coal), and feedstock for biofuel conversion and/or fermentation. Whereas a soluble protein product, a dry protein concentrate, or any combination thereof may be suitable may be used as a feed or feed supplement for animal (e.g., fish, swine, cattle) or human consumption. A lutein rich product may also be used in an animal bedding and/or litter.

In some embodiments, the present disclosure relates to processes, methods, and systems for a production of lutein rich products, a soluble protein, or a dry protein concentrate.

A soluble protein product or a dry protein concentrate, according to some embodiments, may comprise a lutein concentration of at least 100 mg/kg or at least 150 mg/kg, or at least 200 mg/kg, or at least 250 mg/kg, or at least 300 mg/kg, or at least 350 mg/kg, or at least 400 mg/kg, or at least 450 mg/kg, or at least 500 mg/kg, or at least 550 mg/kg, or at least 600 mg/kg, or at least 650 mg/kg, or at least 700 mg/kg, or at least 750 mg/kg. In some embodiments, a soluble protein product or a dry protein concentrate may comprise a lutein concentration of at least about 500 mg/kg, or at least about at least about 550 mg/kg, or at least about 560 mg/kg, or at least about 570 mg/kg, or at least about 580 mg/kg, at least about 585 mg/kg, at least about 590 mg/kg, at least about 595 mg/kg, at least about 600 mg/kg, at least about 605 mg/kg, at least about 610 mg/kg, at least about 615 mg/kg, at least about 620 mg/kg, at least about 625 mg/kg, and at least about 630 mg/kg, or at least about 640 mg/kg, or at least about 650 mg/kg, or at least about 660 mg, or at least about 670 mg/kg, or at least about 680 mg/kg, or at least about 690 mg/kg, or at least about 700 mg/kg.

Generating a Polysaccharide Product

A first solid and/or solid mixture may be processed (e.g., extracted, separated), in some embodiments, to generate at least one polysaccharide product (e.g., a product comprising a polysaccharide). According to some embodiments, a first solid and/or solid mixture may be dried (e.g., fully dried, partially dried) prior to processing (e.g., extracting, separating). A polysaccharide product may include an apiogalacturonan, an oligogalacturonide, a polygalacturonide, or a combination thereof.

According to some embodiments, processing a first solid and/or solid mixture may involve at least one of: (1) extracting with an acid solution or (2) extracting with an oxalic acid solution or an oxalate solution to form a polysaccharide extract. A polysaccharide extract may include an apiogalacturonan, an oligogalacturonide, a polygalacturonide, or a combination thereof. In some embodiments, at least a portion of a polysaccharide extract may be concentrated (e.g., evaporation). A polysaccharide extract may be separated, according to some embodiments, to form a polysaccharide product including at least one apiogalacturonan, at least one oligogalacturonide, and/or at least one polygalacturonide. For example, in some embodiments, a method for generating a polysaccharide product comprises (a) extracting a first solid and/or a solid mixture with an acid solution to form a polysaccharide extract, (b) precipitating the polysaccharide extract with at least one solvent (e.g., ethanol) to form a precipitant and a supernatant, (c) separating the precipitant from the supernatant by, for example, centrifugation or filtration to form a polysaccharide product.

(1) Extracting with an Acid Solution

In some embodiments, processing a first solid and/or solid mixture to form a polysaccharide extract and/or a polysaccharide product (e.g., at least one apiogalacturonan, oligogalacturonide, and/or polygalacturonide) may involve extracting with an acid solution. Extracting with an acid solution may be performed by exposing (e.g., submerging) a first solid and/or solid mixture to an acid solution (e.g., hydrochloric acid). An acid solution, in some embodiments, may be combined with a first solid and/or solid mixture to form a slurry. An acid solution may include at least one of hydrochloric acid, sulfuric acid, perchloric acid, hydroiodic acid, hydrobromic acid, p-toluenesulfonic acid, methanesulfonic acid, nitric acid, chloric acid, citric acid, and trifluoroacetic acid (TFA).

According to some embodiments, extracting with an acid may include exposing (e.g., submerging) a first solid and/or solid mixture to an acid solution (e.g., hydrochloric acid) until carbohydrates are no longer detectable (e.g., phenol/sulfuric acid detection method; anion exchange liquid phase chromatography (HPAEC), gas phase chromatography (GPC)). Extracting with an acid, in some embodiments, may include exposing (e.g., submerging) a first solid and/or solid mixture to an acid solution (e.g., hydrochloric acid) for a specified period of time. For example, a first solid and/or solid mixture may be exposed to an acid solution (e.g., hydrochloric acid) for about 0.25 hours, or about 0.5 hours, or about 0.75 hours, or about 1 hour, or about 2 hours, or about 3 hours, or about 4 hours, or about 5 hours, or about 6 hours, or about 7 hours, or about 8 hours, or about 9 hours, or about 10 hours. In some embodiments, extracting with an acid may include moving (e.g., agitating, stirring, propelling) at least a portion of a an acid solution at a specified time, intermittently, or continually.

Acid extraction may be performed at any desirable temperature. According to some embodiments, acid extraction may be performed at room temperature, above room temperatures, or below room temperature. In some embodiments acid extraction may be performed at (e.g., an acid solution is maintained at a temperature of) a temperature below about 40° C., or below about 30° C., or below about 20° C., or below about 15° C., or below about 10° C., or below about 15° C., or below about 10° C., or below about 5° C., or below about 2° C., or below about 1° C., or below about 0° C. Acid extraction may be performed, in some embodiments, at (e.g., an acid solution is maintained at a temperature above of) a temperature above about 30° C., or above about 35° C., or above about 40° C., or above about 45° C., or above about 50° C., or above about 55° C., or above about 60° C., or above about 65° C., or above about 70° C., or above about 75° C., or above about 80° C., or above about 85° C., or above about 90° C., or above about 95° C. In some embodiments, acid extraction may be performed at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C., or between about 35° C. and about 45° C., or between about 40° C. and about 50° C., or between about 45° C. and about 55° C., or between about 50° C. and about 60° C., or between about 55° C. and about 65° C., or between about 60° C. and about 70° C., or between about 65° C. and about 75° C., or between about 70° C. and about 80° C., or between about 75° C. and about 85° C., or between about 80° C. and about 90° C., or between about 85° C. and about 95° C., or between about 90° C. and about 100° C.

According to some embodiments, a first solid and/or solid mixture may be exposed to an acid solution (e.g., hydrochloric acid), wherein the acid solution may have a composition of acid (e.g., hydrochloric acid) by weight/volume (w/v) of about 0.1%, or about 0.2%, or about 0.3%, or about 0.4%, or about 0.5%, or about 0.6%, or about 0.7%, or about 0.8%, or about 0.9%, or about 1%, or about 1.1%, or about 1.2%, or about 1.3%, or about 1.4%, or about 1.5%, or about 1.6%, or about 1.7%, or about 1.8%, or about 1.9%, or about 2%.

In some embodiments, acid extractions may be performed on a first solid and/or solid mixture that has undergone drying (e.g., FIG. 3, 335). For example, a first solid and/or solid mixture that has undergone drying, may be extracted with an acid to dried solid ratio comprising about 15:1, about 14:1, about 13:1, about 12:1, about 11:1, about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, about 1:10, about 1:11, about 1:12, about 1:13, about 1:14, or about 1:15.

Acid extraction may be performed on a first solid and/or solid mixture, according to some embodiments, at a temperature of about 85° C., wherein the first solid and/or solid mixture may be exposed to an acid solution (e.g., hydrochloric acid) with a composition of acid by weight volume (w/v) of about 0.4%; wherein the first solid and/or solid mixture may be exposed to the acid solution for about 0.5 hours.

According to some embodiments, an extraction acid may be removed from a solid and/or a solid mixture by any desired method. For example, an acid may be removed by actual removal from the material (e.g., evaporation) and/or it may be titrated to a desired pH (e.g., less acidic, neutral, or basic) by addition of a suitable base or buffer.

(2) Extracting with an Oxalic Acid Solution or an Oxalate Solution

In some embodiments, processing a first solid and/or solid mixture to form a polysaccharide product (e.g., at least one apiogalacturonan, oligogalacturonide, and/or polygalacturonides) may involve extracting with an oxalic acid solution or an oxalate solution (e.g., ammonium oxalate). Extracting with an oxalic acid solution or an oxalate solution may be performed by exposing (e.g., submerging) a first solid and/or solid mixture to an oxalic acid solution (e.g., 0.5% oxalic acid solution) or an oxalate solution (e.g., 1% ammonium oxalate solution). An oxalic acid solution or an oxalate solution, in some embodiments, may be combined with a first solid and/or solid mixture to form a slurry. In some embodiments, an oxalic acid solution may have a composition of oxalic acid by weight/volume (w/v) (e.g., with water as the solvent) of about 0.1%, or about 0.2%, or about 0.3%, or about 0.5%, or about 1%, or about 5%, or about 10%, or about 15%, or about 20%, or about 25%, or about 30%, or about 35%, or about 40%, or about 45%, or about 50%, or about 55%, or about 60%. An oxalate solution, in some embodiments, may have a composition of oxalate (exclusive of any counter-ion(s) that may be present) by weight/volume (w/v) (e.g., with water as the solvent) of about 0.3%, or about 0.4%, or about 0.5%, or about 0.6%, or about 0.7%, or about 0.8%, or about 0.9%, or about 1%, or about 1.1%, or about 1.2%, or about 1.3%, or about 1.4%, or about 1.5%, or about 1.6%, or about 1.7%, or about 1.8%, or about 1.9%, or about 2%.

According to some embodiments, extracting with an oxalic acid solution or an oxalate solution may include exposing (e.g., submerging) a first solid and/or solid mixture to an oxalic acid (e.g., 0.5% oxalic acid solution) or an oxalate solution (e.g., 1% ammonium oxalate solution) until carbohydrates are no longer detectable (e.g., phenol/sulfuric acid detection method; HPAEC, GPC). Extracting with an oxalic acid solution or an oxalate solution, in some embodiments, may include exposing (e.g., submerging) a first solid and/or solid mixture to an oxalic acid solution (e.g., 0.5% oxalic acid) or an oxalate solution (e.g., 1% ammonium oxalate) for a specified period of time. For example, a first solid and/or solid mixture may be exposed to an oxalate solution (e.g., 1% ammonium oxalate) for about 1 hour or about 1.5 hours, or about 2 hours, or about 2.5 hours, or about 3 hours, or about 3.5 hours, or about 4 hours, or about 4.5 hours, or about 5 hours. In some embodiments, extracting with an oxalic acid solution or an oxalate solution may include moving (e.g., agitating, stirring, propelling) at least a portion of the oxalic acid or the oxalate solution at a specified time, intermittently, or continually.

Extraction with an oxalic acid solution or an oxalate solution may be performed, according to some embodiments, at temperatures at or below room temperature. In some embodiments extraction with an oxalic acid solution or an oxalate solution may be performed at (e.g., an oxalate solution is maintained at a temperature of) a temperature below about 40° C., or below about 30° C., or below about 20° C., or below about 15° C., or below about 10° C., or below about 15° C., or below about 10° C., or below about 5° C., or below about 2° C., or below about 1° C., or below about 0° C. In some embodiments, extraction with an oxalic acid solution or an oxalate solution may be performed at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C.

(3) Processing a Polysaccharide Extract

In some embodiments, at least a portion of a polysaccharide extract may be concentrated (e.g., by evaporation, precipitation, dialysis, filtration, centrifugation, dewatering or any other desired water removal technique).

Figure 5B:
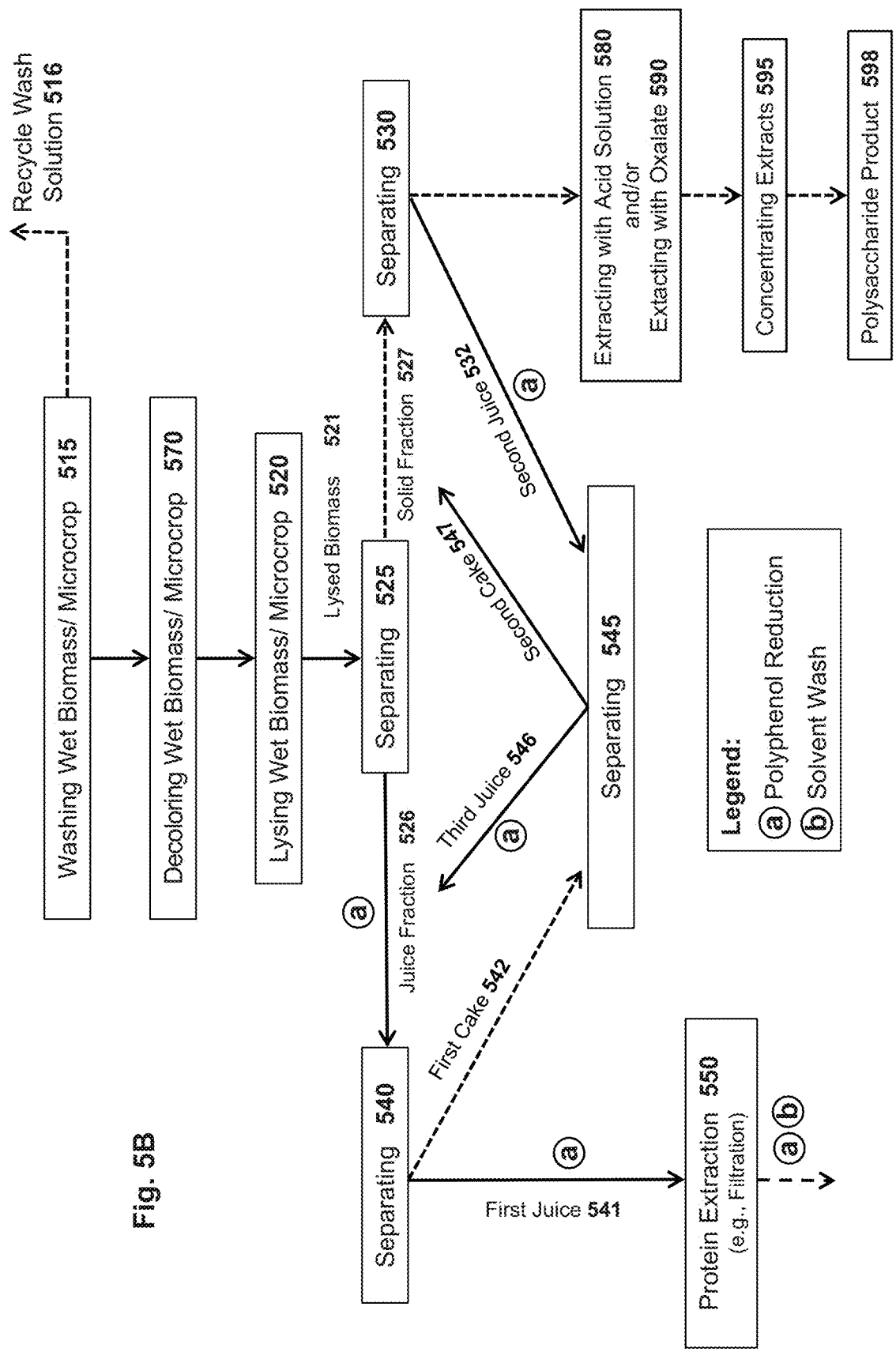
FIG. 5B is a flow diagram illustrating a process for producing a polysaccharide product (e.g., apiogalacturonan, oligogalacturonide, polygalacturonide) and/or a protein concentrate from a biomass according to a specific example embodiment of the disclosure.

According to some embodiments, at least a portion of a polysaccharide extract may be concentrated by evaporation (e.g., FIGS. 5A and 5B 595). Evaporation may be performed by, for example, a thermal (evaporative) means such as: a rising film evaporator, a falling film evaporator, a natural circulation evaporator (vertical or horizontal), an agitated-film evaporator, a multiple-effect evaporator, by vacuum evaporation, by rotoevaporation, or any combination thereof.

Concentration of at least a portion of a polysaccharide extract may involve separating at least one apiogalacturonan and/or oligogalacturonide from the polysaccharide extract (e.g., filtration, precipitation) to form a polysaccharide product, according to some embodiments.

According to some embodiments, concentration of at least a portion of a polysaccharide extract may involve precipitation (e.g., ethanol). In some embodiments, at least a portion of a polysaccharide may be precipitated by adding a volume (e.g., two-fold volume) of ethanol (e.g., 50%, 60%, 70%, 80%, 90%, 95%, 98%, 99%) and isolating a pellet of polysaccharide by centrifugation. At least a portion of a polysaccharide may be precipitated using a ratio of at least one solvent (e.g., ethanol) to a polysaccharide extract, the ratio comprising about 15:1, about 14:1, about 13:1, about 12:1, about 11:1, about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, about 1:10, about 1:11, about 1:12, about 1:13, about 1:14, or about 1:15. In some embodiments, a portion of a polysaccharide extract may be precipitated (i.e., recrystallized) at a temperature above about −20° C., above about −10° C., above about 0° C., above about 20° C., or above about 25° C., or above about 30° C., or above about 35° C., or above about 40° C., or above about 45° C., or above about 50° C., or above about 55° C., or above about 60° C., or above about 65° C., or above about 70° C., or above about 75° C., or above about 80° C., or above about 85° C., or above about 90° C., or above about 95° C., or above about 100° C., or above about 110° C., above about 120° C.

In some embodiments, concentration of at least a portion of a polysaccharide extract may involve ultrafiltration of the polysaccharide extract to form a polysaccharide product. Ultrafiltration may involve membrane filtration using pressure, concentration gradients, diafiltration with deionized (DI) water, or a combination thereof. Suitable nominal molecular weight cut-offs (NMWCO) for ultrafiltration of a polysaccharide extract may be, in some embodiments, at most about 30 kDa, or at most about 20 kDa, or at most about 15 kDa, or at most about 14 kDa, or at most about 13 kDa, or at most about 12 kDa, or at most about 11 kDa, or at most about 10 kDa, or at most about 9 kDa, or at most about 8 kDa, or at most about 7 kDa, or at most about 6 kDa, or at most about 5 kDa, or at most about 4 kDa, or at most about 3 kDa, or at most about 2 kDa, or at most about 1 kDa. In some embodiments, suitable NMWCO cut-offs for ultrafiltration may be in a range of at most about 1 kDa to at most about 10 kDa, at most about 2 kDa to at most about 10 kDa, at most about 3 kDa to at most about 10 kDa, at most about 3 kDa to at most about 15 kDa, or at most about 3 kDa to at most about 20 kDa, or at most about 3 kDa to at most about 30 kDa. In some embodiments, concentration of at least a portion of a polysaccharide extract may involve nanofiltration or reverse osmosis filtration of the polysaccharide extract to form a polysaccharide product. In some embodiments, suitable filter sizes for nanofiltration may include ≤about 0.01 μm, or ≤about 0.009 μm, or ≤about 0.008 μm, or ≤about 0.007 μm, or ≤about 0.006 μm, or ≤about 0.005 μm, or ≤about 0.004 μm, or ≤about 0.003 μm, or ≤about 0.002 µm, or ≤about 0.001 µm. A nanofiltration filter may have a filter size of not more than about 0.01 µm, in some embodiments. According to some embodiments, suitable filter sizes for reverse osmosis filtration may include ≤about 0.001 µm, ≤about 0.0009 µm, ≤about 0.0008 µm, ≤about 0.0007 µm, ≤about 0.0006 µm, ≤about 0.0005 µm, ≤about 0.0004 µm, ≤about 0.0003 µm, ≤about 0.0002 µm, or ≤about 0.0001 µm. A reverse osmosis filter may have a filter size of not more than about 0.001 µm, in some embodiments.

Carbohydrate Rich Products

The present disclosure, in some embodiments, relates to processes for production of carbohydrate rich products (e.g., dry biocrude, carbohydrate-rich meal, polysaccharide extract, polysaccharide product) from a harvested microcrop (e.g., photosynthetic aquatic species, aquatic plant species, *Lemna*, algal species) according to specific example embodiments of the disclosure. Carbohydrate rich products may include a dry biocrude product suitable as a fuel feedstock or a carbohydrate-rich meal suitable as an animal feed supplement. A dry biocrude has many potential uses including: fuel feedstock (e.g., power plant, refinery, coker) for combustion; co-combustion with other hydrocarbon-based fuels (e.g., coal); and feedstock for biofuel conversion and/or fermentation. A carbohydrate meal (e.g., *Lemna* meal) may be used as a feed or feed supplement for animal (e.g., fish, swine, cattle) or human consumption. A carbohydrate-rich meal may also be used in an animal bedding and/or litter. A carbohydrate-rich product, according to some embodiments, may include a solid fraction (e.g., FIG. 5B, 527), or a first solid (e.g., FIG. 4, 431), or a solid mixture, or a polysaccharide extract, or a polysaccharide product.

A carbohydrate-rich product (e.g., dry biocrude and/or carbohydrate-rich meal, polysaccharide extract, polysaccharide product) may have a protein content lower than about 50 wt. %, or lower than about 40 wt. %, or lower than about 30 wt. %, or lower than about 25 wt. %, or lower than about 20 wt. %, or lower than about 15 wt. %, or lower than about 14 wt. %, or lower than about 13 wt. %, or lower than about 12 wt. %, or lower than about 11 wt. %, or lower than about 10 wt. %, or lower than about 5 wt. % by weight of the product. In some embodiments, a carbohydrate-rich product (e.g., dry biocrude and/or carbohydrate-rich meal, polysaccharide extract, polysaccharide product) may have a protein content from about 1 wt. % to about 10 wt. %, or from about 10 wt. % to about 20 wt. %, or from about 20 wt. % to about 30 wt. %, or from about 30 wt. % to about 40 wt. %, or from about 40 wt. % to about 50 wt. % by weight of the product. In some embodiments, a carbohydrate-rich product (e.g., dry biocrude and/or carbohydrate-rich meal, polysaccharide extract, polysaccharide product) may have a protein content from about 1 wt. % to about 50 wt. %, or from about 5 wt. % to about 40 wt. %, or from about 5 wt. % to about 30 wt. %, or from about 5 wt. % to about 20 wt. %, or from about 5 wt. % to about 15 wt. %, or from about 5 wt. % to about 10 wt. %, or from about 10 wt. % to about 50 wt. %, or from about 10 wt. % to about 40 wt. %, or from about 10 wt. % to about 30 wt. %, or from about 10 wt. % to about 20 wt. %, or from about 10 wt. % to about 15 wt. % by weight of the product. A carbohydrate-rich product may be further processed to meet a desired protein content (e.g., higher or lower concentration, a desired amino acid composition).

In some embodiments a carbohydrate-rich product (e.g., dry biocrude, carbohydrate-rich meal polysaccharide extract, polysaccharide product) may have a fiber content lower than about 70%, or lower than about 60%, or lower than about 50 wt. %, or lower than about 40 wt. %, or lower than about 30 wt. %, or lower than about 20 wt. %, or lower than about 15 wt. %, or lower than about 10 wt. % by weight of the product. A carbohydrate-rich product, in some embodiments, may have a fiber content from about 1 wt. % to about 10 wt. %, or from about 10 wt. % to about 20 wt. %, or from about 15 wt. % to about 25 wt. %, or from about 20 wt. % to about 30 wt. %, or from about 25 wt. % to about 35 wt. %, or from about 30 wt. % to about 40 wt. %, or from about 35 wt. % to about 45 wt. %, or from about 40 wt. % to about 50 wt. %, or from about 45 wt. % to about 55 wt. %, or from about 50 wt. % to about 60 wt. %, or from about 55 wt. % to about 65 wt. % by weight of the product. A carbohydrate-rich product (e.g., dry biocrude, carbohydrate-rich meal, polysaccharide extract, polysaccharide product) may have a fiber content from about 5 wt. % to about 65 wt. %, or from about 5 wt. % to about 60 wt. %, or from about 5 wt. % to about 55 wt. %, or from about 5 wt. % to about 50 wt. %, or from about 5 wt. % to about 40 wt. %, or from about 10 wt. % to about 65 wt. %, or from about 10 wt. % to about 55 wt. %, or from about 10 wt. % to about 50 wt. %, or from about 10 wt. % to about 45 wt. %, or from about 10 wt. % to about 40 wt. %, or from about 20 wt. % to about 65 wt. %, or from about 20 wt. % to about 60 wt. %, or from about 20 wt. % to about 55 wt. %, or from about 20 wt. % to about 50 wt. %, or from about 20 wt. % to about 45 wt. %, or from about 20 wt. % to about 40 wt. %, or from about 30 wt. % to about 65 wt. %, or from about 30 wt. % to about 60 wt. %, or from about 30 wt. % to about 55 wt. %, or from about 30 wt. % to about 50 wt. %, or from about 30 wt. % to about 45 wt. %, or from about 30 wt. % to about 40 wt. %, or from about 40 wt. % to about 65 wt. %, or from about 40 wt. % to about 60 wt. %, or from about 40 wt. % to about 55 wt. %, or from about 40 wt. % to about 50 wt. %, or from about 40 wt. % to about 45 wt. % by weight of the product, according to some embodiments. According to some embodiments, a carbohydrate-rich product may be further processed to meet a desired fiber content (e.g., higher or lower concentration, a desired fiber composition).

A carbohydrate-rich product (e.g., dry biocrude, carbohydrate-rich meal, polysaccharide extract, polysaccharide product) may have, in some embodiments, an ash content lower than 50 wt. %, or lower than about 40 wt. %, or lower than about 30 wt. %, or lower than about 25 wt. %, or lower than about 20 wt. %, or lower than about 15 wt. %, or lower than about 10 wt. %, or lower than about 5 wt. % by weight of the product. In some embodiments, a carbohydrate-rich product (e.g., dry biocrude, carbohydrate-rich meal, polysaccharide extract, polysaccharide product) may have an ash content from about 1 wt. % to about 10 wt. %, or from about 10 wt. % to about 20 wt. %, or from about 20 wt. % to about 30 wt. %, or from about 30 wt. % to about 40 wt. %, or from about 40 wt. % to about 50 wt. % by weight of the product. A carbohydrate-rich product (e.g., dry biocrude, carbohydrate-rich meal, polysaccharide extract, polysaccharide product) may have an ash content from about 1 wt. % to about 50 wt. %, or from about 2 wt. % to about 40 wt. %, or from about 3 wt. % to about 30 wt. %, or from about 3 wt. % to about 20 wt. %, or from about 3 wt. % to about 15 wt. %, or from about 3 wt. % to about 10 wt. %, or from about 5 wt. % to about 10 wt. %, or from about 5 wt. % to about 15 wt. %, or from about 5 wt. % to about 20 wt. % by weight of the product, according to some embodiments. A carbohydrate-rich product may be further processed to meet a desired ash content (e.g., higher or lower concentration, a desired ash composition).

In some embodiments, a carbohydrate-rich product (e.g., dry biocrude, carbohydrate-rich meal, polysaccharide extract, polysaccharide product) may have a fat content lower than about 50 wt. %, or lower than about 40 wt. %, or lower than about 30 wt. %, or lower than about 25 wt. %, or lower than about 20 wt. %, or lower than about 15 wt. %, or lower than about 10 wt. %, or lower than about 5 wt. % by weight of the product. A carbohydrate-rich product (e.g., dry biocrude, carbohydrate-rich meal, polysaccharide extract, polysaccharide product) may have a fat content from about 1 wt. % to about 10 wt. %, or from about 5 wt. % to about 10 wt. %, or from about 10 wt. % to about 20 wt. %, or from about 20 wt. % to about 30 wt. %, or from about 30 wt. % to about 40 wt. %, or from about 40 wt. % to about 50 wt. % by weight of the product. According to some embodiments, a carbohydrate-rich product (e.g., dry biocrude, carbohydrate-rich meal, polysaccharide extract, polysaccharide product) may have a fat content from about 1 wt. % to about 50 wt. %, or from about 1 wt. % to about 40 wt. %, or from about 1 wt. % to about 30 wt. %, or from about 1 wt. % to about 20 wt. %, or from about 1 wt. % to about 15 wt. %, or from about 1 wt. % to about 10 wt. %, or from about 1 wt. % to about 5 wt. %, or from about 2 wt. % to about 40 wt. %, or from about 2 wt. % to about 30 wt. %, or from about 2 wt. % to about 20 wt. %, or from about 2 wt. % to about 15 wt. %, or from about 2 wt. % to about 10 wt. %, or from about 2 wt. % to about 5 wt. %, or from about 3 wt. % to about 30 wt. %, or from about 3 wt. % to about 20 wt. %, or from about 3 wt. % to about 15 wt. %, or from about 3 wt. % to about 10 wt. %, or from about 3 wt. % to about 5 wt. %, or from about 5 wt. % to about 10 wt. %, or from about 5 wt. % to about 15 wt. %, or from about 5 wt. % to about 20 wt. % by weight of the product. A carbohydrate-rich product may be further processed to meet a desired fat content (e.g., higher or lower concentration, a desired fat composition).

A carbohydrate-rich product (e.g., dry biocrude, carbohydrate-rich meal, polysaccharide extract, polysaccharide product) may have, according to some embodiments, a carbohydrate content higher than about 30 wt. %, or higher than about 40 wt. %, or higher than about 50 wt. %, or higher than about 60 wt. %, or higher than about 65 wt. %, or higher than about 70 wt. %, or higher than about 75 wt. %, or higher than about 80 wt. %, or higher than about 85 wt. % by weight of a dry bio-crude. In some embodiments, a carbohydrate product may have a carbohydrate content from about 30 wt. % to about 90 wt. %, or from about 40 wt. % to about 90 wt. %, or from about 50 wt. % to about 90 wt. %, or from about 60 wt. % to about 90 wt. %, or from about 70 wt. % to about 90 wt. %, or from about 80 wt. % to about 90 wt. %, or from about 30 wt. % to about 85 wt. %, or from about 40 wt. % to about 85 wt. %, or from about 50 wt. % to about 85 wt. %, or from about 60 wt. % to about 85 wt. %, or from about 70 wt. % to about 85 wt. %, or from about 30 wt. % to about 80 wt. %, or from about 40 wt. % to about 80 wt. %, or from about 50 wt. % to about 80 wt. %, or from about 60 wt. % to about 80 wt. %, or from about 70 wt. % to about 80 wt. % by weight of the product. A carbohydrate-rich product may be further processed to meet a desired carbohydrate content (e.g., higher or lower concentration, a desired carbohydrate composition).

According to some embodiments, a carbohydrate-rich product may comprise at least one apiogalacturonan, at least one oligogalacturonan, at least one polygalacturonide, or a combination thereof. In some embodiments, a carbohydrate-rich product may have a concentration of at least one apiogalacturonan, at least one oligogalacturonan, at least one polygalacturonide, or a combination thereof of at least 5% (w/v), or at least 10% (w/v), or at least 15% (w/v), or at least 20% (w/v), or at least 25% (w/v), or at least 30% (w/v), or at least 35% (w/v), or at least 40% (w/v), or at least 45% (w/v), or at least 50% (w/v), or at least 55% (w/v), or at least 60% (w/v), or at least 65% (w/v), or at least 70% (w/v), or at least 75% (w/v), or at least 80% (w/v), or at least 85% (w/v), or at least 90% (w/v), or at least 95% (w/v). A first solid or a solid mixture, in some embodiments, may have a concentration of at least one apiogalacturonan, at least one oligogalacturonan, at least one polygalacturonide, or a combination thereof of up to or more than 30% (w/v). A first solid or a solid mixture, in some embodiments, may have a concentration of at least one apiogalacturonan, at least one oligogalacturonan, at least one polygalacturonide, or a combination thereof of up to or more than 35% (w/v).

According to some embodiments, a carbohydrate-rich product (e.g., dry biocrude, carbohydrate-rich meal, polysaccharide extract, polysaccharide product) may have a negligible amount of volatile matter. A carbohydrate-rich product may have a volatile matter content lower than about 1 wt. %, or lower than about 2 wt. %, or lower than about 5 wt. %, or lower than about 10 wt. %, or lower than about 15 wt. %, or lower than about 20 wt. % by weight of the product, in some embodiments. A carbohydrate-rich product may have, in some embodiments, a volatile matter content from about 1 wt. % to about 5 wt. %, or from about 1 wt. % to about 10 wt. %, or from about 1 wt. % to about 15 wt. %, or from about 1 wt. % to about 20 wt. %, from about 2 wt. % to about 10 wt. %, or from about 2 wt. % to about 15 wt. %, or from about 2 wt. % to about 20 wt. %, from about 5 wt. % to about 10 wt. %, or from about 5 wt. % to about 15 wt. %, or from about 5 wt. % to about 20 wt. % by weight of the product.

A carbohydrate-rich product (e.g., dry biocrude, carbohydrate-rich meal, polysaccharide extract, polysaccharide product) may have, in some embodiments, an energy content higher than about 3 MJ/kg, or higher than about 5 MJ/kg, or higher than about 8 MJ/kg, or higher than about 10 MJ/kg, or higher than about 12 MJ/kg, or higher than about 15 MJ/kg, or higher than about 50 MJ/kg, or higher than about 20 MJ/kg. A dry bio-crude may be further processed to meet a desired energy content (e.g., a higher or lower energy content, a desired energy content).

For example, a carbohydrate-rich product (e.g., dry biocrude, carbohydrate-rich meal, polysaccharide extract, polysaccharide product) produced by a process described herein may include the contents summarized in Table 3.

TABLE 3

Example Contents of Dry Biocrude and/or Carbohydrate-Rich Meal

|  | Product A | Product B | Product C |
| --- | --- | --- | --- |
| Wt. % Solids | ≥~90 | ≥~88 to ~92 | ≥~90 |
| % Moisture | ≥~10 | ≥~8-~12 | ≥~10 |
| % Protein | ≥~20 | from ~10 to ~20 | ≥~14 |
| % Fat | from ~5 to ~10 | from ~5 to ~20 | ≥~5 |
| % Ash | ≥~15 | from ~1 to ~20 | ≥~12 |
| % Carbohydrate | ≥~50 | from ~60 to ~90 | ≥~65 to ~70 |
| % Fiber | ≥~50 | ≥~40 | ≥~40 to ~60 |
| Energy (MJ/kg) | ≥~10 | ≥~10 | ≥~10 |

Component Ratios

According to some embodiments, the present disclosure relates to compositions comprising a soluble microcrop protein. For example, a composition comprising a soluble microcrop protein, may comprise two or more of the following components: protein, lutein, fats, carbohydrates, polyphenols, and fiber, wherein each component may be present at a concentration disclosed herein. Table 4 and Table 5 illustrate example embodiments of compositions comprising a soluble microcrop protein. A soluble microcrop protein composition, for example, may include two or more such components at a desirable ratio to each other. A desirable ratio may be selected from any disclosed concentration. Using Table 4 to illustrate, a ratio of protein to fat may be about 30:0.2 (w/w), or about 30:2 (w/w), or about 30:20 (w/w), or about 60:0.2 (w/w), or about 60:2 (w/w), or about 60:20 (w/w), or about 90:0.2 (w/w), or about 90:2 (w/w), or about 90:20 (w/w). A ratio of any other component to protein may be derived from Table 4 in the same manner. Using Table 5 to illustrate, a ratio of carbohydrate to fat may be about 1:0.2 (w/w), or about 1:2 (w/w), or about 1:20 (w/w), about 10:0.2 (w/w), or about 10:2 (w/w), or about 10:20 (w/w), about 50:0.2 (w/w), or about 50:2 (w/w), or about 50:20 (w/w). A ratio of any other component to protein may be derived from Table 5 in the same manner.

According to some embodiments, the protein to polyphenol ratio of a composition comprising a soluble microcrop protein may be greater than the protein to polyphenol ratio in a living, intact microcrop (e.g., *Lemna*), from which the soluble microcrop protein is derived. For example, the protein to polyphenol ratio of a composition comprising a soluble microcrop protein may be about 70:1 (w/w), about 65:1 (w/w/), about 60:1 (w/w), about 55:1 (w/w), about 50:1 (w/w), about 45:1 (w/w), about 35:1 (w/w), about 25:1 (w/w), about 10:1 (w/w), about 5:1 (w/w), about 4:1 (w/w), about 3:1 (w/w), about 2:1 (w/w), and about 1.5:1 (w/w).

TABLE 4

Example of Concentration Ratios
(Protein: Fats, Lutein, Carbohydrates, Fiber, or Polyphenols) (w/w)

| Protein | | |
|---|---|---|
| 30, 60, 90 | 0.2, 2, 20 | Fats |
| | 0.01, 0.05, 0.1 | Lutein |
| | 1, 10, 50 | Carbohydrates |
| | 1, 20, 70 | Fiber |
| | 0.05, 0.5, 2 | Polyphenols |

TABLE 5

Examples of Concentration Ratios
(Carbohydrates: Fats, Lutein, Proteins, Fiber, or Polyphenols) (w/w)

| Carbohydrates | | |
|---|---|---|
| 1, 10, 50 | 0.2, 2, 20 | Fats |
| | 0.01, 0.05, 0.1 | Lutein |
| | 30, 60, 90 | Proteins |
| | 1, 20, 70 | Fiber |
| | 0.05, 0.5, 2 | Polyphenols |

A Polysaccharide Product

The present disclosure, in some embodiments, relates to processes for production of a polysaccharide products (e.g., apiogalacturonan, oligogalacturonide, and/or polygalacturonide) from a harvested microcrop (e.g., photosynthetic aquatic species, aquatic plant species, *Lemna*, algal species) according to specific example embodiments of the disclosure. A polysaccharide products may include at least one apiogalacturonan and/or at least one oligogalacturonide. A polysaccharide product has many potential uses including: a cosmetic or dermatological additive (e.g., topical formulations, serums, make-up, lotions, sunscreen, cleansers); cryoconservation applications; agricultural applications (e.g., spray, treatment) for stimulation of plant disease resistance and defense mechanisms.

According to some embodiments, a polysaccharide product may have a concentration of at least one apiogalacturonan of at least 5% (w/v), or at least 10% (w/v), or at least 15% (w/v), or at least 20% (w/v), or at least 25% (w/v), or at least 30% (w/v), or at least 35% (w/v), or at least 40% (w/v), or at least 45% (w/v), or at least 50% (w/v), or at least 55% (w/v), or at least 60% (w/v), or at least 65% (w/v), or at least 70% (w/v), or at least 75% (w/v), or at least 80% (w/v), or at least 85% (w/v), or at least 90% (w/v), or at least 95% (w/v). A polysaccharide product, in some embodiments, may have a concentration of at least one apiogalacturonan of up to or more than 30% (w/v). In some embodiments, a polysaccharide product may have a concentration of at least one apiogalacturonan of up to or more than 35% (w/v). Concentrations recited in this paragraph may refer to a single apiogalacturonan or to the combined (total) concentration of two or more (up to all) apiogalacturonans present, according to some embodiments.

A polysaccharide product, in some embodiments, may have a concentration of at least one oligogalacturonide of at least 5% (w/v), or at least 10% (w/v), or at least 15% (w/v), or at least 20% (w/v), or at least 25% (w/v), or at least 30% (w/v), or at least 35% (w/v), or at least 40% (w/v), or at least 45% (w/v), or at least 50% (w/v), or at least 55% (w/v), or at least 60% (w/v), or at least 65% (w/v), or at least 70% (w/v), or at least 75% (w/v), or at least 80% (w/v), or at least 85% (w/v), or at least 90% (w/v), or at least 95% (w/v). A polysaccharide product, in some embodiments, may have a concentration of at least one oligogalacturonide up to or more than 30% (w/v). In some embodiments, a polysaccharide product may have a concentration of at least one oligogalacturonide of up to or more than 35% (w/v). Concentrations recited in this paragraph may refer to a single oligogalacturonide or to the combined (total) concentration of two or more (up to all) oligogalacturonides present, according to some embodiments.

A polysaccharide product, in some embodiments, may have a concentration of at least one polygalacturonide of at least 5% (w/v), or at least 10% (w/v), or at least 15% (w/v), or at least 20% (w/v), or at least 25% (w/v), or at least 30% (w/v), or at least 35% (w/v), or at least 40% (w/v), or at least 45% (w/v), or at least 50% (w/v), or at least 55% (w/v), or at least 60% (w/v), or at least 65% (w/v), or at least 70% (w/v), or at least 75% (w/v), or at least 80% (w/v), or at least 85% (w/v), or at least 90% (w/v), or at least 95% (w/v). A polysaccharide product, in some embodiments, may have a concentration of at least one polygalacturonide up to or more than 80% (w/v). In some embodiments, a polysaccharide product may have a concentration of at least one polygalacturonide of up to or more than 85% (w/v). Concentrations recited in this paragraph may refer to a single polygalacturonide or to the combined (total) concentration of two or more (up to all) polygalacturonides present, according to some embodiments.

According to some embodiments, a concentration of a polysaccharide product may be determined by a phenol-sulfuric acid method, such as that described in Dubois, M., Gilles, K. A., Hamilton, J. K., et al., *Anal. Chem.*, 1956, vol. 28, no. 2, 350-356. A concentration of a polysaccharide product may be determined using UV spectrophotometry, such as that described in Albalasmeh, A., Berhe, A., and Ghezzeher, T., *Carbohydrate Polymers*, 2013, vol. 97, no. 2, 253-261, in some embodiments. Any desired method may be used to determine a concentration of a polysaccharide product.

A monosaccharide composition of a polysaccharide product may be determined by HPAEC, according to some embodiments. For example, HPAEC may be performed using a Dionex CarboPac PA1 column with amperometric detection of polysaccharide hydrolysis where hydrolysis was performed under the following conditions: (1) hydrolysis with 2N Trifluoracetic acid (TFA) at 100° C. for 0.5 hours; (2) hydrolysis with 2N TFA at 100° C. for 4 hours; (3) hydrolysis with 2N $H_2SO_4$ at 100° C. for 6 hours; (4) hydrolysis with 2N $H_2SO_4$ at 100° C. for 6 hours after overnight exposure to 26N $H_2SO_4$ at room temperature.

In some embodiments, a monosaccharide composition of a polysaccharide product may be determined by gas phase chromatography. For example, the relative composition of a monosaccharide of a polysaccharide product may be identified and quantified by (1) hydrolyzing the polysaccharide product to form monosaccaraides by methanolysis; (2) trimethylsilylation of the monosaccharides to form a volatilized monosaccharides derivative; and (3) quantifying and identifying the volatilized monosaccharides as O-methylglycosides by gas phase chromatography.

Any desired method may be used to determine a composition of a polysaccharide product. According to some embodiments, a polysaccharide product may comprise homopolysaccharides, heteropolysaccharides, or combinations thereof. In some embodiments, a polysaccharide product may comprise at least one monosaccharide, the at least one monosaccharide comprising L-glucose, D-glucose, L-fructose, D-fructose, L-galactose, D-galactose, L-mannose, D-mannose, L-glucuronic acid, D-glucuronic acid, L-fructuronic acid, D-fructuronic acid, L-galacturonic acid, D-galacturonic acid, L-mannuronic acid, D-mannuronic acid, and combinations thereof. In some embodiments, a polysaccharide product may comprise alpha monosaccharides (e.g., alpha-D-glucose), beta monosaccharides (e.g., beta-D-glucose), and combinations thereof. According to some embodiments, a polysaccharide product may comprise substituted carbohydrate monomers, the substituted carbohydrate monomers comprising glucuronide, galacturonide, fructuronide, mannuronide, and combinations thereof.

Heat Exchange

According to some embodiments, thermal energy exchange mechanisms (e.g., heat exchanger) may decrease an overall energy input required for the production of concentrated proteins and/or carbohydrate-rich products and/or a polysaccharide product from a microcrop (e.g., *Lemna*). In some embodiments, a chilled stream (e.g., recipient stream) may be directed to flow in proximity to a donor stream having thermal energy such that the chilled stream absorbs at least some of the donor stream thermal energy. A recipient stream, according to some embodiments, may be directed to flow in proximity to a donor stream having thermal energy such that the recipient stream absorbs at least some of the donor stream thermal energy.

In some embodiments, a recipient stream may be at least one of a lysed biomass (e.g., first portion, second portion), a juice fraction (e.g., first portion, second portion), a first juice (e.g., first portion, second portion), a first soluble protein fraction (e.g., first portion, second portion), a first reject stream, a second soluble protein fraction (e.g., first portion, second portion), a second reject stream, and a permeate. A recipient stream may be a chilled stream, in some embodiments. According to some embodiments at least one of a lysed biomass (e.g., first portion, second portion), a juice fraction (e.g., first portion, second portion), a first juice (e.g., first portion, second portion), a first soluble protein fraction (e.g., first portion, second portion), a first reject stream, a second soluble protein fraction (e.g., first portion, second portion), a second reject stream, and a permeate may be chilled to form a chilled stream. A recipient stream (e.g., a chilled stream) may have a temperature below room temperature (e.g., about 12° C.) at the time of use. In some embodiments, a recipient stream (e.g., a chilled stream) may have a temperature below about 30° C., or below about 20° C., or below about 15° C., or below about 10° C., or below about 5° C., or below about 2° C., or below about 1° C., or below about 0° C. at the time of use. A recipient stream (e.g., a chilled stream) may have a temperature between about 0° C. and about 10° C., or between about 5° C. and about 15° C., or between about 10° C. and about 20° C., or 15° C. and about 25° C., or between about 20° C. and about 30° C. at the time of use, in some embodiments. In some embodiments, a recipient stream (e.g., a chilled stream) may have a temperature of about 12° C. According to some embodiments, a recipient stream (e.g., a chilled stream) may have a temperature that is lower than a donor stream.

A donor stream, in some embodiments, may comprise at least one of a lysed biomass (e.g., first portion, second portion), a juice fraction (e.g., first portion, second portion), or a first juice (e.g., first portion, second portion). According to some embodiments, a donor stream may have a temperature that is higher than a recipient stream. In some embodiments, a donor stream may have a temperature above room temperature (e.g., about 50° C.). In some embodiments, a donor stream may have a temperature above about 20° C., or above about 25° C., or above about 30° C., or above about 35° C., or above about 40° C., or above about 45° C., or above about 50° C., or above about 55° C., or above about 60° C., or above about 65° C., or above about 70° C., or above about 75° C., or above about 80° C., or above about 85° C., or above about 90° C., or above about 95° C., or above about 100° C. at the time of use. A donor stream may have a temperature between about 40° C. and about 50° C., or between about 45° C. and about 55° C., or between about 50° C. and about 60° C. at the time of use, in some embodiments. According to some embodiments, a donor stream may have a temperature between about 75° C. and about 80° C., or between about 80° C. and about 85° C., or between about 85° C. and about 90° C., or between about 90° C. and about 95° C., or between about 95° C. and about 100° C. In some embodiments, a donor stream may have a temperature between about 50° C. and about 80° C., or between about 55° C. and about 85° C., or between about 60° C. and about 90° C., or between about 65° C. and about 95° C., or between about 70° C. and about 100° C.

In some embodiments, a thermal energy may be generated by one or more processes during production of concentrated proteins and/or carbohydrate-rich products and/or a polysaccharide product from a microcrop (e.g., *Lemna*). For example, a thermal energy may be generated by (1) drying a concentrated protein, (2) drying a carbohydrate-rich product (e.g., dry biocrude and/or carbohydrate-rich meal), and/or (3) chilling at least one of a lysed biomass (e.g., first portion, second portion), a juice fraction (e.g., first portion, second portion), a first juice (e.g., first portion, second portion), a first soluble protein fraction (e.g., first portion, second portion), a first reject stream, a second soluble protein fraction (e.g., first portion, second portion), a second reject stream, and a permeate to generate a chilled stream. According to some embodiments, a thermal energy may be generated in thermal communication with a heat exchanger. For example, chilling at least one of a juice fraction (e.g., first portion, second portion), a first juice (e.g., first portion, second portion), a first soluble protein fraction (e.g., first portion, second portion), a second soluble protein fraction (e.g., first portion, second portion) may be performed in thermal communication with a heat exchanger. Heating at least one of a wash solution, a first reject stream, a second reject stream, and a permeate may be performed in thermal communication with a heat exchanger, in some embodiments. In some embodiments, drying a concentrated protein and/or drying a carbohydrate-rich product may be performed in thermal communication with a heat exchanger.

FIG. 1

FIG. 1 is a schematic diagram illustrating a process 100 for growing, harvesting, and separating a microcrop (e.g., photosynthetic aquatic species, aquatic plant species, *Lemna*, algal species) for the production of protein concentrate and/or carbohydrate rich products according to a specific example embodiment of the disclosure. A microcrop (e.g., *Lemna*) may be cultivated in a bioreactor system 105, harvested 110, and separated 125 to form a juice fraction 126 and a solid fraction 127. In some embodiments, a juice fraction may be processed to produce one or more protein concentrate products and/or a solid fraction may be processed to produce one or more carbohydrate rich products. Protein concentrate products may include products suitable for animal feed and/or human consumption. Carbohydrate rich products may include a dry biocrude suitable as a fuel feedstock or a carbohydrate-rich meal suitable as a feed or supplement for animal and/or human consumption. A process 100 may be performed indoors, outdoors, and any combination thereof based, for example, on the specific environmental characteristics of the location(s).

As shown in FIG. 1, a microcrop may be cultivated in a bioreactor system 105 (e.g., open bioreactor, closed bioreactor). A bioreactor system may contain a growth medium (e.g., water, a nutrient composition). In some embodiments, a bioreactor system, in some embodiments, may be configured to collect rainfall and/or to intake water from a source of recycled or ground water (e.g., storm water, recycled water) or any other suitable source. A bioreactor system may be configured, in some embodiments, to insert additional nutrients (e.g., nitrogen, phosphorus, potassium) or gases (e.g., oxygen; carbon dioxide) at desired time indicators or in response to sensor readings. In some embodiments, a bioreactor system may comprise a monitoring system. A bioreactor system, in some embodiments, may monitor and adjust a thickness and distribution of a microcrop mat. For example, when a microcrop reaches a desired thickness or distribution a bioreactor system may initiate harvest procedures.

As shown in FIG. 1, at specified times (e.g., based on environmental conditions) or after a microcrop develops desired characteristics (e.g., mat thickness; mat distribution; maturation), a microcrop may be harvested 110 (e.g., manual, automated) from a bioreactor system, forming a biomass 111. An automated skimmer system, in some embodiments, may collect a microcrop from a bioreactor system and transfer a harvested microcrop (e.g., via a pumping system) onto an inclined vibrating screen to separate a biomass from growth medium and debris. In some embodiments a microcrop may be harvested by vacuum skimming the microcrop from a bioreactor system through a stationary screen filter. A microcrop may be harvested manually, according to some embodiments. A biomass slurry, including a harvested microcrop (e.g., *Lemna*) and a growth medium (e.g., water), may be conveyed to an inclined screen, which may optionally vibrate, where a biomass (e.g., microcrop) may be separated from the growth medium.

During harvesting 110, a separated growth medium may be recycled 112 back into the bioreactor system or to an additional storage container (e.g., container or pond), according to some embodiments. In some embodiments, at least about 40% (v/v), or at least about 50% (v/v), or at least about 60% (v/v), or at least about 70% (v/v), or at least about 80% (v/v), or at least about 90% (v/v), or at least about 95% (v/v) of a growth medium (e.g., water) separated from a biomass may be recycled for future use.

As shown in FIG. 1, a biomass 111 may go through a wash procedure 115 (e.g., submerging, spraying, slurry) to remove debris, contaminants, microorganisms, and/or toxins. In some embodiments a wash procedure may be performed by exposing (e.g., submerging, spraying) at least about one surface of a biomass to a wash solution (e.g., water, growth medium, antimicrobial solution). A wash solution (e.g., water, ozonated water), in some embodiments, may be combined with a biomass to form a slurry. According to some embodiments, a wash solution may comprise by volume at least about 10%, or at least about 20%, or at least about 30%, or at least about 40%, or at least about 50%, or at least about 60%, or at least about 70%, or at least about 80%, or at least about 90% recycled from another stage of process 100 (e.g., recycled wash solution 116, a reject stream from filtration stages (FIG. 2A, 252)). In some embodiments, a second wash solution (e.g., water, ozonated water, recycled wash solution 116) may be applied to a biomass. A third wash solution (e.g., water, ozonated water, recycled wash solution) may be applied to a biomass, in some embodiments. In some embodiments a first wash solution may be or may comprise a reject stream from a filtration process (e.g., FIG. 2A, 252), a second wash solution may be or may comprise water, and a third wash solution may be or may comprise ozonated water. Some or all of a wash solution (e.g., a first, second, and/or third wash solution), in some embodiments, may be separated from a biomass (e.g., using an inclined screen or vibratory screen).

In some embodiments, some or all of a wash solution, second wash solution, and/or third wash solution may be collected and reused/recycled 116/117. By volume, at least about 40%, or at least about 50%, or at least about 60%, or at least about 70%, or at least about 80%, or at least about 90%, or at least about 95% of a wash solution, second wash solution, and/or third wash solution (e.g., water) separated from the biomass may be recycled for future use (e.g., recycled wash solution 116, used as growth medium in the bioreactor system 117), according to some embodiments.

As shown in FIG. 1, a biomass, either washed or unwashed, may be lysed 120 (e.g., pressing, tearing, ultrasonic treatment). A lysing process may be achieved using, for example, a shear mill, a ball mill, colloid mill, knife mill, hammer mill, grinding mill, puree machine, filter press, or any combination thereof.

A lysed biomass 121 may be separated 125, as shown in FIG. 1, to form a juice fraction 126 and a solid fraction 127. Separating 125 a lysed biomass 121 or biomass may involve pressing (e.g., belt press), centrifugation (e.g., decanter centrifuge), filtration, pressurized filtration, or any combination thereof. Interchangeable unit operations for separating the lysed biomass and/or biomass include, for example, a decanter centrifuge, a belt press, a fan press, a rotary press, a screw press, a filter press, a finisher press, or any combination thereof.

In some embodiments, a juice fraction 126, may undergo a processing step for the reduction of at least one polyphenol (a). A polyphenol reduction process may comprise passing a juice fraction 126, through a series (e.g., at least two, at least three) of ion exchange resins. In some embodiments, a polyphenol reduction process may reduce a polyphenol (e.g., a tannin) content of a juice fraction 126 by at least 5%, or at least 10%, or at least 15%, or at least 20%, or at least 25%, or at least 30%, or at least 35%, or at least 40%, or at least 45%, or at least 50%, or at least 55%, or at least 60%, or at least 65%, or at least 70%.

According to some embodiments, a juice fraction 126 may undergo a solvent wash (b). A solvent wash of a juice fraction 126, may comprise at least one solvent (e.g., ethanol, methanol), in some embodiments. According to some embodiments, a solvent wash of a juice fraction 126, may result in a reduced fat content (e.g., about 2% of a dry protein concentrate or less by weight) and/or a reduced chlorophyll content (e.g., visually perceivable reduction in green coloration) compared to unwashed counterparts.

FIGS. 2A and 2B

FIG. 2A and FIG. 2B illustrate separate embodiments for processing a microcrop (e.g. *Lemna*), for the production of protein concentrate and/or carbohydrate rich products. In some embodiments a microcrop may be harvested (e.g., FIG. 1, 110) forming a biomass (e.g., FIG. 1, 111).

Washing a Biomass

A biomass may be washed 215 prior to processing, according to some embodiments. A wash procedure may remove debris, contaminants, nutrients, microorganisms, and/or toxins. A wash solution, in some embodiments, may be combined with a biomass to form a slurry. According to some embodiments, a wash solution (e.g., a first, second, and/or third wash solution) may have a temperature below room temperature (e.g., about 12° C.). A wash solution, in some embodiments, may have a temperature above room temperature (e.g., 50° C.). In some embodiments, a wash solution may comprise any desired portion of recycled fluid. For example, a wash solution may comprise at least about 10% (v/v), at least about 20% (v/v), at least about 30% (v/v), at least about 40% (v/v), at least about 50% (v/v), at least about 60% (v/v), at least about 70% (v/v), at least about 80% (v/v), or at least about 90% (v/v) recycled from another stage of the process (e.g., recycled wash solution 216, a reject stream from filtration (e.g., FIG. 2A, 252)). In some embodiments, a second wash solution (e.g., water, ozonated water, recycled wash solution FIG. 1, 116) may be applied to a biomass. A third wash solution (e.g., water, ozonated water, recycled wash solution) may be applied to a biomass, in some embodiments. In some embodiments a first wash solution may be a reject stream from a filtration process (e.g., FIG. 2A, 252), a second wash solution may be water, and a third wash solution may be ozonated water. Some or all of a wash solution (e.g., a first wash solution, second wash solution, and/or third wash solution) may be separated, in some embodiments, from a biomass (e.g., using an inclined screen or vibratory screen).

Some or all of a wash solution, second wash solution, and/or third wash solution may be collected and/or reused, according to some embodiments. At least about 40%, or at least about 50%, or at least about 60%, or at least about 70%, or at least about 80%, or at least about 90%, or at least about 95% of the wash solution and/or second wash solution separated from a biomass may be recycled for future use.

Lysing a Washed or Unwashed Biomass

As shown in FIG. 2A and FIG. 2B, a washed biomass may be lysed 220 to form a lysed biomass 221. In some embodiments, a biomass (e.g., unwashed) may be lysed to form a lysed biomass 221. According to some embodiments, lysing may be achieved using a combination of mechanical (e.g., milling), chemical (e.g., pH adjustment), and/or ultrasonic (e.g., sonication) methods. A lysing process may be achieved using, for example, a shear mill, a ball mill, a colloid mill, a knife mill, a hammer mill, shear mill, a grinding mill, a puree machine, a filter press, or any combination thereof.

In some embodiments, lysing may be performed at temperatures below room temperature. A lysing fluid (e.g., water, recycled water, reverse osmosis water) may be added to a biomass or microcrop before or during lysing, according to some embodiments. For example, at least about 10%, at least about 20%, at least about 30%, at least about 40%, at least about 50%, at least about 60%, at least about 70%, at least about 80%, or at least about 90% of lysing fluid may be water generated as the result of reverse osmosis/nanofiltration of a filtration product (e.g., FIG. 3A, 362). In some embodiments a lysing fluid may be at a temperature below room temperature (e.g., about 12° C.).

Separating a Biomass

As shown in FIG. 2A and FIG. 2B, a lysed biomass 221 may be separated 225 to generate a juice fraction 226 and a solid fraction 227. In some embodiments, a biomass (e.g., *Lemna*), a washed biomass, a lysed biomass 221, or any combination thereof may be separated to generate a juice fraction and a solid fraction. A juice fraction 226 may include a protein-rich liquid and/or at least some solid particles (e.g., carbohydrates, fiber).

Separating 225 a lysed biomass 221 may involve pressing (e.g., belt press), centrifugation, filtration, pressurized filtration, or any combination thereof. Interchangeable unit operations for separating 225 a biomass (e.g., harvested microcrop), washed biomass, and/or lysed biomass include, for example, a decanter centrifuge, a belt press, a fan press, a rotary press, a screw press, a filter press, a finisher press, or any combination thereof.

Separating 225 may be performed at any desired temperature. Separating 225 may be performed at temperatures below room temperature (e.g., 12° C.), for example, to decrease proteolytic activity. In some embodiments, separating may be performed at a temperature below about 40° C., below about 30° C., or below about 20° C., or below about 15° C., or below about 10° C., or below about 15° C., or below about 10° C., or below about 5° C., or below about 2° C., or below about 1° C., or below about 0° C. Separating 225 may be performed, for example, at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C.

Separating a Solid Fraction

As shown in FIG. 2A and FIG. 2B, a solid fraction 227 may be further separated 230 to extract additional juice, forming a second juice 232 and a first solid 231. A second juice may include a protein-rich liquid and/or at least some solid particles (e.g., carbohydrates, fiber).

Separating a solid fraction to form a second juice and a first solid may involve pressing (e.g., belt press), centrifugation, filtration, pressurized filtration, or any combination thereof. Interchangeable unit operations for separating a solid fraction include, for example, a decanter centrifuge, a belt press, a fan press, a rotary press, a screw press, a filter press, a finisher press, or any combination thereof.

In some embodiments, as shown in FIG. 2A and FIG. 2B for example, other solid portions (e.g., a first cake 242, a second cake 247) which are collected at other stages in the process (e.g., separation of a juice fraction yields a first cake) may be combined with a first solid to form a solid mixture and the solid mixture may be further processed.

In some embodiments, a moisture content of a solid fraction and/or solid mixture is less than about 90%, or less than about 80%, or less than about 70%, or less than about 60%, or less than about 50%, or less than about 40%, or less than about 30%, or less than about 20%, or less than about 10% by weight.

Separating a Juice Fraction

As shown in FIG. 2A and FIG. 2B, a juice fraction 226 may be separated 240 to generate a first juice 241 and a first cake 242. A first juice may include a soluble protein. Separating 240 a juice fraction, in some embodiments, may involve centrifugation, filtration, pressurized filtration, or any combination thereof. Several different interchangeable unit operations may be used to separate a juice fraction including, for example, a high-speed disc stack centrifuge, a circular vibratory separator, a linear/inclined motion shaker, a decanter centrifuge, a filter press, pressurized filtration mechanisms, microfiltration, vacuum filtration, or any combination thereof.

Separating 240 may be performed, according to some embodiments, at temperatures below room temperature, for example, to decrease proteolytic activity. In some embodiments separating may be performed at a temperature below about 40° C., or below about 30° C., or below about 20° C., or below about 15° C., or below about 10° C., or below about 15° C., or below about 10° C., or below about 5° C., or below about 2° C., or below about 1° C., or below about 0° C. Separating may be performed at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C., in some embodiments.

Separating a First Cake and/or a Second Juice

As shown in FIG. 2A and FIG. 2B, a first cake 242 and a second juice 232 may be combined and further separated to form a third juice 246 and a second cake 247. In some embodiments, a first cake and a second juice may be independently subjected to further separation. Separating a first cake, a second juice, or any combination thereof may involve centrifugation, filtration, pressurized filtration, or any combination thereof. Several different interchangeable unit operations may be used to separate including, for example, a high-speed disc stack centrifuge, a circular vibratory separator, a linear/inclined motion shaker, a decanter centrifuge, a filter press, pressurized filtration mechanisms, microfiltration, vacuum filtration, or any combination thereof.

Separating may be performed, according to some embodiments, at temperatures below room temperature, for example, to decrease proteolytic activity. In some embodiments separating may be performed at a temperature below about 40° C., or below about 30° C., or below about 20° C., or below about 15° C., or below about 10° C., or below about 15° C., or below about 10° C., or below about 5° C., or below about 2° C., or below about 1° C., or below about 0° C. Separating may be performed at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C., in some embodiments.

As shown in FIG. 2A and FIG. 2B, in some embodiments a third juice 246 may be combined with a first juice 241 prior to further processing. A second cake 247 may be combined with a first solid 231 to form a solid mixture, in some embodiments, prior to further processing.

Filtering a First Juice, a Third Juice, or any Combination Thereof

As shown in FIG. 2A and FIG. 2B, a first juice 241, a third juice 246, or any combination thereof may be filtered to generate a soluble protein 251 and a reject stream 252. Filtration 250 may involve microfiltration, ultrafiltration, nanofiltration, or reverse osmosis filtration.

Suitable filter sizes for microfiltration may include, in some embodiments, ≤about 10 µm, or ≤about 5 µm, or ≤about 3 µm, or ≤about 2 µm, or ≤about 1 µm, or ≤about 0.5 µm, or ≤about 0.4 µm, or ≤about 0.3 µm, or ≤about 0.2 µm, or ≤about 0.1 µm. As shown in FIG. 2B, in some embodiments, a first juice, a third juice, or any combination thereof may be filtered 250 using microfiltration to generate a soluble protein 251 in the permeate and a reject stream product 253 in the retentate.

Ultrafiltration may involve membrane filtration using pressure, concentration gradients, or a combination thereof. Suitable nominal molecular weight cut-offs (NMWCO) for ultrafiltration may be, in some embodiments, at most in some embodiments, at most about 100 kDa, or at most about 90 kDa, or at most about 80 kDa, or at most about 70 kDa, or at most about 60 kDa, or at most about 55 kDa, or at most about 50 kDa, or at most about 45 kDa, or at most about 40 kDa, or at most about 30 kDa, or at most about 20 kDa, or at most about 15 kDa, or at most about 14 kDa, or at most about 13 kDa, or at most about 12 kDa, or at most about 11 kDa, or at most about 10 kDa, or at most about 9 kDa, or at most about 8 kDa, or at most about 7 kDa, or at most about 6 kDa, or at most about 5 kDa, or at most about 4 kDa, or at most about 3 kDa, or at most about 2 kDa, or at most about 1 kDa. In some embodiments, suitable NMWCO cut-offs for ultrafiltration may be in a range of at most about 1 kDa to at most about 10 kDa, at most about 2 kDa to at most about 10 kDa, at most about 3 kDa to at most about 10 kDa, at most about 3 kDa to at most about 15 kDa, or at most about 3 kDa to at most about 20 kDa, or at most about 3 kDa to at most about 60 kDa, or at most about 3 kDa to at most about 55 kDa, or at most about 10 kDa to at most about 55 kDa. A first juice 241, a third juice 246, or any combination thereof may be filtered 250 using ultrafiltration to generate a soluble protein 251 and a reject stream 252, according to some embodiments. A soluble protein may be in a retentate, as shown in FIG. 2A, or a permeate, as shown in FIG. 2B, depending upon the molecular weight cut-offs for ultrafiltration. When reject stream 252 is a permeate of ultrafiltration (e.g., FIG. 2A) it may be recycled to a bioreactor system for cultivation of a microcrop (e.g., FIG. 1, 105).

In some embodiments, suitable filter sizes for nanofiltration may include ≤about 0.01 µm, or ≤about 0.009 µm, or ≤about 0.008 µm, or ≤about 0.007 µm, or ≤about 0.006 µm, or ≤about 0.005 µm, or ≤about 0.004 µm, or ≤about 0.003 µm, or ≤about 0.002 µm, or ≤about 0.001 µm. According to some embodiments, suitable filter sizes for reverse osmosis filtration may include ≤about 0.001 µm, ≤about 0.0009 µm, ≤about 0.0008 µm, ≤about 0.0007 µm, ≤about 0.0006 µm, ≤about 0.0005 µm, ≤about 0.0004 µm, ≤about 0.0003 µm, ≤about 0.0002 µm, or ≤about 0.0001 µm. As shown in FIG. 2B, in some embodiments, a first juice, a third juice, or any combination thereof may be filtered 250 using nanofiltration or reverse osmosis filtration to generate a soluble protein 251 in the retentate and a permeate 252 of nanofiltered water or reverse osmosis water, respectively. In some embodiments reject stream 252 may be a permeate of nanofiltration or reverse osmosis filtration and may be recycled to a bioreactor system for cultivation of a microcrop (e.g., FIG. 1, 105).

Buffers, protease inhibitors, anti-microbial agents, chelators (e.g., EDTA), reducing agents, or any combination thereof may be added, in some embodiments, to a soluble protein 251. A soluble protein may be chilled and/or stored at a temperature below about 30° C., or below about 25° C., or below about 20° C., or below about 15° C., or below about 10° C., or below about 5° C., or below about 2° C., or below about 1° C., or below about 0° C., or below −2° C., or below −5° C., or below −10° C., in some embodiments. Chilling and/or storing a soluble protein at reduced temperatures may reduce degradation and/or improve protein recovery efficiency.

Reducing a Moisture Content of a Soluble Protein

In some embodiments a process may be used to reduce a moisture content of a soluble protein 251. In some embodiments, an evaporation process may be used to reduce a moisture content of soluble protein. In some embodiments, a moisture content of a soluble protein 251 may be reduced by nanofiltration or reverse osmosis filtration. In some embodiments, a moisture content of soluble protein 251 may be reduced using nanofiltration with the soluble protein 251 in a retentate. A moisture content of soluble protein 251, in some embodiments, may be reduced using reverse osmosis filtration with the soluble protein 251 in a retentate. A permeate of nanofiltration or reverse osmosis filtration may be recycled (e.g., dilution fluid for lysis; wash solution), according to some embodiments.

Drying a Soluble Protein

A soluble protein 251 may be dried 255 to generate a dry protein concentrate, according to some embodiments. A drying procedure, in some embodiments, may reduce the moisture content of the soluble protein to a desired level (e.g., higher or lower moisture content, a desired moisture content). A moisture content of a dry protein concentrate, in some embodiments, may be, for example, below about 90%, or below about 80%, or below about 70%, or below about 60%, or below about 50%, or below about 40%, or below about 30%, or below about 20%, or below about 10%, or below about 5%, or below about 1% by weight of the dry protein concentrate. In some embodiments, the protein concentration of a dry protein concentrate may be from about 30% to about 95%, or from about 40% to about 90%, or from about 50% to about 85%, or from about 60% to about 80%, or from about 70% to about 75% by weight of the dry protein concentrate. A drying procedure may be performed using a mechanism including, for example, a spray dryer, double drum dryer, flash dryer, an evaporator, or any combination thereof.

Processing a First Solid and/or Solid Mixture

A first solid and/or solid mixture may be further processed to generate one or more carbohydrate-rich products. As described previously, a solid mixture may include one or more of a first solid 231, a first cake 242, a second cake 247, or any combination thereof that remain after one or more separation processes 230/240/245. Carbohydrate rich products may include a dry biocrude product suitable as a fuel feedstock or a carbohydrate-rich meal suitable as a human or animal feed supplement (e.g., Lemna meal).

A first solid and/or solid mixture may be processed (e.g., drying, pelletization), in some embodiments, to generate at least one of a dry biocrude and a carbohydrate-rich meal. According to some embodiments, processing a first solid and/or solid mixture involves drying and/or pelletization.

A process for generating a carbohydrate-rich product (e.g., dry biocrude and/or carbohydrate-rich) meal may be varied depending upon the specific characteristics desired, including, for example, moisture content, particle size, protein content, fat content, fiber content, ash content, shelf-life, pellet size, texture, or any combination thereof.

In some embodiments, a first solid and/or a solid mixture may be dried to reduce a moisture content of a resulting carbohydrate-rich product (e.g., dry biocrude and/or carbohydrate-rich meal). A drying procedure, in some embodiments, may be performed in conjunction with (e.g., prior to, following) other processing of a first solid and/or a solid mixture, such that the end product is a carbohydrate-rich product with a reduced moisture content. A drying procedure may be performed, in some embodiments, using a dryer mechanism including, for example, a spray dryer, double drum dryer, flash dryer, evaporator, or any combination thereof.

A moisture content of a carbohydrate-rich product (e.g., dry biocrude and/or carbohydrate-rich meal) may be below about 90%, or below about 80%, or below about 70%, or below about 60%, or below about 50%, or below about 40%, or below about 30%, or below about 20%, or below about 10%, or below about 5%, or below about 1% by weight of the product, in some embodiments.

Polyphenol Reduction

In some embodiments, a juice fraction 226, a first juice 241, a second juice 232, a third juice 246, and/or a soluble protein 251 may undergo a processing step for the reduction of at least one polyphenol (a). A polyphenol reduction process may comprise passing a juice fraction 226, a first juice 241, a second juice 232, a third juice 246, and/or a soluble protein 251 through a series (e.g., at least two, at least three) of ion exchange resins. In some embodiments, a polyphenol reduction process may reduce a polyphenol (e.g., a tannin) content of a juice fraction 226, a first juice 241, a second juice 232, a third juice 246, and/or a soluble protein 251 by at least 5%, or at least 10%, or at least 15%, or at least 20%, or at least 25%, or at least 30%, or at least 35%, or at least 40%, or at least 45%, or at least 50%, or at least 55%, or at least 60%, or at least 65%, or at least 70%.

Solvent Wash

In some embodiments, a soluble protein 251 may undergo a solvent wash (b). Solvent washing (b) may also follow drying 255. A solvent wash of a soluble protein product 251 and/or a solvent wash following drying 255, may comprise at least one solvent (e.g., ethanol, methanol), in some embodiments. According to some embodiments, a solvent wash of a soluble protein product 251 and/or a solvent wash following drying 255, may result in a reduced fat content (e.g., about 2% of a dry protein concentrate or less by weight) and/or a reduced chlorophyll content (e.g., visually perceivable reduction in green coloration) compared to unwashed counterparts.

FIGS. 3A and 3B

FIG. 3A and FIG. 3B illustrate an embodiment for processing a microcrop (e.g., Lemna) for production of protein concentrate and/or carbohydrate rich products. A microcrop may be harvested (e.g., FIG. 1, 110) forming a biomass (e.g., FIG. 1, 111).

Washing a Biomass

As shown in FIG. 3A and FIG. 3B, a biomass may be washed 315 prior to processing, according to some embodiments. A wash procedure may remove debris, contaminants, nutrients, microorganisms, and/or toxins. A wash solution, in some embodiments, may be combined with a biomass to form a slurry. According to some embodiments, a wash solution (e.g., a first, second, and/or third wash solution) may have a temperature below room temperature (e.g., about 12° C.). A wash solution, in some embodiments, may have a temperature above room temperature (e.g., 50° C.). In some embodiments, a wash solution may comprise any desired portion of recycled fluid. For example, a wash solution may comprise at least about 10% (v/v), at least about 20% (v/v), at least about 30% (v/v), at least about 40% (v/v), at least about 50% (v/v), at least about 60% (v/v), at least about 70% (v/v), at least about 80% (v/v), or at least about 90% (v/v) recycled from another stage of the process (e.g., recycled wash solution 316, a first reject stream from filtration (e.g., FIG. 3A, 352), a second reject stream from filtrations (e.g., FIG. 3A, 357)). In some embodiments, a second wash solution (e.g., water, ozonated water, recycled wash solution FIG. 1, 316) may be applied to a biomass. A third wash solution (e.g., water, ozonated water, recycled wash solution) may be applied to a biomass, in some embodiments. In some embodiments a first wash solution may be a reject stream from a filtration process (e.g., FIG. 3A, 352, 357), a second wash solution may be water, and a third wash solution may be ozonated water. Some or all of a wash solution (e.g., a first wash solution, second wash solution, and/or third wash solution) may be separated, in some embodiments, from a biomass (e.g., using an inclined screen or vibratory screen).

Some or all of a wash solution, second wash solution, and/or third wash solution may be collected and/or reused, according to some embodiments. At least about 40%, or at least about 50%, or at least about 60%, or at least about 70%, or at least about 80%, or at least about 90%, or at least about 95% of the wash solution and/or second wash solution separated from a biomass may be recycled for future use.

Lysing a Washed or Unwashed Biomass

As shown in FIG. 3A and FIG. 3B, a washed biomass may be lysed 320 to form a lysed biomass 321. In some embodiments, a biomass (e.g., unwashed) may be lysed to form a lysed biomass 321. According to some embodiments, lysing may be achieved using a combination of mechanical (e.g., milling), chemical (e.g., pH adjustment), and/or ultrasonic (e.g., sonication) methods. A lysing process may be achieved using, for example, a shear mill, a ball mill, a colloid mill, a knife mill, a hammer mill, a grinding mill, a puree machine, a filter press, or any combination thereof.

In some embodiments, lysing may be performed at temperatures below room temperature. A lysing fluid (e.g., water, recycled water, reverse osmosis water) may be added to a biomass or microcrop before or during lysing, according to some embodiments. As shown in FIG. 3A and FIG. 3B, a permeate 362 from reverse osmosis/nan-filtration of a second soluble protein may be recycled as a lysing fluid. For example, at least about 10%, at least about 20%, at least about 30%, at least about 40%, at least about 50%, at least about 60%, at least about 70%, at least about 80%, or at least about 90% of lysing fluid may be water generated as the result of reverse osmosis/nanofiltration of a filtration product (e.g., FIG. 3A, 362). In some embodiments a lysing fluid may be at a temperature below room temperature (e.g., about 12° C.). A lysing fluid may be at a temperature above room temperature (e.g., 50° C.).

Separating a Biomass

As shown in FIG. 3A and FIG. 3B, a lysed biomass 321 may be separated 325 to generate a juice fraction 326 and a solid fraction 327. In some embodiments, a biomass (e.g., *Lemna*), a washed biomass, a lysed biomass 321, or any combination thereof may be separated to generate a juice fraction and a solid fraction. A juice fraction 326 may include a protein-rich liquid and/or at least some solid particles (e.g., carbohydrates, fiber).

Separating 325 a lysed biomass 321 may involve pressing (e.g., belt press), centrifugation, filtration, pressurized filtration, or any combination thereof. Interchangeable unit operations for separating 325 a biomass (e.g., harvested microcrop), washed biomass, and/or lysed biomass include, for example, a decanter centrifuge, a belt press, a fan press, a rotary press, a screw press, a filter press, a finisher press, or any combination thereof.

Separating 325 may be performed at any desired temperature. Separating 325 may be performed at temperatures below room temperature (e.g., 12° C.), for example, to decrease proteolytic activity. In some embodiments, separating may be performed at a temperature below about 40° C., below about 30° C., or below about 20° C., or below about 15° C., or below about 10° C., or below about 15° C., or below about 10° C., or below about 5° C., or below about 2° C., or below about 1° C., or below about 0° C. Separating 325 may be performed, for example, at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C.

Separating a Solid Fraction

As shown in FIG. 3, a solid fraction 327 may be further separated 330 to extract additional juice, forming a second juice 332 and a first solid 331. A second juice may include a protein-rich liquid and/or at least some solid particles (e.g., carbohydrates, fiber).

Separating a solid fraction to form a second juice and a first solid may involve pressing (e.g., belt press), centrifugation, filtration, pressurized filtration, or any combination thereof. Interchangeable unit operations for separating a solid fraction include, for example, a decanter centrifuge, a belt press, a fan press, a rotary press, a screw press, a filter press, a finisher press, or any combination thereof.

In some embodiments, as shown in FIG. 3 for example, other solid fractions (e.g., a first cake 342, a second cake 347) which are collected at other stages in the process (e.g., separation of a juice fraction yields a first cake) may be combined with a first solid to form a solid mixture and the solid mixture may be further processed.

In some embodiments, a moisture content of a solid fraction and/or solid mixture is less than about 90%, or less than about 80%, or less than about 70%, or less than about 60%, or less than about 50%, or less than about 40%, or less than about 30%, or less than about 20%, or less than about 10% by weight.

Separating a Juice Fraction

As shown in FIG. 3A and FIG. 3B, a juice fraction 326 may be separated to generate a first juice 341 and a first cake 342. A first juice may include a soluble protein. Separating a juice fraction, in some embodiments, may involve centrifugation, filtration, pressurized filtration, or any combination thereof. Several different interchangeable unit operations may be used to separate a juice fraction including, for example, a high-speed disc stack centrifuge, a circular vibratory separator, a linear/inclined motion shaker, a decanter centrifuge, a filter press, pressurized filtration mechanisms, microfiltration, vacuum filtration, or any combination thereof.

Separating may be performed, according to some embodiments, at temperatures below room temperature, for example, to decrease proteolytic activity. In some embodiments separating may be performed at a temperature below about 40° C., or below about 30° C., or below about 20° C., or below about 15° C., or below about 10° C., or below about 15° C., or below about 10° C., or below about 5° C., or below about 2° C., or below about 1° C., or below about 0° C. Separating may be performed at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C., in some embodiments.

Separating a First Cake and/or a Second Juice

As shown in FIG. 3A and FIG. 3B, a first cake 342 and a second juice 332 may be combined and further separated to form a third juice 346 and a second cake 347. In some embodiments, a first cake and a second juice may be independently subjected to further separation. Separating a first cake, a second juice, or any combination thereof may involve centrifugation, filtration, pressurized filtration, or any combination thereof. Several different interchangeable unit operations may be used to separate including, for example, a high-speed disc stack centrifuge, a circular vibratory separator, a linear/inclined motion shaker, a decanter centrifuge, a filter press, pressurized filtration mechanisms, microfiltration, vacuum filtration, or any combination thereof.

Separating may be performed, according to some embodiments, at temperatures below room temperature, for example, to decrease proteolytic activity. In some embodiments separating may be performed at a temperature below about 40° C., or below about 30° C., or below about 20° C., or below about 15° C., or below about 10° C., or below about 15° C., or below about 10° C., or below about 5° C., or below about 2° C., or below about 1° C., or below about 0° C. Separating may be performed at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C., in some embodiments.

As shown in FIG. 3A and FIG. 3B, in some embodiments a third juice 346 may be combined with a first juice 341 prior to further processing. A second cake 347 may be combined with a first solid 331 to form a solid mixture, in some embodiments, prior to further processing.

Filtering a First Juice, a Third Juice, or any Combination Thereof

As shown in FIG. 3A and FIG. 3B, a first juice 341, a third juice 346, or any combination thereof may be filtered to generate a first soluble protein 351 and a first reject stream 352. Filtration 350 may involve microfiltration, ultrafiltration, nanofiltration, or reverse osmosis filtration.

Suitable filter sizes for microfiltration may include, in some embodiments, ≤about 10 µm, or ≤about 5 µm, or ≤about 3 µm, or ≤about 2 µm, or ≤about 1 µm, or ≤about 0.5 µm, or ≤about 0.4 µm, or ≤about 0.3 µm, or ≤about 0.2 µm, or ≤about 0.1 µm. As shown in FIG. 3B, in some embodiments, a first juice, a third juice, or any combination thereof may be filtered 350 using microfiltration to generate a first soluble protein 351 in a permeate and a reject stream product 353 in the retentate.

Ultrafiltration may involve membrane filtration using pressure, concentration gradients, or a combination thereof. Suitable NMWCOs for ultrafiltration may be, in some embodiments, at most in some embodiments, at most about 100 kDa, or at most about 90 kDa, or at most about 80 kDa, or at most about 70 kDa, or at most about 60 kDa, or at most about 55 kDa, or at most about 50 kDa, or at most about 45 kDa, or at most about 40 kDa, or at most about 30 kDa, or at most about 20 kDa, or at most about 15 kDa, or at most about 14 kDa, or at most about 13 kDa, or at most about 12 kDa, or at most about 11 kDa, or at most about 10 kDa, or at most about 9 kDa, or at most about 8 kDa, or at most about 7 kDa, or at most about 6 kDa, or at most about 5 kDa, or at most about 4 kDa, or at most about 3 kDa, or at most about 2 kDa, or at most about 1 kDa. In some embodiments, suitable NMWCO cut-offs for ultrafiltration may be in a range of at most about 1 kDa to at most about 10 kDa, at most about 2 kDa to at most about 10 kDa, at most about 3 kDa to at most about 10 kDa, at most about 3 kDa to at most about 15 kDa, at most about 3 kDa to at most about 20 kDa, or at most about 3 kDa to at most about 60 kDa, or at most about 3 kDa to at most about 55 kDa, or at most about 10 kDa to at most about 55 kDa.

A first juice 341, a third juice 346, or any combination thereof may be filtered 350 using ultrafiltration to generate a first soluble protein 351 and a reject stream 352, according to some embodiments. A first soluble protein may be in a retentate, as shown in FIG. 3A, or a permeate, as shown in FIG. 3B, depending upon the molecular weight cut-offs for ultrafiltration. When first reject stream 352 is a permeate of ultrafiltration (e.g., FIG. 3A) it may be recycled to a bioreactor system for cultivation of a microcrop (e.g., FIG. 1, 105).

In some embodiments, suitable filter sizes for nanofiltration may include ≤about 0.01 µm, or ≤about 0.009 µm, or ≤about 0.008 µm, or ≤about 0.007 µm, or ≤about 0.006 µm, or ≤about 0.005 µm, or ≤about 0.004 µm, or ≤about 0.003 µm, or ≤about 0.002 µm, or ≤about 0.001 µm. According to some embodiments, suitable filter sizes for reverse osmosis filtration may include ≤about 0.001 µm, ≤about 0.0009 µm, ≤about 0.0008 µm, ≤about 0.0007 µm, ≤about 0.0006 µm, ≤about 0.0005 µm, ≤about 0.0004 µm, ≤about 0.0003 µm, ≤about 0.0002 µm, or ≤about 0.0001 µm. As shown in FIG. 3B, in some embodiments, a first juice, a third juice, or any combination thereof may be filtered 350 using nanofiltration or reverse osmosis filtration to generate a first soluble protein 351 in the retentate and a permeate 352 of nanofiltered water or reverse osmosis water, respectively. In some embodiments first reject stream 352 may be a permeate of nanofiltration or reverse osmosis filtration and may be recycled to a bioreactor system for cultivation of a microcrop (e.g., FIG. 1, 105).

Buffers, protease inhibitors, anti-microbial agents, chelators (e.g., EDTA), reducing agents, or any combination thereof may be added, in some embodiments, to a soluble protein 351. A soluble protein may be chilled and/or stored at a temperature below about 30° C., or below about 25° C., or below about 20° C., or below about 15° C., or below about 10° C., or below about 5° C., or below about 2° C., or below about 1° C., or below about 0° C., or below −2° C., or below −5° C., or below −10° C., in some embodiments. Chilling and/or storing a soluble protein at reduced temperatures may reduce degradation and/or improve protein recovery efficiency.

Filtering a First Soluble Protein

As shown in FIG. 3A and FIG. 3B, first soluble protein 351 may be filtered 355 to generate and second soluble protein 356 and a second reject stream 357. Filtration 355 may involve microfiltration, ultrafiltration, nanofiltration, or reverse osmosis filtration.

Suitable filter sizes for microfiltration may include, in some embodiments, ≤about 10 µm, or ≤about 5 µm, or ≤about 3 µm, or ≤about 2 µm, or ≤about 1 µm, or ≤about 0.5 µm, or ≤about 0.4 µm, or ≤about 0.3 µm, or ≤about 0.2 µm, or ≤about 0.1 µm. In some embodiments, a first soluble protein may be filtered 355 using microfiltration to generate a second soluble protein 356 in the permeate and a reject stream product in the retentate.

Ultrafiltration may involve membrane filtration using pressure, concentration gradients, or a combination thereof. Suitable NMWCOs for ultrafiltration may be, in some embodiments, at most in some embodiments, at most about 100 kDa, or at most about 90 kDa, or at most about 80 kDa, or at most about 70 kDa, or at most about 60 kDa, or at most about 55 kDa, or at most about 50 kDa, or at most about 45 kDa, or at most about 40 kDa, or at most about 30 kDa, or at most about 20 kDa, or at most about 15 kDa, or at most about 14 kDa, or at most about 13 kDa, or at most about 12 kDa, or at most about 11 kDa, or at most about 10 kDa, or at most about 9 kDa, or at most about 8 kDa, or at most about 7 kDa, or at most about 6 kDa, or at most about 5 kDa, or at most about 4 kDa, or at most about 3 kDa, or at most about 2 kDa, or at most about 1 kDa. In some embodiments, suitable NMWCO for ultrafiltration may be in a range of at most about 1 kDa to at most about 10 kDa, at most about 2 kDa to at most about 10 kDa, at most about 3 kDa to at most about 10 kDa, at most about 3 kDa to at most about 15 kDa, or at most about 3 kDa to at most about 20 kDa, or at most about 3 kDa to at most about 60 kDa, or at most about 3 kDa to at most about 55 kDa, or at most about 10 kDa to at most about 55 kDa.

A first soluble protein may be filtered 355 using ultrafiltration to generate a second soluble protein 355 and a reject stream 357, according to some embodiments. A second soluble protein may be in a retentate, as shown in FIG. 3A and FIG. 3B, or a permeate (not shown) depending upon the molecular weight cut-offs for ultrafiltration. When second reject stream 357 is a permeate of ultrafiltration (e.g., FIG. 3A) it may be recycled to a bioreactor system for cultivation of a microcrop (e.g., FIG. 1, 105).

In some embodiments, suitable filter sizes for nanofiltration may include ≤about 0.01 μm, or ≤about 0.009 μm, or ≤about 0.008 μm, or ≤about 0.007 μm, or ≤about 0.006 μm, or ≤about 0.005 μm, or ≤about 0.004 μm, or ≤about 0.003 μm, or ≤about 0.002 μm, or ≤about 0.001 μm. According to some embodiments, suitable filter sizes for reverse osmosis filtration may include ≤about 0.001 μm, ≤about 0.0009 μm, ≤about 0.0008 μm, ≤about 0.0007 μm, ≤about 0.0006 μm, ≤about 0.0005 μm, ≤about 0.0004 μm, ≤about 0.0003 μm, ≤about 0.0002 μm, or ≤about 0.0001 μm. As shown in FIG. 3A and FIG. 3B, in some embodiments, a first soluble protein may be filtered 355 using nanofiltration or reverse osmosis filtration to generate a second soluble protein 356 in the retentate and a permeate 357 of nanofiltered water or reverse osmosis water, respectively. In some embodiments second reject stream 357 may be a permeate of nanofiltration or reverse osmosis filtration and may be recycled to a bioreactor system for cultivation of a microcrop (e.g., FIG. 1, 105).

According to some embodiments, diafiltration may be used to further eliminate permeable solutes form a first soluble protein 351, a second soluble protein 356, or a combination thereof. In some embodiments, diafiltration may increase a protein purity of a first soluble protein 351, a second soluble protein 356, or a combination thereof. When second reject stream 357 is a permeate of ultrafiltration (e.g., FIG. 3A) it may be recycled to a bioreactor system for cultivation of a microcrop (e.g., FIG. 1, 105).

In some embodiments buffers, protease inhibitors, antimicrobial agents, chelators (e.g., EDTA), reducing agents, or any combination thereof may be added to the second soluble protein 356. A second soluble protein may be chilled and/or stored at a temperature below about 30° C., or below about 25° C., or below about 20° C., or below about 15° C., or below about 10° C., or below about 5° C., or below about 2° C., or below about 1° C., or below about 0° C., or below −2° C., or below −5° C., or below −10° C. Chilling and/or storing the second soluble protein at reduced temperatures may reduce degradation and/or improve protein recovery efficiency.

Reducing a Moisture Content of a First Soluble Protein and/or Second Soluble Protein In some embodiments a process may be used to reduce a moisture content of a first soluble protein 351 and/or a second soluble protein 356.

In some embodiments an evaporation process may be used to reduce a moisture content of a first soluble protein 351 or a second soluble protein 356 and generate a concentrated protein 361. Reducing a moisture content of a first soluble protein 351 or a second soluble protein 356 may reduce capital and operational expenditures, for example, by reducing an energy needed to dry a concentrated protein 361. Evaporation may be performed by, for example, a thermal (evaporative) means such as: a rising film evaporator, a falling film evaporator, a natural circulation evaporator (vertical or horizontal), an agitated-film evaporator, a multiple-effect evaporator, by vacuum evaporation, or any combination thereof.

As shown in FIG. 3, a moisture content of a first soluble protein 351 or a second soluble protein 356 may be reduced, in some embodiments, by nanofiltration or reverse osmosis filtration. In some embodiments, a moisture content of a first soluble protein 351 or a second soluble protein 356 may be reduced using nanofiltration with the first soluble protein 351 or a second soluble protein 356, respectively, in a retentate. A moisture content of a first soluble protein 351 or a second soluble protein 356, in some embodiments, may be reduced using reverse osmosis filtration with the first soluble protein 351 or a second soluble protein 356, respectively in a retentate. A permeate 362 of nanofiltration or reverse osmosis filtration may be recycled (e.g., dilution fluid for lysis; wash solution), according to some embodiments. In some embodiments, reverse osmosis filtration and/or nanofiltration may reduce the concentration of undesirable dissolved compounds (e.g., salts, calcium ions) in the resulting concentrated protein 361.

Drying a Soluble Protein

A concentrated protein 361 may be dried 365 to generate a dry protein concentrate, according to some embodiments. A drying procedure, in some embodiments, may reduce the moisture content of a concentrated protein 361 to a desired level (e.g., higher or lower moisture content, a desired moisture content). A moisture content of a dry protein concentrate, in some embodiments, may be, for example, below about 90%, or below about 80%, or below about 70%, or below about 60%, or below about 50%, or below about 40%, or below about 30%, or below about 20%, or below about 10%, or below about 5%, or below about 1% by weight of the dry protein concentrate. In some embodiments, the protein concentration of a dry protein concentrate may be from about 30% to about 95%, or from about 40% to about 90%, or from about 50% to about 85%, or from about 60% to about 80%, or from about 70% to about 75% by weight of the dry protein concentrate. A drying procedure may be performed using a mechanism including, for example, a spray dryer, double drum dryer, flash dryer, an evaporator, or any combination thereof.

Processing a First Solid and/or Solid Mixture

A first solid and/or solid mixture may be further processed to generate one or more carbohydrate-rich products. As described previously, a solid mixture may include one or more of a first solid 331, a first cake 342, a second cake 347, or any combination thereof that remain after one or more separation processes 330/340/345. Carbohydrate rich products may include a dry biocrude product suitable as a fuel feedstock or a carbohydrate-rich meal suitable as a human or animal feed supplement (e.g., *Lemna* meal).

A first solid and/or solid mixture may be processed (e.g., drying, pelletization), in some embodiments, to generate at least one of a dry biocrude and a carbohydrate-rich meal. According to some embodiments, processing a first solid and/or solid mixture involves drying and/or pelletization.

A process for generating a carbohydrate-rich product (e.g., dry biocrude and/or carbohydrate-rich) meal may be varied depending upon the specific characteristics desired, including, for example, moisture content, particle size, protein content, fat content, fiber content, ash content, shelf-life, pellet size, texture, or any combination thereof.

In some embodiments, a first solid and/or a solid mixture may be dried to reduce a moisture content of a resulting carbohydrate-rich product (e.g., a dry biocrude, a carbohydrate-rich meal, a polysaccharide extract, a polysaccharide product). A drying procedure, in some embodiments, may be performed in conjunction with (e.g., prior to, following) other processing of a first solid and/or a solid mixture, such that the end product is a carbohydrate-rich product with a reduced moisture content. A drying procedure may be performed, in some embodiments, using a dryer mechanism including, for example, a spray dryer, double drum dryer, flash dryer, evaporator, or any combination thereof.

A moisture content of a carbohydrate-rich product (e.g., dry biocrude and/or carbohydrate-rich meal) may be below about 90%, or below about 80%, or below about 70%, or below about 60%, or below about 50%, or below about 40%, or below about 30%, or below about 20%, or below about 10%, or below about 5%, or below about 1% by weight of the product, in some embodiments.

Polyphenol Reduction

In some embodiments, a juice fraction 326, a first juice 341, a second juice 332, a third juice 346, a first soluble protein 351, a second soluble protein 356, and/or a concentrated protein 361 may undergo a processing step for the reduction of at least one polyphenol (a). A polyphenol reduction process may comprise passing a juice fraction 326, a first juice 341, a second juice 332, a third juice 346, and/or a soluble protein 351 through a series (e.g., at least two, at least three) of ion exchange resins. In some embodiments, a polyphenol reduction process may reduce a polyphenol (e.g., a tannin) content of a juice fraction 326, a first juice 341, a second juice 332, a third juice 346, and/or a soluble protein 351 by at least 5%, or at least 10%, or at least 15%, or at least 20%, or at least 25%, or at least 30%, or at least 35%, or at least 40%, or at least 45%, or at least 50%, or at least 55%, or at least 60%, or at least 65%, or at least 70%.

Solvent Wash

In some embodiments, a first soluble protein 351, a second soluble protein 356, and/or a concentrated protein 361 may undergo a solvent wash (b). Solvent washing (b) may also follow drying 365. A solvent wash of a soluble protein product 351 and/or a solvent wash following drying 355, may comprise at least one solvent (e.g., ethanol, methanol), in some embodiments. According to some embodiments, a solvent wash of a soluble protein product 351 and/or a solvent wash following drying 365, may result in a reduced fat content (e.g., about 2% of a dry protein concentrate or less by weight) and/or a reduced chlorophyll content (e.g., visually perceivable reduction in green coloration) compared to unwashed counterparts.

FIG. 4

FIG. 4 is a flow diagram illustrating a process for continuously producing a protein concentrate and/or carbohydrate rich products from a biomass according to a specific example embodiment of the disclosure. In some embodiments a process for growing, harvesting, and separating a microcrop (e.g., photosynthetic aquatic species, aquatic plant species, *Lemna*, algal species) may be multiple cycles or a continuous process for the production of protein concentrate (e.g., soluble protein, dry protein concentrate) and/ or carbohydrate rich products such that byproducts of an earlier cycle of the process may be recycled into one or more subsequent cycles of the process. Recycling of one or more by-products may reduce the overall water requirement for a process. In some embodiments, a process may be configured to minimize the net energy input required (i.e., energy conservation).

A microcrop may be harvested (e.g., FIG. 1, 110) forming a biomass (e.g., FIG. 1, 111).

Washing a Biomass

As shown in FIG. 4, a biomass may be washed 415 prior to processing, according to some embodiments. A wash procedure may remove debris, contaminants, nutrients, microorganisms, and/or toxins. A wash solution, in some embodiments, may be combined with a biomass to form a slurry. According to some embodiments, a wash solution (e.g., a first, second, and/or third wash solution) may have a temperature below room temperature (e.g., about 12° C.). A wash solution, in some embodiments, may have a temperature above room temperature (e.g., 50° C.). In some embodiments, a wash solution may comprise any desired portion of recycled fluid. For example, a wash solution may comprise at least about 10% (v/v), at least about 20% (v/v), at least about 30% (v/v), at least about 40% (v/v), at least about 50% (v/v), at least about 60% (v/v), at least about 70% (v/v), at least about 80% (v/v), or at least about 90% (v/v) recycled from another stage of the process (e.g., recycled wash solution 416, a first reject stream from filtration (e.g., FIG. 3A, 352), a second reject stream from filtrations (e.g., FIG. 4, 457)).

According to some embodiments, a wash solution recycled, at least in part, from another stage of the process (e.g., recycled wash solution 416, a first reject stream from filtration (e.g., FIG. 3A, 352), a second reject stream from filtrations (e.g., FIG. 4, 457)) may have a temperature below room temperature (e.g., about 12° C.) as the result of chilling of an earlier product in the process (e.g., chilling a first juice, chilling a first soluble protein, chilling a second soluble protein). A wash solution recycled, at least in part, from another stage of the process (e.g., recycled wash solution 416, a first reject stream from filtration (e.g., FIG. 3A, 352), a second reject stream from filtrations (e.g., FIG. 4, 457)) may have a temperature above room temperature (e.g., about 50° C.) as the result of a heat exchange mechanism. For example, a heat exchange mechanism may be configured to use released energy from a drying process 335 to heat a first reject stream from filtration (e.g., FIG. 3A, 352), a second reject stream from filtrations (e.g., FIG. 4, 457)). Such recycling may be configured to reduce an energy input requirement of a process (e.g., chilled recycled fluids cool the process they are added to; heat exchanger reduces energy requirement to heat the first reject stream).

In some embodiments, a second wash solution (e.g., water, ozonated water, recycled wash solution FIG. 4, 416) may be applied to a biomass. A third wash solution (e.g., water, ozonated water, recycled wash solution) may be applied to a biomass, in some embodiments. In some embodiments a first wash solution may be a reject stream from a filtration process (e.g., FIG. 3A, 352; FIG. 4, 457), a second wash solution may be water, and a third wash solution may be ozonated water. Some or all of a wash solution (e.g., a first wash solution, second wash solution, and/or third wash solution) may be separated, in some embodiments, from a biomass (e.g., using an inclined screen or vibratory screen).

Some or all of a wash solution, second wash solution, and/or third wash solution may be collected and/or reused, according to some embodiments. At least about 40%, or at least about 50%, or at least about 60%, or at least about 70%, or at least about 80%, or at least about 90%, or at least about 95% of the wash solution and/or second wash solution separated from a biomass may be recycled for future use.

Lysing a Washed or Unwashed Biomass

As shown in FIG. 4, a washed biomass may be lysed 420 to form a lysed biomass 421. In some embodiments, a biomass (e.g., unwashed) may be lysed to form a lysed biomass. According to some embodiments, lysing may be achieved using a combination of mechanical (e.g., milling), chemical (e.g., pH adjustment), and/or ultrasonic (e.g., sonication) methods. A lysing process may be achieved using, for example, a shear mill, a ball mill, a colloid mill, a knife mill, a hammer mill, a grinding mill, a puree machine, a filter press, or any combination thereof.

In some embodiments, lysing may be performed at temperatures below room temperature. A lysing fluid (e.g., water, recycled water, reverse osmosis water) may be added to a biomass or microcrop before or during lysing, according to some embodiments. As shown in FIG. 4, a permeate 462 from reverse osmosis/nanofiltration of a second soluble protein may be recycled as a lysing fluid. For example, at least about 10%, at least about 20%, at least about 30%, at least about 40%, at least about 50%, at least about 60%, at least about 70%, at least about 80%, or at least about 90% of lysing fluid may be water generated as the result of reverse osmosis/nanofiltration of a filtration product (e.g., FIG. 4, 462). In some embodiments a lysing fluid may be at a temperature below room temperature (e.g., about 12° C.). A lysing fluid may be at a temperature above room temperature (e.g., 50° C.). According to some embodiments, a lysing fluid recycled, at least in part, from another stage of the process (e.g., FIG. 4, 462) may have a temperature below room temperature (e.g., about 12° C.) as the result of chilling of an earlier product in the process (e.g., chilling a first juice, chilling a first soluble protein, chilling a second soluble protein). A lysing fluid recycled, at least in part, from another stage of the process (e.g., FIG. 4, 462) may have a temperature above room temperature (e.g., about 50° C.) as the result of a heat exchange mechanism. For example, a heat exchange mechanism may be configured to use released energy from a drying process 335 to heat a permeate (e.g., FIG. 4, 462) resulting from a reverse osmosis or nanofiltration process (e.g., FIG. 4, 460).

Separating a Biomass

As shown in FIG. 4, a lysed biomass may be separated 425 to generate a juice fraction 426 and a solid fraction 427. In some embodiments, a biomass (e.g., *Lemna*), a washed biomass, a lysed biomass, or any combination thereof may be separated to generate a juice fraction and a solid fraction. A juice fraction 426 may include a protein-rich liquid and/or at least some solid particles (e.g., carbohydrates, fiber).

Separating 425 a lysed biomass may involve pressing (e.g., belt press), centrifugation, filtration, pressurized filtration, or any combination thereof. Interchangeable unit operations for separating 425 a biomass (e.g., harvested microcrop), washed biomass, and/or lysed biomass include, for example, a decanter centrifuge, a belt press, a fan press, a rotary press, a screw press, a filter press, a finisher press, or any combination thereof.

Separating 425 may be performed at any desired temperature. Separating 425 may be performed at temperatures below room temperature (e.g., 12° C.), for example, to decrease proteolytic activity. In some embodiments, separating may be performed at a temperature below about 40° C., below about 30° C., or below about 20° C., or below about 15° C., or below about 10° C., or below about 15° C., or below about 10° C., or below about 5° C., or below about 2° C., or below about 1° C., or below about 0° C. Separating 425 may be performed, for example, at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C.

Separating a Solid Fraction

As shown in FIG. 4, a solid fraction 427 may be further separated 430 to extract additional juice, forming a second juice 432 and a first solid 431. A second juice may include a protein-rich liquid and/or at least some solid particles (e.g., carbohydrates, fiber).

Separating a solid fraction to form a second juice and a first solid may involve pressing (e.g., belt press), centrifugation, filtration, pressurized filtration, or any combination thereof. Interchangeable unit operations for separating a solid fraction include, for example, a decanter centrifuge, a belt press, a fan press, a rotary press, a screw press, a filter press, a finisher press, or any combination thereof.

As shown in FIG. 4, according to some embodiments, one or more of a first cake (e.g., FIG. 4, 442) and a second cake (e.g., FIG. 4, 447) that are collected in an earlier cycle may be combined with a solid fraction from a subsequent cycle prior to separation (e.g., FIG. 4, 430) of the solid fraction.

In some embodiments, a moisture content of a solid fraction and/or solid mixture is less than about 90%, or less than about 80%, or less than about 70%, or less than about 60%, or less than about 50%, or less than about 40%, or less than about 30%, or less than about 20%, or less than about 10% by weight.

Separating a Juice Fraction

As shown in FIG. 4, a juice fraction 426 may be separated 440 to generate a first juice 441 and a first cake 442. A first juice may include a soluble protein. Separating a juice fraction, in some embodiments, may involve centrifugation, filtration, pressurized filtration, or any combination thereof. Several different interchangeable unit operations may be used to separate a juice fraction including, for example, a high-speed disc stack centrifuge, a circular vibratory separator, a linear/inclined motion shaker, a decanter centrifuge, a filter press, pressurized filtration mechanisms, microfiltration, vacuum filtration, or any combination thereof.

Separating may be performed, according to some embodiments, at temperatures below room temperature, for example, to decrease proteolytic activity. In some embodiments separating may be performed at a temperature below about 40° C., or below about 30° C., or below about 20° C., or below about 15° C., or below about 10° C., or below about 15° C., or below about 10° C., or below about 5° C., or below about 2° C., or below about 1° C., or below about 0° C. Separating may be performed at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C., in some embodiments.

Separating a First Cake and/or a Second Juice

As shown in FIG. 4, a first cake 442 and a second juice 432 may be combined and further separated to form a third juice 446 and a second cake 447. In some embodiments, a first cake and a second juice may be independently subjected to further separation. Separating a first cake, a second juice, or any combination thereof may involve centrifugation, filtration, pressurized filtration, or any combination thereof. Several different interchangeable unit operations may be used to separate including, for example, a high-speed disc stack centrifuge, a circular vibratory separator, a linear/inclined motion shaker, a decanter centrifuge, a filter press, pressurized filtration mechanisms, microfiltration, vacuum filtration, or any combination thereof.

Separating may be performed, according to some embodiments, at temperatures below room temperature, for example, to decrease proteolytic activity. In some embodiments separating may be performed at a temperature below about 40° C., or below about 30° C., or below about 20° C., or below about 15° C., or below about 10° C., or below about 15° C., or below about 10° C., or below about 5° C., or below about 2° C., or below about 1° C., or below about 0° C. Separating may be performed at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C., in some embodiments.

As shown in FIG. 4, according to some embodiments, a third juice collected in an earlier cycle may be combined with a juice fraction from a subsequent cycle prior to further processing. In some embodiments a third juice may be combined with a first juice prior to further processing (e.g., FIG. 3A). A second cake may be combined with a first solid to form a solid mixture, in some embodiments, prior to further processing (e.g., FIG. 3A).

Filtering a First Juice, a Third Juice, or any Combination Thereof

As shown in FIG. 4, a first juice 441 may be filtered 450 to generate a first soluble protein 451 and a first reject stream 452. In some embodiments, a first juice, a third juice, or any combination thereof may be filtered to generate a first soluble protein and a first reject stream (e.g., FIG. 3A). Filtration 450 may involve microfiltration, ultrafiltration, nanofiltration, or reverse osmosis filtration.

Suitable filter sizes for microfiltration may include, in some embodiments, ≤about 10 μm, or ≤about 5 μm, or ≤about 3 μm, or ≤about 2 μm, or ≤about 1 μm, or ≤about 0.5 μm, or ≤about 0.4 μm, or ≤about 0.3 μm, or ≤about 0.2 μm, or ≤about 0.1 μm. As shown in FIG. 4, a first juice, a third juice, or any combination thereof may be filtered 450 using microfiltration to generate a first soluble protein 451 in the permeate and a reject stream product 453 in the retentate first reject stream 452.

Ultrafiltration may involve membrane filtration using pressure, concentration gradients, or a combination thereof. Suitable NMWCOs for ultrafiltration may be, in some embodiments, at most about 100 kDa, or at most about 90 kDa, or at most about 80 kDa, or at most about 70 kDa, or at most about 60 kDa, or at most about 55 kDa, or at most about 50 kDa, or at most about 45 kDa, or at most about 40 kDa, or at most about 30 kDa, or at most about 20 kDa, or at most about 15 kDa, or at most about 14 kDa, or at most about 13 kDa, or at most about 12 kDa, or at most about 11 kDa, or at most about 10 kDa, or at most about 9 kDa, or at most about 8 kDa, or at most about 7 kDa, or at most about 6 kDa, or at most about 5 kDa, or at most about 4 kDa, or at most about 3 kDa, or at most about 2 kDa, or at most about 1 kDa. In some embodiments, suitable NMWCO cut-offs for ultrafiltration may be in a range of at most about 1 kDa to at most about 10 kDa, at most about 2 kDa to at most about 10 kDa, at most about 3 kDa to at most about 10 kDa, at most about 3 kDa to at most about 15 kDa, or at most about 3 kDa to at most about 20 kDa, or at most about 3 kDa to at most about 60 kDa, or at most about 3 kDa to at most about 55 kDa, or at most about 10 kDa to at most about 55 kDa.

A first juice 441, a third juice 446, or any combination thereof may be filtered 450 using ultrafiltration to generate a first soluble protein 451 and a reject stream 452, according to some embodiments. A first soluble protein may be in a retentate (e.g., FIG. 3A) or a permeate, as shown in FIG. 4, depending upon the molecular weight cut-offs for ultrafiltration. When first reject stream 452 is a permeate of ultrafiltration (e.g., FIG. 3A) it may be recycled to a bioreactor system for cultivation of a microcrop (e.g., FIG. 1, 105).

In some embodiments, suitable filter sizes for nanofiltration may include ≤about 0.01 μm, or ≤about 0.009 μm, or ≤about 0.008 μm, or ≤about 0.007 μm, or ≤about 0.006 μm, or ≤about 0.005 μm, or ≤about 0.004 μm, or ≤about 0.003 μm, or ≤about 0.002 μm, or ≤about 0.001 μm. According to some embodiments, suitable filter sizes for reverse osmosis filtration may include ≤about 0.001 μm, ≤about 0.0009 μm, ≤about 0.0008 μm, ≤about 0.0007 μm, ≤about 0.0006 μm, ≤about 0.0005 μm, ≤about 0.0004 μm, ≤about 0.0003 μm, ≤about 0.0002 μm, or ≤about 0.0001 μm. In some embodiments, a first juice, a third juice, or any combination thereof may be filtered 450 using nanofiltration or reverse osmosis filtration to generate a first soluble protein (e.g., FIG. 3A, 351) in the retentate and a permeate (e.g., FIG. 3A, 352) of nanofiltered water or reverse osmosis water, respectively. In some embodiments a first reject stream (e.g., FIG. 3A, 352) may be a permeate of nanofiltration or reverse osmosis filtration and may be recycled to a bioreactor system for cultivation of a microcrop (e.g., FIG. 1, 105).

Buffers, protease inhibitors, anti-microbial agents, chelators (e.g., EDTA), reducing agents, or any combination thereof may be added, in some embodiments, to a soluble protein 451. A soluble protein may be chilled and/or stored at a temperature below about 30° C., or below about 25° C., or below about 20° C., or below about 15° C., or below about 10° C., or below about 5° C., or below about 2° C., or below about 1° C., or below about 0° C., or below −2° C., or below −5° C., or below −10° C., in some embodiments. Chilling and/or storing a soluble protein at reduced temperatures may reduce degradation and/or improve protein recovery efficiency.

Filtering a First Soluble Protein

As shown in FIG. 4, first soluble protein 451 may be filtered 455 to generate and second soluble protein 456 and a second reject stream 457. Filtration 455 may involve microfiltration, ultrafiltration, nanofiltration, or reverse osmosis filtration.

Suitable filter sizes for microfiltration may include, in some embodiments, ≤about 10 μm, or ≤about 5 μm, or ≤about 3 μm, or ≤about 2 μm, or ≤about 1 μm, or ≤about 0.5 μm, or ≤about 0.4 μm, or ≤about 0.3 μm, or ≤about 0.2 μm, or ≤about 0.1 μm. In some embodiments, a first soluble protein may be filtered 455 using microfiltration to generate a second soluble protein in the permeate (not shown) and a reject stream product in the retentate.

Ultrafiltration may involve membrane filtration using pressure, concentration gradients, or a combination thereof. Suitable NMWCOs for ultrafiltration may be, in some embodiments, at most about 100 kDa, or at most about 90 kDa, or at most about 80 kDa, or at most about 70 kDa, or at most about 60 kDa, or at most about 55 kDa, or at most about 50 kDa, or at most about 45 kDa, or at most about 40 kDa, or at most about 30 kDa, or at most about 20 kDa, or at most about 15 kDa, or at most about 14 kDa, or at most about 13 kDa, or at most about 12 kDa, or at most about 11 kDa, or at most about 10 kDa, or at most about 9 kDa, or at most about 8 kDa, or at most about 7 kDa, or at most about 6 kDa, or at most about 5 kDa, or at most about 4 kDa, or at most about 3 kDa, or at most about 2 kDa, or at most about 1 kDa. In some embodiments, suitable NMWCO cut-offs for ultrafiltration may be in a range of at most about 1 kDa to at most about 10 kDa, at most about 2 kDa to at most about 10 kDa, at most about 3 kDa to at most about 10 kDa, at most about 3 kDa to at most about 15 kDa, or at most about 3 kDa to at most about 20 kDa, or at most about 3 kDa to at most about 60 kDa, or at most about 3 kDa to at most about 55 kDa, or at most about 10 kDa to at most about 55 kDa. A first soluble protein may be filtered 455 using ultrafiltration to generate a second soluble protein 455 and a reject stream 357, according to some embodiments. A second soluble protein may be in a retentate, as shown in FIG. 4, or a permeate (not shown) depending upon the molecular weight cut-offs for ultrafiltration. When second reject stream 457 is a permeate of ultrafiltration, as shown in FIG. 4, it may be recycled to a bioreactor system for cultivation of a microcrop (e.g., FIG. 1, 105).

In some embodiments, suitable filter sizes for nanofiltration may include ≤about 0.01 μm, or ≤about 0.009 μm, or ≤about 0.008 μm, or ≤about 0.007 μm, or ≤about 0.006 μm, or ≤about 0.005 μm, or ≤about 0.004 μm, or ≤about 0.003 μm, or ≤about 0.002 μm, or ≤about 0.001 μm. According to some embodiments, suitable filter sizes for reverse osmosis filtration may include ≤about 0.001 μm, ≤about 0.0009 μm, ≤about 0.0008 μm, ≤about 0.0007 μm, ≤about 0.0006 μm, ≤about 0.0005 μm, ≤about 0.0004 μm, ≤about 0.0003 μm, ≤about 0.0002 μm, or ≤about 0.0001 μm. As shown in FIG. 4, in some embodiments, a first soluble protein may be filtered 455 using nanofiltration or reverse osmosis filtration to generate a second soluble protein 456 in the retentate and a permeate 457 of nanofiltered water or reverse osmosis water, respectively. In some embodiments second reject stream 457 may be a permeate of nanofiltration or reverse osmosis filtration and may be recycled to a bioreactor system for cultivation of a microcrop (e.g., FIG. 1, 105).

In some embodiments buffers, protease inhibitors, antimicrobial agents, chelators (e.g., EDTA), reducing agents, or any combination thereof may be added to the second soluble protein 456. A second soluble protein may be chilled and/or stored at a temperature below about 30° C., or below about 25° C., or below about 20° C., or below about 15° C., or below about 10° C., or below about 5° C., or below about 2° C., or below about 1° C., or below about 0° C., or below −2° C., or below −5° C., or below −10° C. Chilling and/or storing the second soluble protein at reduced temperatures may reduce degradation and/or improve protein recovery efficiency.

Reducing a Moisture Content of a First Soluble Protein and/or Second Soluble Protein In some embodiments a process may be used to reduce a moisture content of a first soluble protein 451 and/or a second soluble protein 456 (e.g., dewatering).

In some embodiments an evaporation process may be used to reduce a moisture content of a first soluble protein 451 or a second soluble protein 456 and generate a concentrated protein 461. Reducing a moisture content of a first soluble protein 451 or a second soluble protein 456 may reduce capital and operational expenditures, for example, by reducing an energy needed to dry a concentrated protein 461. Evaporation may be performed by, for example, a thermal (evaporative) means such as: a rising film evaporator, a falling film evaporator, a natural circulation evaporator (vertical or horizontal), an agitated-film evaporator, a multiple-effect evaporator, by vacuum evaporation, or any combination thereof.

As shown in FIG. 4, a moisture content of a first soluble protein 451 or a second soluble protein 456 may be reduced, in some embodiments, by nanofiltration or reverse osmosis filtration. In some embodiments, a moisture content of a first soluble protein 451 or a second soluble protein 456 may be reduced using nanofiltration with the first soluble protein 451 or a second soluble protein 456, respectively, in a retentate. A moisture content of a first soluble protein 451 or a second soluble protein 456, in some embodiments, may be reduced using reverse osmosis filtration with the first soluble protein 451 or a second soluble protein 456, respectively in a retentate. A permeate 462 of nanofiltration or reverse osmosis filtration may be recycled (e.g., dilution fluid for lysis; wash solution), according to some embodiments. In some embodiments, reverse osmosis filtration and/or nanofiltration may reduce the concentration of undesirable dissolved compounds (e.g., salts, calcium ions) in the resulting concentrated protein 461.

Drying a Soluble Protein

A concentrated protein 461 may be dried 465 to generate a dry protein concentrate, according to some embodiments. A drying procedure, in some embodiments, may reduce the moisture content of a concentrated protein 461 to a desired level (e.g., higher or lower moisture content, a desired moisture content). A moisture content of a dry protein concentrate, in some embodiments, may be, for example, below about 90%, or below about 80%, or below about 70%, or below about 60%, or below about 50%, or below about 40%, or below about 30%, or below about 20%, or below about 10%, or below about 5%, or below about 1% by weight of the dry protein concentrate. In some embodiments, the protein concentration of a dry protein concentrate may be from about 30% to about 95%, or from about 40% to about 90%, or from about 50% to about 85%, or from about 60% to about 80%, or from about 70% to about 75% by weight of the dry protein concentrate. A drying procedure may be performed using a mechanism including, for example, a spray dryer, double drum dryer, flash dryer, an evaporator, or any combination thereof.

Processing a First Solid and/or Solid Mixture

A first solid and/or solid mixture may be further processed to generate one or more carbohydrate-rich products. As described previously, a solid mixture may include one or more of a first solid 431, a first cake 442, a second cake 447, or any combination thereof that remain after one or more separation processes 430/440/445. Carbohydrate rich products may include a dry biocrude product suitable as a fuel feedstock or a carbohydrate-rich meal suitable as a human or animal feed supplement (e.g., *Lemna* meal).

A first solid and/or solid mixture may be processed (e.g., drying, pelletization), in some embodiments, to generate at least one of a dry biocrude and a carbohydrate-rich meal. According to some embodiments, processing a first solid and/or solid mixture involves drying and/or pelletization.

A process for generating a carbohydrate-rich product (e.g., dry biocrude and/or carbohydrate-rich) meal may be varied depending upon the specific characteristics desired, including, for example, moisture content, particle size, protein content, fat content, fiber content, ash content, shelf-life, pellet size, texture, or any combination thereof.

In some embodiments, a first solid and/or a solid mixture may be dried to reduce a moisture content of a resulting carbohydrate-rich product (e.g., dry biocrude and/or carbohydrate-rich meal). A drying procedure, in some embodiments, may be performed in conjunction with (e.g., prior to, following) other processing of a first solid and/or a solid mixture, such that the end product is a carbohydrate-rich product with a reduced moisture content. A drying procedure may be performed, in some embodiments, using a dryer mechanism including, for example, a spray dryer, double drum dryer, flash dryer, evaporator, or any combination thereof.

A moisture content of a carbohydrate-rich product (e.g., dry biocrude and/or carbohydrate-rich meal) may be below about 90%, or below about 80%, or below about 70%, or below about 60%, or below about 50%, or below about 40%, or below about 30%, or below about 20%, or below about 10%, or below about 5%, or below about 1% by weight of the product, in some embodiments.

Polyphenol Reduction

In some embodiments, a juice fraction 426, a first juice 441, a second juice 432, a third juice 446, a first soluble protein 451, a second soluble protein 456, and/or a concentrated protein 461 may undergo a processing step for the reduction of at least one polyphenol (a). A polyphenol reduction process may comprise passing a juice fraction 226, a first juice 241, a second juice 232, a third juice 246, and/or a soluble protein 251 through a series (e.g., at least two, at least three) of ion exchange resins. In some embodiments, a polyphenol reduction process may reduce a polyphenol (e.g., a tannin) content of a juice fraction 226, a first juice 241, a second juice 232, a third juice 246, and/or a soluble protein 251 by at least 5%, or at least 10%, or at least 15%, or at least 20%, or at least 25%, or at least 30%, or at least 35%, or at least 40%, or at least 45%, or at least 50%, or at least 55%, or at least 60%, or at least 65%, or at least 70%.

Solvent Wash

In some embodiments, a first soluble protein 451, a second soluble protein 456, and/or a concentrated protein 461 may undergo a solvent wash (b). Solvent washing (b) may also follow drying 465. A solvent wash of a soluble protein product 451 and/or a solvent wash following drying 465, may comprise at least one solvent (e.g., ethanol, methanol), in some embodiments. According to some embodiments, a solvent wash of a soluble protein product 451 and/or a solvent wash following drying 455, may result in a reduced fat content (e.g., about 2% of a dry protein concentrate or less by weight) and/or a reduced chlorophyll content (e.g., visually perceivable reduction in green coloration) compared to unwashed counterparts.

FIGS. 5A and 5B

FIGS. 5A and 5B are flow diagrams illustrating processes for producing a polysaccharide product (e.g., apiogalacturonan, oligogalacturonide, polygalacturonide) and/or a protein concentrate from a biomass according to a specific example embodiments of the disclosure.

In some embodiments a process for growing, harvesting, and separating a microcrop (e.g., photosynthetic aquatic species, aquatic plant species, *Lemna*, algal species) may be multiple cycles or a continuous process for the production of protein concentrate (e.g., soluble protein, dry protein concentrate) and/or carbohydrate rich products such that byproducts of an earlier cycle of the process may be recycled into one or more subsequent cycles of the process. Recycling of one or more by-products may reduce the overall water requirement for a process. In some embodiments, a process may be configured to minimize the net energy input required (i.e., energy conservation).

A microcrop may be harvested (e.g., FIG. 1, 110) forming a biomass (e.g., FIG. 1, 111).

Washing a Biomass

As shown in FIGS. 5A and 5B, a biomass may be washed 515 prior to processing, according to some embodiments. A wash procedure may remove debris, contaminants, nutrients, microorganisms, and/or toxins. A wash solution, in some embodiments, may be combined with a biomass to form a slurry. According to some embodiments, a wash solution (e.g., a first, second, and/or third wash solution) may have a temperature below room temperature (e.g., about 12° C.). A wash solution, in some embodiments, may have a temperature above room temperature (e.g., 50° C.). In some embodiments, a wash solution may comprise any desired portion of recycled fluid. For example, a wash solution may comprise at least about 10% (v/v), at least about 20% (v/v), at least about 30% (v/v), at least about 40% (v/v), at least about 50% (v/v), at least about 60% (v/v), at least about 70% (v/v), at least about 80% (v/v), or at least about 90% (v/v) recycled from another stage of the process (e.g., recycled wash solution 516, a first reject stream from filtration (e.g., FIG. 3A, 352), a second reject stream from filtrations (e.g., FIG. 4, 457)).

According to some embodiments, a wash solution recycled, at least in part, from another stage of the process (e.g., recycled wash solution 516, a first reject stream from filtration (e.g., FIG. 3A, 352), a second reject stream from filtrations (e.g., FIG. 4, 457)) may have a temperature below room temperature (e.g., about 12° C.) as the result of chilling of an earlier product in the process (e.g., chilling a first juice, chilling a first soluble protein, chilling a second soluble protein). A wash solution recycled, at least in part, from another stage of the process (e.g., recycled wash solution 516, a first reject stream from filtration (e.g., FIG. 3A, 352), a second reject stream from filtrations (e.g., FIG. 4, 457)) may have a temperature above room temperature (e.g., about 50° C.).

In some embodiments, a second wash solution (e.g., water, ozonated water, recycled wash solution FIG. 5A, 516) may be applied to a biomass. A third wash solution (e.g., water, ozonated water, recycled wash solution) may be applied to a biomass, in some embodiments. In some embodiments a first wash solution may be a reject stream from a filtration process (e.g., FIG. 3A, 352; FIG. 4, 457), a second wash solution may be water, and a third wash solution may be ozonated water. Some or all of a wash solution (e.g., a first wash solution, second wash solution, and/or third wash solution) may be separated, in some embodiments, from a biomass (e.g., using an inclined screen or vibratory screen).

Some or all of a wash solution, second wash solution, and/or third wash solution may be collected and/or reused, according to some embodiments. At least about 40%, or at least about 50%, or at least about 60%, or at least about 70%, or at least about 80%, or at least about 90%, or at least about 95% of the wash solution and/or second wash solution separated from a biomass may be recycled for future use.

Decoloring a Washed or Unwashed Biomass

As shown in FIG. 5B, in some embodiments, processing a microcrop or biomass (e.g., first portion, second portion) may include a decoloring procedure 570 to remove at least some of a chlorophyll component of the microcrop or biomass. A decoloring procedure 570 may be performed by exposing (e.g., submerging, spraying, dripping) at least one surface of a biomass to a solvent solution (e.g., ethanol, methanol, acetone). A solvent solution, in some embodiments, may be combined with a biomass (e.g., first portion, second portion) to form a slurry. In some embodiments a solvent solution may include one or more alcohols (e.g., ethanol, methanol), acetone, hexane, or ketones. According to some embodiments, a decoloring procedure 570 may include exposing (e.g., submerging, spraying, dripping, slurry) at least one surface of a biomass to a solvent solution for at least about 5 sec., about 15 sec., about 30 sec., about 45 sec., about 1 min., about 2 min., about 3 min., about 5 min., about 10 min., about 20 min., about 30 min., about 40 min., about 50 min., about 1 hour, about 2 hours, about 3 hours, about 4 hours, about 5 hours, about 6 hours, about 12 hours, or about 24 hours. A decoloring procedure 570, in some embodiments, may include moving (e.g., agitating, stirring, propelling) at least a portion of a solvent solution at a specified time, intermittently, or continually.

Lysing a Washed or Unwashed Biomass

As shown in FIGS. 5A and 5B, a washed biomass may be lysed 520 to form a lysed biomass 521. In some embodiments, a biomass (e.g., unwashed) may be lysed to form a lysed biomass. According to some embodiments, lysing may be achieved using a combination of mechanical (e.g., milling), chemical (e.g., pH adjustment), and/or ultrasonic (e.g., sonication) methods. A lysing process may be achieved using, for example, a shear mill, a ball mill, a colloid mill, a knife mill, a hammer mill, a grinding mill, a puree machine, a filter press, or any combination thereof.

In some embodiments, lysing may be performed at temperatures below room temperature. A lysing fluid (e.g., water, recycled water, reverse osmosis water) may be added to a biomass or microcrop before or during lysing, according to some embodiments. In some embodiments, a permeate (e.g., FIG. 4, 462) from reverse osmosis/nanofiltration of a second soluble protein may be recycled as a lysing fluid. For example, at least about 10%, at least about 20%, at least about 30%, at least about 40%, at least about 50%, at least about 60%, at least about 70%, at least about 80%, or at least about 90% of lysing fluid may be water generated as the result of reverse osmosis/nanofiltration of a filtration product (e.g., FIG. 4, 462). In some embodiments a lysing fluid may be at a temperature below room temperature (e.g., about 12° C.). A lysing fluid may be at a temperature above room temperature (e.g., 50° C.). According to some embodiments, a lysing fluid recycled, at least in part, from another stage of the process (e.g., FIG. 4, 462) may have a temperature below room temperature (e.g., about 12° C.) as the result of chilling of an earlier product in the process (e.g., chilling a first juice, chilling a first soluble protein, chilling a second soluble protein). A lysing fluid recycled, at least in part, from another stage of the process (e.g., FIG. 4, 462) may have a temperature above room temperature (e.g., about 50° C.) as the result of a heat exchange mechanism. For example, a heat exchange mechanism may be configured to use released energy from a drying process to heat a permeate (e.g., FIG. 4, 462) resulting from a reverse osmosis or nanofiltration process (e.g., FIG. 4, 460).

Separating a Biomass

As shown in FIGS. 5A and 5B, a lysed biomass may be separated 525 to generate a juice fraction 526 and a solid fraction 527. In some embodiments, a biomass (e.g., Lemna), a washed biomass, a lysed biomass, or any combination thereof may be separated to generate a juice fraction and a solid fraction. A juice fraction 526 may include a protein-rich liquid and/or at least some solid particles (e.g., carbohydrates, fiber). A solid fraction 527 may include at least one of an apiogalacturonan and/or an oligogalacturonide.

Separating 525 a lysed biomass may involve pressing (e.g., belt press), centrifugation, filtration, pressurized filtration, or any combination thereof. Interchangeable unit operations for separating 525 a biomass (e.g., harvested microcrop), washed biomass, and/or lysed biomass include, for example, a decanter centrifuge, a belt press, a fan press, a rotary press, a screw press, a filter press, a finisher press, or any combination thereof.

Separating 525 may be performed at any desired temperature. Separating 525 may be performed at temperatures below room temperature (e.g., 12° C.), for example, to decrease proteolytic activity. In some embodiments, separating may be performed at a temperature below about 40° C., below about 30° C., or below about 20° C., or below about 15° C., or below about 10° C., or below about 15° C., or below about 10° C., or below about 5° C., or below about 2° C., or below about 1° C., or below about 0° C. Separating 525 may be performed, for example, at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C.

Separating a Solid Fraction

As shown in FIGS. 5A and 5B, a solid fraction 527 may be further separated 530 to extract additional juice, forming a second juice 532 and a first solid 531. A second juice may include a protein-rich liquid and/or at least some solid particles (e.g., carbohydrates, fiber).

Separating a solid fraction to form a second juice and a first solid may involve pressing (e.g., belt press), centrifugation, filtration, pressurized filtration, or any combination thereof. Interchangeable unit operations for separating a solid fraction include, for example, a decanter centrifuge, a belt press, a fan press, a rotary press, a screw press, a filter press, a finisher press, or any combination thereof.

As shown in FIGS. 5A and 5B, according to some embodiments, one or more of a first cake 542 and a second cake 547 that are collected in an earlier cycle may be combined with a solid fraction from a subsequent cycle prior to separation 530 of the solid fraction.

In some embodiments, a moisture content of a solid fraction and/or solid mixture is less than about 90%, or less than about 80%, or less than about 70%, or less than about 60%, or less than about 50%, or less than about 40%, or less than about 30%, or less than about 20%, or less than about 10% by weight.

Separating a Juice Fraction

As shown in FIGS. 5A and 5B, a juice fraction 526 may be separated 540 to generate a first juice 541 and a first cake 542. A first juice may include a soluble protein. Separating a juice fraction, in some embodiments, may involve centrifugation, filtration, pressurized filtration, or any combination thereof. Several different interchangeable unit operations may be used to separate a juice fraction including, for example, a high-speed disc stack centrifuge, a circular vibratory separator, a linear/inclined motion shaker, a decanter centrifuge, a filter press, pressurized filtration mechanisms, microfiltration, vacuum filtration, or any combination thereof.

Separating may be performed, according to some embodiments, at temperatures below room temperature, for example, to decrease proteolytic activity. In some embodiments separating may be performed at a temperature below about 40° C., or below about 30° C., or below about 20° C., or below about 15° C., or below about 10° C., or below about 15° C., or below about 10° C., or below about 5° C., or below about 2° C., or below about 1° C., or below about 0° C. Separating may be performed at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C., in some embodiments.

Separating a First Cake and/or a Second Juice

As shown in FIGS. 5A and 5B, a first cake 542 and a second juice 532 may be combined and further separated to form a third juice 546 and a second cake 547. In some embodiments, a first cake and a second juice may be independently subjected to further separation. Separating a first cake, a second juice, or any combination thereof may involve centrifugation, filtration, pressurized filtration, or any combination thereof. Several different interchangeable unit operations may be used to separate including, for example, a high-speed disc stack centrifuge, a circular vibratory separator, a linear/inclined motion shaker, a decanter centrifuge, a filter press, pressurized filtration mechanisms, microfiltration, vacuum filtration, or any combination thereof.

Separating may be performed, according to some embodiments, at temperatures below room temperature, for example, to decrease proteolytic activity. In some embodiments separating may be performed at a temperature below about 40° C., or below about 30° C., or below about 20° C., or below about 15° C., or below about 10° C., or below about 15° C., or below about 10° C., or below about 5° C., or below about 2° C., or below about 1° C., or below about 0° C. Separating may be performed at a temperature between about 0° C. and about 10° C., or between about 5° C. and about 15° C., or between about 10° C. and about 20° C., or between about 15° C. and about 25° C., or between about 20° C. and about 30° C., or between about 25° C. and about 35° C., or between about 30° C. and about 40° C., in some embodiments.

As shown in FIGS. 5A and 5B, according to some embodiments, a third juice collected in an earlier cycle may be combined with a juice fraction from a subsequent cycle prior to further processing. In some embodiments a third juice may be combined with a first juice prior to further processing (e.g., FIG. 3A). A second cake may be combined with a first solid to form a solid mixture, in some embodiments, prior to further processing (e.g., FIG. 3A).

Protein Extraction

In some embodiments, a first juice, a third juice, or any combination thereof may be further processed (e.g., filtered) to generate a first soluble protein, a second soluble protein, a concentrated protein, and/or a dry protein concentrate according to any of the mechanisms described in Examples 1-4 above.

Processing a First Solid and/or Solid Mixture

As shown in FIGS. 5A and 5B, a first solid (e.g., first portion, second portion) 531 may be processed to generate one or more carbohydrate-rich products and/or a polysaccharide product (e.g., apiogalacturonan, oligogalacturonide, polygalacturonide). In some embodiments, a solid mixture may be processed to generate one or more carbohydrate-rich products and/or a polysaccharide product (e.g., apiogalacturonan, oligogalacturonide, polygalacturonide) (e.g., FIG. 2, 231). Carbohydrate rich products may include a dry biocrude product suitable as a fuel feedstock or a carbohydrate-rich meal suitable as a human or animal feed supplement (e.g., *Lemna* meal). A polysaccharide product may include at least one apiogalacturonan and/or at least one oligogalacturonide.

Carbohydrate Rich Products

A first solid and/or solid mixture may be processed (e.g., drying, pelletization), in some embodiments, to generate at least one of a dry biocrude and a carbohydrate-rich meal. According to some embodiments, processing a first solid and/or solid mixture involves drying and/or pelletization.

A process for generating a carbohydrate-rich product (e.g., dry biocrude, carbohydrate-rich) meal may be varied depending upon the specific characteristics desired, including, for example, moisture content, particle size, protein content, fat content, fiber content, ash content, shelf-life, pellet size, texture, or any combination thereof.

In some embodiments, a first solid and/or a solid mixture may be dried to reduce a moisture content of a resulting carbohydrate-rich product (e.g., dry biocrude and/or carbohydrate-rich meal). A drying procedure, in some embodiments, may be performed in conjunction with (e.g., prior to, following) other processing of a first solid and/or a solid mixture, such that the end product is a carbohydrate-rich product with a reduced moisture content. A drying procedure may be performed, in some embodiments, using a dryer mechanism including, for example, a spray dryer, double drum dryer, flash dryer, evaporator, or any combination thereof.

A moisture content of a carbohydrate-rich product (e.g., dry biocrude, carbohydrate-rich meal) may be below about 90%, or below about 80%, or below about 70%, or below about 60%, or below about 50%, or below about 40%, or below about 30%, or below about 20%, or below about 10%, or below about 5%, or below about 1% by weight of the product, in some embodiments.

Generating a Polysaccharide Product

As shown in FIGS. 5A and 5B, a first solid and/or solid mixture may be processed (e.g., extracting, separating), in some embodiments, to generate at least one polysaccharide product (e.g., at least one apiogalacturonan, at least one oligogalacturonide, at least one polygalacturonide).

Processing a first solid and/or solid mixture to form a polysaccharide extract and/or a polysaccharide product (e.g., at least one apiogalacturonan) may involve extracting with an acid solution 580. Extracting with an acid solution 580 may be performed by exposing (e.g., submerging) a first solid and/or solid mixture to an acid solution (e.g., hydrochloric acid). According to some embodiments, extracting with an acid 580 may include exposing (e.g., submerging) a first solid and/or solid mixture to an acid solution (e.g., hydrochloric acid) until carbohydrates are no longer detectable (e.g., phenol/sulfuric acid detection method; HPAEC, GPC). Extracting with an acid 580, in some embodiments, may include exposing (e.g., submerging) a first solid and/or solid mixture to an acid solution (e.g., hydrochloric acid) for a specified period of time. Acid extraction may be performed, according to some embodiments, at temperatures at or below room temperature.

As shown in FIGS. 5A and 5B, processing a first solid and/or solid mixture to form a polysaccharide product (e.g., at least one apiogalacturonan) may involve extracting with an oxalic acid solution (e.g., 0.5% oxalic acid) or an oxalate solution 590 (e.g., ammonium oxalate). Extracting with an oxalic acid solution or an oxalate solution 590 may be performed by exposing (e.g., submerging) a first solid and/or solid mixture to an oxalic acid solution or an oxalate solution (e.g., 1% ammonium oxalate solution). An oxalic acid solution or an oxalate solution, in some embodiments, may be combined with a first solid and/or solid mixture to form a slurry. According to some embodiments, extracting with an oxalic acid solution or an oxalate solution 590 may include exposing (e.g., submerging) a first solid and/or solid mixture to an oxalic acid solution (e.g., 0.5% oxalic acid solution) or an oxalate solution (e.g., 1% ammonium oxalate solution) until carbohydrates are no longer detectable. Extracting with an oxalic acid solution or an oxalate solution, in some embodiments, may include exposing (e.g., submerging) a first solid and/or solid mixture to an oxalic acid solution (e.g., 0.5% oxalic acid solution) or an oxalate solution (e.g., 1% ammonium oxalate) for a specified period of time. Extraction with an oxalic acid solution or an oxalate solution 590 may be performed, according to some embodiments, at temperatures at or below room temperature.

In some embodiments, at least a portion of a polysaccharide extract may be concentrated 595 (e.g., evaporation). Concentration 595 of at least a portion of a polysaccharide extract may involve separating at least one apiogalacturonan or at least one oligogalacturonide or at least one polygalacturonide from the polysaccharide extract (e.g., filtration) to form a polysaccharide product 598, according to some embodiments. In some embodiments, concentration 595 of at least a portion of a polysaccharide extract may involve ultrafiltration, nanofiltration, or reverse osmosis filtration of the polysaccharide extract to form a polysaccharide product 598. In some embodiments, concentration 595 of at least a portion of a polysaccharide extract may involve precipitating (i.e., recrystallizing) with at least one solvent to form a polysaccharide product 595, wherein the at least one solvent comprises ethanol, hexane, dichloromethane, methanol, isopropanol, ethyl acetate, water, acetone, and combinations thereof.

Suitable NMWCO for ultrafiltration, nanofiltration, or reverse osmosis filtration of a polysaccharide extract may be, in some embodiments, the same as or differ from the NMWCOs for filtration of a protein extract.

Systems of Extracting Proteins and Carbohydrate-Rich Products from Aquatic Species Embodiments of the disclosure also provide systems of extracting proteins and carbohydrate rich products from aquatic species. Such systems may include, for example: a lysing unit (e.g., 220/320/420) for lysing a biomass (e.g., washed, unwashed) to generate a lysed biomass; a first separating unit (e.g., 225/325/425) for separating the lysed biomass to generate a juice fraction and a solid fraction; a second separating unit (e.g., 240/340/440) for forming a first juice and a first cake; a third separating unit (e.g., 230/330/430) for forming a first solid and a second juice; a fourth separating unit (e.g., 245/345/445) for forming a second cake and a third juice; a protein concentration unit (e.g., 250/350/355/450/455) for forming: a soluble protein and a reject stream, or for forming a first soluble protein and a first reject stream, or for forming a second soluble protein and second reject stream; a dewatering unit (e.g., 360/460) for forming a concentrated protein and a permeate; a protein drying unit (e.g., 255/365/465) for drying a soluble protein product to generate a dry protein concentrate; and a carbohydrate drying unit (e.g., 235/335/435) for drying a first solid or solid mixture to generate at least one carbohydrate-rich product (e.g., dry bio-crude, carbohydrate-rich meal). Summarized in Table 6 are apparatuses that can be included in the units described above.

TABLE 6

| Example Apparatuses | |
| --- | --- |
| Lysing Unit (e.g., 220/320) | Shear Mill, Ball Mill, Colloid Mill, Knife Mill, Hammer Mill, Grinding Mill, Puree Machine, Filter Press |
| First Separating Unit (e.g., 225/325) | Decanter Centrifuge, Belt Press, Fan Press, Rotary Press, Screw Press, Filter Press, Finisher Press |
| Second Separating Unit (e.g., 240/340) | High-speed Disc Stack Centrifuge, Circular Vibratory Separator, Linear/inclined Motion Shaker, Decanter Centrifuge, Filter Press, Pressurized Filtration Mechanisms, Microfiltration Module, Vacuum Filtration Apparatus |
| Third Separating Unit (e.g., 230/330) | Belt Press, Fan Press, Rotary Press, Screw Press, Filter Press, Finisher Press, Decanter Centrifuge |
| Fourth Separating Unit (e.g., 245/345) | High-speed Disc Stack Centrifuge, Circular Vibratory Separator, Linear/inclined Motion Shaker, Decanter Centrifuge, Filter Press, Pressurized Filtration Mechanisms, Microfiltration, Vacuum Filtration Apparatus |
| Protein Concentration Unit (e.g., 250/350/355) | Microfiltration Module, Ultrafiltration Module, Nanofiltration Module, Reverse Osmosis Filtration Module *Any of the above modules may be configured as single or multistage crossflow membrane filtration systems. |
| Dewatering Unit | Rising Film Evaporator, Falling Film Evaporator, Natural Circulation Evaporator (vertical or horizontal), Agitated-Film Evaporator, Multiple-effect Evaporator, Vacuum Evaporation Apparatus, Nano-filtration Module, Reverse Osmosis Filtration Module |
| Protein Drying Unit | Spray dryer, Drum dryer, Flash dryer |
| Carbohydrate Drying Unit | Spray dryer, Drum dryer, Flash dryer |

It is understood that the listed apparatuses for each unit are for illustration purposes only, and this is not intended to limit the scope of the application. A specific combination of these or other apparatuses or units can be configured in such a system for the intended use based on the teachings in the application.

Persons skilled in the art may make various changes in the shape, size, number, separation characteristic, and/or arrangement of parts without departing from the scope of the instant disclosure. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition, device, and/or system of the disclosure. Where desired, some embodiments of the disclosure may be practiced to the exclusion of other embodiments.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value+/−about 10%, depicted value+/−about 50%, depicted value+/−about 100%) and/or a range endpoint. With respect to the former, a value of 50 depicted in an example, table, and/or drawing may form the basis of a range of, for example, about 45 to about 55, about 25 to about 100, and/or about 0 to about 100.

These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

EXAMPLES

Some specific example embodiments of the disclosure may be illustrated by one or more of the examples provided herein.

Example 1: Apiogalacturonan

Apiogalacturonan is an apiogalacturonic pectic polysaccharide which consists in one backbone of linear chain of pectin (α1-4 linked D-Galacturonic acids: D-GalpA-α1-4 D-GalpA) with ramifications:
Chains of β1-5 linked apiose: Apiβ1-5Apiβ
Chains of α1-5 linked Arabinose: Arafα1-5Arafα
Chains of Galactose alternatively linked in β1-3 and β1-4: Galpβ1-3Galpβ1-4Galpβ
Chains of β1-4 linked xylose with O-Methyl-xylose: Xylpβ1-4Xylpβ-4Xylpβ2-OMeXylp Apiogalacturonan consists of the following monosaccharides: apiose, galacturonic acid, arabinose, galactose, xylose and O-Methyl-xylose.

Example 2: Apiogalacturonan Extracted from *Lemna*

Monosaccharide analysis was performed on *Lemna* samples prepared in accordance with certain embodiments of the disclosure. A biomass was cultivated by growing *Lemna* in a bioreactor system with a growth medium and a propulsion system. A portion of the biomass was harvested and subjected to a first wash of water followed by removal of the first wash water using a shaking mechanism (e.g., slotted or mesh shaker). The biomass was then subjected to a second wash using ozonated water and the second wash solution was removed using a shaking mechanism (e.g., slotted or mesh shaker) to form a washed biomass. A first portion of the washed biomass was used as a sample for polysaccharide analysis described below ("Raw Biomass"). A second portion of the washed biomass was diluted with reverse osmosis and lysed in a shear mill at room temperature. The lysed biomass was separated to form a juice fraction and a solid fraction using a decanter centrifuge at room temperature.

The solid fraction was further separated using a screw press to form a first solid and a second juice. The juice fraction was separated by disc stack centrifuge to form a first cake and a first juice. The first cake and the second juice were combined and further separated using a vibratory separator to form a third juice and a second cake. The third juice was combined with the first juice. The second cake was combined with the first solid to form a solid mixture.

The solid mixture was dried to 10% moisture content forming a carbohydrate rich product. A sample of the carbohydrate rich product ("*Lemna* Meal" or "LM") was submitted for polysaccharide testing described below.

The first juice/third juice mixture was filtered using ultrafiltration to form a first soluble protein. The first soluble protein was then subjected to reverse osmosis filtration to form a concentrated protein. A sample of the concentrated protein ("*Lemna* Protein Concentrate" or "LPC") was submitted for polysaccharide testing described below.

Quantification of the monosaccharide composition of the Raw Biomass, LPC, and LM was performed by high pressure anion exchange chromatography (HPAEC). HPAEC was performed using a Dionex CarboPac PA1 column with amperometric detection of polysaccharide hydrolysis where hydrolysis was performed under the following conditions: (1) hydrolysis with 2N Trifluoracetic acid (TFA) at 100° C. for 0.5 hours; (2) hydrolysis with 2N TFA at 100° C. for 4 hours; (3) hydrolysis with 2N $H_2SO_4$ at 100° C. for 6 hours; (4) hydrolysis with 2N $H_2SO_4$ at 100° C. for 6 hours after overnight exposure to 26N $H_2SO_4$ at room temperature. The results of one experiment are shown in Table 7, with each value representing the higher monosaccharide content of the four hydrolysis methods.

TABLE 7

Monosaccharide Composition of Lemna Products using HPAEC

| | Monosaccharide Quantification (% w/w) | | | | | | | | | |
|---|---|---|---|---|---|---|---|---|---|---|
| Sample | Fuc | Ara | Rha | Gal | Glc | Man | Xyl | Gal Ac | Glu Ac | Glc Ac | Man Ac |
| Raw Biomass | 0.2 | 0.9 | 0.4 | 1.6 | 7.5 | 0.4 | 2.1 | 4.6 | N.D. | N.D. | N.D. |
| LPC | 0.1 | 1.1 | N.D. | 1.8 | 1.2 | N.D. | 0.6 | N.D. | N.D. | N.D. | N.D. |
| LM | 0.2 | 1.1 | 0.7 | 1.4 | 13.4 | N.D. | 4.0 | 10.8 | N.D. | N.D. | N.D. |

*N.D. None detected.

The HPAEC analysis revealed the presence of two main monosaccharides, glucose and galacturonic acid, thus suggesting the presence of two different polysaccharides (one with glucose and one with galacturonic). Apiose could not be quantified using the HPAEC method described above; therefore, it could not be confirmed that the polysaccharide with galacturonic acid was apiogalacturonan.

The failure to detect galacturonic acid in the LPC indicates that the vast majority of the galacturonic acid polysaccharide is retained in the solid fraction.

Because apiose could not be quantified using the HPAEC method described, to confirm that the galacturonic acid polysaccharide was apiogalacturonan, gas phase chromatography (GPC) was used. Samples of LM were prepared by (1) hydrolyzing the polysaccharide product to form monosaccharides by methanolysis; (2) trimethylsilylation of the monosaccharides to form a volatilized monosaccharides derivative; and (3) quantifying and identifying the volatilized monosaccharides as O-methylglycosides by gas phase chromatography.

TABLE 8

Monosaccharide Quantification of Lemna LM using GPC

| | Monosaccharide Quantification (% w/w) | | | | | |
|---|---|---|---|---|---|---|
| Sample | Rha | Gal | Glc | Xyl | Gal Ac | Apiose |
| LM | 2.0 | 2.3 | 3.8 | 7.9 | 25.2 | 8.7 |

TABLE 9

Monosaccharide Molar Ratio of Lemna LM using GPC

| | Monosachharides Molar Ratio | | | | | |
|---|---|---|---|---|---|---|
| Sample | Rha | Gal | Glc | Xyl | Gal Ac | Apiose |
| LM | 0.15 | 0.13 | 0.24 | 0.64 | 1.00 | 0.43 |

Tables 8 and 9 show the monosaccharide as either a quantification or a molar ratio of the LM as analyzed using GPC. The GPC analysis of LM confirmed the presence of both apiose and galacturonic acid and thereby the composition of the polysaccharide as apiogalacturonan. The presence of xylose and arabinose also supports this conclusion as these are side chains of the apiogalacturonan molecule. However, it is also possible that the sample contained a residual presence of pectin as suggested by the detection of low quantities of rhamnose, the monosaccharide marker of pectin.

The content of apiogalacturonan in the LM sample tested was calculated as 33.9% (w/w) (This quantification does not take into account the contribution of galacturonic acid coming from a possible presence of pectin in the product).

Example 3: Composition of a Polysaccharide Product Extracted from Lemna

Compositional analysis was performed on a polysaccharide product sample extracted from Lemna, according to certain embodiments of the disclosure. A biomass was cultivated by growing Lemna in a bioreactor system with a growth medium and a propulsion system. A portion of the biomass was harvested and subjected to a first wash of water followed by removal of the first wash water using a shaking mechanism (e.g., slotted or mesh shaker). The biomass was then subjected to a second wash using ozonated water and the second wash solution was removed using a shaking mechanism (e.g., slotted or mesh shaker) to form a washed biomass. A second portion of the washed biomass was diluted with reverse osmosis water and lysed in a shear mill at room temperature forming a lysed biomass. The lysed biomass was separated to form a juice fraction and a solid fraction using a decanter centrifuge at room temperature.

The solid fraction was further separated using a screw press to form a first solid and a second juice. The juice fraction was separated by disc stack centrifuge to form a first cake and a first juice. The first cake and the second juice were combined and further separated using a vibratory separator to form a third juice and a second cake. The third juice was combined with the first juice. The second cake was combined with the first solid to form a solid mixture.

The solid mixture was dried to about 10% moisture content forming a carbohydrate rich product, which was then exposed to 0.5% oxalic acid and titrated to pH 4.0. At least a portion of the oxalic acid extract was precipitated out of solution by the addition of ethanol and separated (e.g., centrifugation), to form a polysaccharide product, which was analyzed via GPC.

Table 10 illustrates the composition of the polysaccharide product sample based on a gas chromatographic analysis.

TABLE 10

Composition of Polysaccharide Product Following Oxalic Acid Extraction

| | Compositional Analysis (% w/w) | | | | |
|---|---|---|---|---|---|
| Sample | Protein | Ash | Fat | Pectin | Total |
| Polysaccharide Product | 2.77 | 7.38 | 0.55 | 89.36 | 100.00 |

What is claimed is:
1. A method of treating a biomass comprising a microcrop, the method comprising:
    lysing the biomass to form a lysed biomass;
    separating the lysed biomass to generate a juice fraction and a solid fraction;
    separating the solid fraction to generate a first solid and a second juice; and extracting the first solid with an extraction solution to form a polysaccharide extract,
- wherein the extraction solution comprises an acid solution, an oxalic acid solution, an oxalate solution, or combinations thereof, and
- wherein the polysaccharide extract comprises at least 30% (w/w) of an apiogalacturonan, an oligogalacturonide, a polygalacturonide, or a combination thereof.

2. The method of claim 1, further comprising concentrating the polysaccharide extract to form a polysaccharide product, wherein the polysaccharide product comprises the apiogalacturonan, the oligogalacturonide, the polygalacturonide, or the combination thereof.

3. The method of claim 2, wherein concentrating the polysaccharide extract consists of a process selected from evaporation, precipitation, dialysis, filtration, ultrafiltration, nanofiltration, reverse osmosis filtration, centrifugation, dewatering, and combinations thereof.

4. The method of claim 2, wherein the polysaccharide product comprises at least 80% (w/w) of the apiogalacturonan, the oligogalacturonide, the polygalacturonide, or the combination thereof.

5. The method of claim 1, further comprising decoloring the biomass.

6. The method of claim 5, further comprising concentrating the polysaccharide extract to form a polysaccharide product, wherein the polysaccharide product comprises the apiogalacturonan, the oligogalacturonide, the polygalacturonide, or the combination thereof.

7. The method of claim 6, wherein concentrating the polysaccharide extract consists of a process selected from evaporation, precipitation, dialysis, filtration, ultrafiltration, nanofiltration, reverse osmosis filtration, centrifugation, dewatering, and combinations thereof.

8. The method of claim 6, wherein the polysaccharide product comprises at least 80% (w/w) of the apiogalacturonan, the oligogalacturonide, the polygalacturonide, or the combination thereof.

9. The method of claim 1, further comprising washing the biomass with at least one of a first wash solution, a second wash solution, a third wash solution, or a combination thereof.

10. The method of claim 1, further comprising separating the juice fraction to generate a first juice and a first cake, and filtering the first juice to generate a soluble microcrop protein and a reject stream.

11. The method of claim 10, further comprising:
(1) separating the first cake,
(2) separating the second juice, or
separating the first cake and separating the second juice, in each case, to generate a third juice and a second cake; combining the second cake with the first solid prior to extracting the first solid with the extraction solution to form the polysaccharide extract.

12. The method of claim 10, further comprising subjecting the first juice to a polyphenol reduction process to generate a soluble microcrop protein having a reduced concentration of at least one polyphenol.

13. The method of claim 1, wherein the microcrop comprises *Lemna*.

* * * * *